| | | | |
|---|---|---|---|
| | | US007496892B2 | |

(12) United States Patent
Nuss

(10) Patent No.: US 7,496,892 B2
(45) Date of Patent: Feb. 24, 2009

(54) POLYMORPHIC REGULAR EXPRESSIONS

(76) Inventor: Andrew Nuss, 763 Summer Dr., Acworth, GA (US) 30102

( * ) Notice: Subject to any disclaimer, the term of this patent is extended or adjusted under 35 U.S.C. 154(b) by 1037 days.

(21) Appl. No.: 10/818,346

(22) Filed: Apr. 5, 2004

(65) Prior Publication Data

US 2005/0097514 A1    May 5, 2005

Related U.S. Application Data

(60) Provisional application No. 60/469,036, filed on May 6, 2003.

(51) Int. Cl.
*G06F 9/44* (2006.01)
*G06F 15/16* (2006.01)

(52) U.S. Cl. .................. 717/114; 717/106; 717/108; 709/200

(58) Field of Classification Search .................. 717/106, 717/108, 112, 114–119
See application file for complete search history.

(56) References Cited

U.S. PATENT DOCUMENTS

| 6,108,676 | A  | * | 8/2000 | Nakatsuyama | ............... | 715/210 |
| 6,681,217 | B1 | * | 1/2004 | Lewak | .................... | 707/3 |
| 6,856,981 | B2 | * | 2/2005 | Wyschogrod et al. | ......... | 706/48 |
| 2002/0138819 | A1 | * | 9/2002 | Hills | ........................... | 717/114 |
| 2004/0015909 | A1 | * | 1/2004 | Cho et al. | .................... | 717/143 |

OTHER PUBLICATIONS

Friedl, Mastering regular expressions, 2nd edition, 2002, accessed from http://proquest.safaribooksonline.com/0596002890?tocview=true, pp. 1-109.*
Specifying transaction-based information systems with regular expressions, Lustman, F., IEEE, vol. 20 Issue: 3, 1994, pp. 207-217.*
Manipulation of regular expressions under length constraints using zero-suppressed-BDDs, Ishihara, S.; Minato, S.-I., IEEE, 1995, pp. 391-396.*
Automatically grading Java programming assignments via reflection, inheritance, and regular expressions, Morris, D.S., IEEE, 2002, vol. 1, p. T3G-22.*

* cited by examiner

*Primary Examiner*—Wei Y Zhen
*Assistant Examiner*—Satish S. Rampuria
(74) *Attorney, Agent, or Firm*—Charles L. Thoeming

(57) ABSTRACT

New polymorphic advantages by combining OO elements of the Java™ and C++ languages with built-in support for regular expressions (in terms of class definitions, inheritance, member functions) and by applying the principle of virtual class membership to production rules are presented. Virtual member production rules are incorporated into a 'V-table' concept. Instantiated production rules are type-compatible embodiments of regular expressions. Polymorphic regular expressions are leveraged through the 'document design pattern'.

13 Claims, 19 Drawing Sheets

Figure 1:
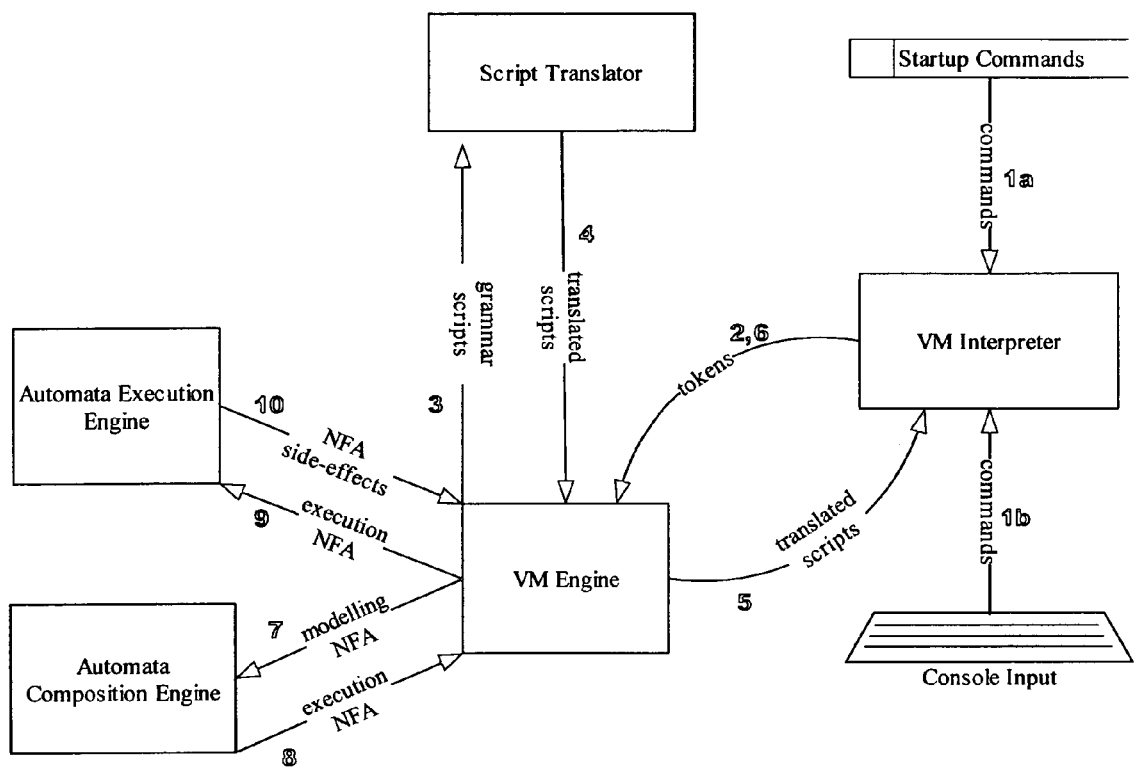

| Name | Description |
|---|---|
| VM Interpreter | Converts FORTH words (Strings) to FORTH tokens and literals |
| VM Engine | Executes FORTH tokens and literals |
| Script Translator | Converts scripts written in "the grammar of this invention" to FORTH words |
| Automata Composition Engine | Composes modeling NFAs from FORTH regular expressions and converts NFAs to executable NFAs via subset-construction |
| Automata Execution Engine | Executes an NFA against the input stream, and returns side-effects as compiled FORTH tokens |

Architecture and Dataflow

*Figure 2*

| Name | Description |
|---|---|
| VM Interpreter | Converts FORTH words (Strings) to FORTH tokens and literals |
| VM Engine | Executes FORTH tokens and literals |
| Script Translator | Converts scripts written in "the grammar of this invention" to FORTH words |
| Automata Composition Engine | Composes modeling NFAs from FORTH regular expressions and converts NFAs to executable NFAs via subset-construction |
| Automata Execution Engine | Executes an NFA against the input stream, and returns side-effects as compiled FORTH tokens |

*Figure 3 – Thread Statistics*

*(observed weights normalized per character)*

| Script | thread | trans | arcnum | instr | spawn |
|---|---|---|---|---|---|
| Docs | 1.00000 | 1.00000 | .00000 | .00001 | .00001 |
| Comments | 1.00000 | 1.00000 | .00000 | .00863 | .00863 |
| Lines | 1.00000 | 1.00000 | .00001 | .03368 | .00002 |
| Chunks | 1.13167 | 1.13167 | .26967 | .00864 | .01691 |
| ChunksS | 1.02996 | 1.02996 | .06578 | .00864 | .01691 |
| ChunksA | 1.21612 | 1.21612 | .37641 | .05763 | .11208 |
| ChunksB | 1.99204 | 1.99204 | 1.96339 | .00864 | .01278 |
| ChunksC | 2.13165 | 2.13165 | 2.13820 | .00864 | .01278 |
| ChunksD | 1.11579 | 1.11579 | .23590 | .00903 | .01490 |
| StringLits | 1.00861 | 1.00861 | .02153 | .04949 | .02125 |
| Codes | 1.36386 | 1.36386 | .75907 | .04850 | .06270 |
| CaptCodes | 1.43030 | 1.43030 | .93817 | .16146 | .16996 |
| CaptCodesS | 1.23958 | 1.23958 | .50408 | .08368 | .05782 |
| Chars | 1.00000 | 1.00000 | .00000 | 1.00000 | .00001 |
| CharsA | 1.00000 | 1.00000 | .00000 | .00001 | .00001 |
| Football | 1.14415 | 1.14415 | .27288 | .22703 | .18212 |

*Figure 4 – Prune Statistics*

*(observed weights normalized per character)*

| Script | prune-simple | prune-event | prune-arc | prune-weight | prune-accum |
|---|---|---|---|---|---|
| Docs | .00000 | .00000 | .00000 | .00000 | .00000 |
| Comments | .00000 | .00000 | .00000 | .00000 | .00000 |
| Lines | .00001 | .00000 | .00001 | .00002 | .00001 |
| Chunks | .26876 | .00223 | .10072 | .10296 | .00448 |
| ChunksS | .06438 | .00223 | .02067 | .02291 | .00448 |
| ChunksA | .37913 | .02450 | .13353 | .15803 | .09660 |
| ChunksB | 1.96820 | .00224 | .10074 | .30445 | .00449 |
| ChunksC | 2.13870 | .00655 | .90229 | 1.91185 | .01742 |
| ChunksD | .23432 | .00310 | .13559 | .40987 | .01080 |
| StringLits | .01724 | .00000 | .00000 | .00000 | .00000 |
| Codes | .74444 | .00000 | .00001 | .00002 | .00001 |
| CaptCodes | .92356 | .04920 | .19010 | .80956 | .19542 |
| CaptCodesS | .48232 | .00000 | .00001 | .00002 | .00001 |
| Chars | .00000 | .00000 | .00000 | .00000 | .00000 |
| CharsA | .00000 | .00000 | .00000 | .00000 | .00000 |
| Football | .26142 | .03270 | .09867 | 1.43393 | .14189 |

*Figure 5 – Other (Uncorrelated) Statistics*

| Script | instr/char | accept | thread max | prune length | % doc matched |
|---|---|---|---|---|---|
| Docs | .00008 | .00000 | 1.00000 | .00000 | 100.00000 |
| Comments | .02593 | .00431 | 1.00000 | .00000 | 79.72469 |
| Lines | .20206 | .00000 | 3.00000 | 2.00000 | 100.00000 |
| Chunks | .00958 | .00432 | 1.80851 | 45.08111 | 79.72469 |
| ChunksS | .00958 | .00432 | 1.80851 | 9.25296 | 79.72469 |
| ChunksA | .00958 | .02881 | 2.45745 | 5.44993 | 79.72620 |
| ChunksB | .00958 | .00000 | 2.80851 | 44.96195 | 100.00000 |
| ChunksC | .00858 | .00000 | 2.80851 | 137.73985 | 100.00000 |
| ChunksD | .00958 | .00000 | 2.54255 | 43.75171 | 100.00000 |
| StringLits | .04469 | .00631 | 2.89362 | .00000 | 94.63463 |
| Codes | .15192 | .00000 | 3.00000 | 2.00000 | 100.00000 |
| CaptCodes | .60752 | .00000 | 3.00000 | 3.86351 | 100.00000 |
| CaptCodesS | .60752 | .00000 | 3.00000 | 2.00000 | 100.00000 |
| Chars | 6.00004 | .00000 | 1.00000 | .00000 | 100.00000 |
| CharsA | .00013 | .00000 | 1.00000 | .00000 | 100.00000 |
| Football | 2.55933 | .00000 | 4.00000 | 3.01724 | 99.99951 |

*Figure 6 – Thread Buckets*
*(millis spent in each 'statistic' per 1 million characters)*

| Script | thread | trans | arcnum | instrs | spawn |
|---|---|---|---|---|---|
| Docs | 1272.49 | 366.30 | .00 | .00 | .00 |
| Comments | 1259.45 | 372.31 | .00 | 6.39 | 20.79 |
| Lines | 1257.21 | 406.19 | .00 | 25.91 | .00 |
| Chunks | 1423.02 | 475.79 | 184.05 | 6.31 | 40.47 |
| ChunksS | 1314.52 | 414.06 | 47.12 | 5.73 | 38.22 |
| ChunksA | 1565.94 | 494.28 | 258.12 | 39.53 | 255.83 |
| ChunksB | 2384.83 | 856.21 | 1490.44 | 5.69 | 31.79 |
| ChunksC | 2534.87 | 891.35 | 1595.62 | 5.92 | 31.52 |
| ChunksD | 1416.10 | 442.74 | 165.67 | 6.50 | 38.14 |
| StringLits | 1286.27 | 389.92 | 15.68 | 35.50 | 52.46 |
| Codes | 1805.20 | 601.86 | 565.46 | 34.62 | 155.98 |
| CaptCodes | 1934.45 | 679.01 | 658.25 | 130.92 | 422.16 |
| CaptCodesS | 1615.01 | 569.62 | 355.03 | 66.99 | 148.61 |
| Chars | 1410.61 | 438.22 | .00 | 697.70 | .08 |
| CharsA | 1253.99 | 370.04 | .00 | .00 | .00 |
| Football | 1569.30 | 630.76 | 185.03 | 160.91 | 436.25 |

*Figure 7 – Prune Buckets*

*(millis spent in each 'statistic' per 1 million characters)*

| Script | prune-simple | prune-event | prune-arc | prune-weight | prune-accum |
|---|---:|---:|---:|---:|---:|
| Docs | .00 | .00 | .00 | .00 | .00 |
| Comments | .00 | .00 | .00 | .00 | .00 |
| Lines | .00 | .04 | .00 | .00 | .00 |
| Chunks | 77.21 | 2.52 | 117.79 | 38.84 | 2.05 |
| ChunksS | 19.51 | 1.94 | 22.96 | 8.32 | 2.25 |
| ChunksA | 105.21 | 24.82 | 158.41 | 57.35 | 39.34 |
| ChunksB | 559.26 | 2.21 | 121.59 | 88.32 | 1.90 |
| ChunksC | 614.51 | 6.82 | 1087.72 | 586.67 | 8.05 |
| ChunksD | 69.81 | 2.79 | 160.14 | 118.59 | 5.03 |
| StringLits | 5.61 | .00 | .00 | .00 | .00 |
| Codes | 287.34 | .00 | .00 | .04 | .00 |
| CaptCodes | 300.07 | 45.93 | 226.88 | 233.81 | 75.86 |
| CaptCodesS | 153.61 | .00 | .04 | .00 | .00 |
| Chars | .00 | .00 | .00 | .00 | .00 |
| CharsA | .00 | .00 | .00 | .00 | .00 |
| Football | 80.15 | 29.48 | 125.61 | 374.99 | 62.00 |

*Figure 8 – Other (Uncorrelated) Buckets*
*(millis per 1 million chars spent in all 'buckets')*

| Script | total | main | overhead | chars | correlated |
|---|---|---|---|---|---|
| Docs | 2467.65 | 2.05 | 285.84 | 540.97 | 1638.79 |
| Comments | 2532.23 | 23.15 | 306.37 | 543.75 | 1658.94 |
| Lines | 2766.71 | 164.00 | 367.97 | 545.40 | 1689.34 |
| Chunks | 3234.51 | 10.69 | 299.52 | 556.25 | 2368.05 |
| ChunksS | 2741.86 | 10.34 | 298.18 | 558.72 | 1874.63 |
| ChunksA | 3914.26 | 10.53 | 343.00 | 561.89 | 2998.84 |
| ChunksB | 6446.12 | 10.76 | 303.42 | 589.69 | 5542.24 |
| ChunksC | 8284.19 | 11.35 | 307.51 | 602.27 | 7363.06 |
| ChunksD | 3273.85 | 10.18 | 289.88 | 548.28 | 2425.51 |
| StringLits | 3092.06 | 370.18 | 403.67 | 532.75 | 1785.46 |
| Codes | 4502.54 | 125.97 | 368.31 | 557.75 | 3450.51 |
| CaptCodes | 6662.54 | 780.66 | 610.78 | 563.77 | 4707.33 |
| CaptCodesS | 4827.03 | 770.55 | 594.02 | 553.55 | 2908.91 |
| Chars | 10570.64 | 4997.08 | 2453.30 | 573.65 | 2546.61 |
| CharsA | 2470.69 | 2.79 | 287.91 | 555.96 | 1624.04 |
| Football | 8801.67 | 3535.02 | 1051.25 | 560.94 | 3654.47 |

*Figure 9 – Derived Factors (Thread)*
*(where: stat\*factor = millis expected in 'bucket')*

| Script | thread | trans | arcnum | instrs | spawn |
|---|---|---|---|---|---|
| Docs | 1272 | 366 | | | |
| Comments | 1259 | 372 | | 741 | 2410 |
| Lines | 1257 | 406 | | 769 | |
| Chunks | 1257 | 420 | 682 | 731 | 2393 |
| ChunksS | 1276 | 402 | 716 | 663 | 2260 |
| ChunksA | 1288 | 406 | 686 | 686 | 2283 |
| ChunksB | 1197 | 430 | 759 | 659 | 2487 |
| ChunksC | 1189 | 418 | 746 | 686 | 2466 |
| ChunksD | 1269 | 397 | 702 | 720 | 2560 |
| StringLits | 1275 | 387 | 728 | 717 | 2469 |
| Codes | 1324 | 441 | 745 | 714 | 2488 |
| CaptCodes | 1352 | 475 | 702 | 811 | 2484 |
| CaptCodesS | 1303 | 460 | 704 | 801 | 2570 |
| Chars | 1411 | 438 | | 698 | |
| CharsA | 1254 | 370 | | | |
| Football | 1372 | 551 | 678 | 709 | 2395 |

*Figure 10 – Derived Factors (Prune)*

*(where: stat\*factor = millis expected in 'bucket')*

| Script | prune-simple | prune-event | prune-arc | prune-weight | prune-accum |
|---|---|---|---|---|---|
| Docs | | | | | |
| Comments | | | | | |
| Lines | | | | | |
| Chunks | 287 | 1127 | 1169 | 377 | 458 |
| ChunksS | 303 | 866 | 1111 | 363 | 501 |
| ChunksA | 277 | 1013 | 1186 | 363 | 407 |
| ChunksB | 284 | 985 | 1207 | 290 | 422 |
| ChunksC | 287 | 1040 | 1206 | 307 | 462 |
| ChunksD | 298 | 900 | 1181 | 289 | 466 |
| StringLits | 326 | | | | |
| Codes | 386 | | | | |
| CaptCodes | 325 | 933 | 1193 | 289 | 388 |
| CaptCodesS | 318 | | | | |
| Chars | | | | | |
| CharsA | | | | | |
| Football | 307 | 901 | 1273 | 262 | 437 |

*Figure 11 – Time Estimate Deltas (Thread)*
*(millis_expected – millis_observed for each 'bucket')*

| Script | thread (1250) | trans (425) | arcnum (700) | instrs (700) | spawn (2400) |
|---|---|---|---|---|---|
| Docs | -22.49 | 58.70 | | .01 | .03 |
| Comments | -9.46 | 52.69 | | -.35 | -.09 |
| Lines | -7.20 | 18.81 | .01 | -2.33 | .05 |
| Chunks | -8.44 | 5.17 | 4.72 | -.27 | .11 |
| ChunksS | -27.07 | 23.67 | -1.07 | .32 | 2.36 |
| ChunksA | -45.79 | 22.57 | 5.36 | .80 | 13.15 |
| ChunksB | 105.21 | -9.60 | -116.06 | .36 | -1.11 |
| ChunksC | 129.69 | 14.60 | -98.88 | .13 | -.84 |
| ChunksD | -21.36 | 31.47 | -.55 | -.18 | -2.38 |
| StringLits | -25.51 | 38.74 | -.61 | -.86 | -1.46 |
| Codes | -100.37 | -22.22 | -34.11 | -.67 | -5.51 |
| CaptCodes | -146.58 | -71.13 | -1.53 | -17.90 | -14.25 |
| CaptCodesS | -65.53 | -42.80 | -2.18 | -8.41 | -9.84 |
| Chars | -160.61 | -13.22 | | 2.31 | -.05 |
| CharsA | -3.99 | 54.96 | | .01 | .03 |
| Football | -139.12 | -144.50 | 5.99 | -1.99 | .84 |

*Figure 12 – Time Estimate Deltas (Prune)*
*(millis_expected – millis_observed for each 'bucket')*

| Script | prune-simple (300) | prune-event (950) | prune-arc (1200) | prune-weight (300) | prune-accum (400) |
|---|---|---|---|---|---|
| Docs | | | | | |
| Comments | | | | | |
| Lines | .00 | -.03 | .01 | .01 | .00 |
| Chunks | 3.42 | -.39 | 3.07 | -7.95 | -.26 |
| ChunksS | -.20 | .19 | 1.85 | -1.45 | -.45 |
| ChunksA | 8.53 | -1.54 | 1.83 | -9.94 | -.70 |
| ChunksB | 31.20 | -.08 | -.70 | 3.01 | -.10 |
| ChunksC | 27.10 | -.59 | -4.98 | -13.11 | -1.08 |
| ChunksD | .49 | .16 | 2.57 | 4.37 | -.71 |
| StringLits | -.44 | | | | |
| Codes | -64.01 | .00 | .01 | -.03 | .00 |
| CaptCodes | -23.00 | .82 | 1.24 | 9.06 | 2.31 |
| CaptCodesS | -8.91 | .00 | -.03 | .01 | .00 |
| Chars | | | | | |
| CharsA | | | | | |
| Football | -1.72 | 1.59 | -7.21 | 55.19 | -5.24 |

*Figure 13 -- % DFA Max Speed*

| Script | Overall | Without side-effects | Estimate (without side-effects) | Estimate "variance" |
|---|---|---|---|---|
| Docs | 100.00 | 100.00 | 97.96 | -2.04 |
| Comments | 97.45 | 98.96 | 96.80 | -2.18 |
| Lines | 89.19 | 97.54 | 96.94 | -.62 |
| Chunks | 76.29 | 74.54 | 74.72 | .24 |
| ChunksS | 90.00 | 89.58 | 89.97 | .44 |
| ChunksA | 63.04 | 61.22 | 61.52 | .50 |
| ChunksB | 38.28 | 35.55 | 35.71 | .45 |
| ChunksC | 29.79 | 27.37 | 27.37 | .00 |
| ChunksD | 75.37 | 73.30 | 72.92 | -.52 |
| StringLits | 79.81 | 94.03 | 92.94 | -1.16 |
| Codes | 54.81 | 54.38 | 57.76 | 6.22 |
| CaptCodes | 37.04 | 41.35 | 43.63 | 5.50 |
| CaptCodesS | 51.12 | 62.95 | 65.63 | 4.25 |
| Chars | 23.34 | 69.86 | 74.52 | 6.67 |
| CharsA | 99.88 | 99.99 | 97.96 | -2.02 |
| Football | 28.04 | 51.71 | 54.93 | 6.23 |

*Figure 14 – Thread Statistics 2*
*(half-sized test run)*

| Script | thread | trans | arcnum | instrs | spawn |
|---|---|---|---|---|---|
| Docs | 1.00000 | 1.00000 | .00000 | .00001 | .00002 |
| Comments | 1.00000 | 1.00000 | .00000 | .00865 | .00865 |
| Lines | 1.00001 | 1.00001 | .00003 | .03365 | .00004 |
| Chunks | 1.13186 | 1.13186 | .27011 | .00866 | .01695 |
| ChunksS | 1.03012 | 1.03012 | .06612 | .00866 | .01695 |
| ChunksA | 1.21647 | 1.21647 | .37713 | .05797 | .11274 |
| ChunksB | 1.99200 | 1.99200 | 1.96317 | .00867 | .01283 |
| ChunksC | 2.13186 | 2.13186 | 2.13842 | .00867 | .01283 |
| ChunksD | 1.11587 | 1.11587 | .23605 | .00905 | .01493 |
| StringLits | 1.00863 | 1.00863 | .02158 | .04970 | .02132 |
| Codes | 1.36449 | 1.36449 | .76029 | .04844 | .06267 |
| CaptCodes | 1.43090 | 1.43090 | .93925 | .16126 | .16982 |
| CaptCodesS | 1.24004 | 1.24004 | .50495 | .08358 | .05779 |
| Chars | 1.00000 | 1.00000 | .00000 | 1.00000 | .00002 |
| CharsA | 1.00000 | 1.00000 | .00000 | .00002 | .00002 |
| Football | 1.14414 | 1.14414 | .27288 | .22704 | .18213 |

*Figure 15 – Prune Statistics 2*
*(half-sized test run)*

| Script | prune-simple | prune-event | prune-arc | prune-weight | prune-accum |
|---|---|---|---|---|---|
| Docs | .00000 | .00000 | .00000 | .00000 | .00000 |
| Comments | .00000 | .00000 | .00000 | .00000 | .00000 |
| Lines | .00003 | .00001 | .00002 | .00004 | .00002 |
| Chunks | .26919 | .00224 | .10094 | .10318 | .00449 |
| ChunksS | .06471 | .00224 | .02076 | .02300 | .00449 |
| ChunksA | .37986 | .02466 | .13398 | .15864 | .09723 |
| ChunksB | 1.96799 | .00224 | .10096 | .30510 | .00450 |
| ChunksC | 2.13892 | .00656 | .90285 | 1.91320 | .01746 |
| ChunksD | .23447 | .00310 | .13556 | .40979 | .01080 |
| StringLits | .01727 | .00000 | .00000 | .00000 | .00000 |
| Codes | .74570 | .00001 | .00002 | .00004 | .00002 |
| CaptCodes | .92466 | .04915 | .19013 | .80960 | .19525 |
| CaptCodesS | .48321 | .00001 | .00002 | .00004 | .00002 |
| Chars | .00000 | .00000 | .00000 | .00000 | .00000 |
| CharsA | .00000 | .00000 | .00000 | .00000 | .00000 |
| Football | .26141 | .03270 | .09866 | 1.43393 | .14189 | cycled snippet:
1  /*
2  //67
3  //2345
4  */

Figure 16 – N-squared Behavior
(AntiLinear results per 1 million chars)

| Script | thread | trans | arcnum | instr | spawn | prune-simple | prune-event | prune-arc | prune-weight | prune-accum | CPU time (secs) | Estimate (secs) |
|---|---|---|---|---|---|---|---|---|---|---|---|---|
| 2510 | 2.4454 | 2.4454 | 2.5315 | .2737 | .4562 | 2.5319 | .0904 | 56.9996 | 57.0900 | 10.5817 | 98.7052 | 97.7592 |
| 5018 | 2.4500 | 2.4500 | 2.5385 | .2732 | .4554 | 2.5387 | .0907 | 113.9998 | 114.0905 | 20.9458 | 188.3220 | 187.4179 |
| 10012 | 2.4523 | 2.4523 | 2.5419 | .2730 | .4550 | 2.5420 | .0908 | 227.4999 | 227.5907 | 41.5824 | 380.1688 | 365.9289 |
| 20022 | 2.4534 | 2.4534 | 2.5437 | .2728 | .4547 | 2.5438 | .0909 | 455.0000 | 455.0908 | 82.9462 | 771.6886 | 723.7275 |
| 40020 | 2.4540 | 2.4540 | 2.5446 | .2728 | .4546 | 2.5446 | .0909 | 909.5000 | 909.5909 | 165.5826 | 1542.6099 | 1438.5337 |
| 80016 | 2.4543 | 2.4543 | 2.5450 | .2728 | .4546 | 2.5450 | .0909 | 1818.5000 | 1818.5909 | 330.8553 | 3078.8155 | 2868.1437 |

Figure 17 cycled snippet:
```
                                // comment indented by 32 spaces
``` results:

| Script | thread | trans | arcnum | instr | spawn | prune-simple | prune-event | prune-arc | prune-weight | prune-accum | prune-length[1] | accept[2] |
|---|---|---|---|---|---|---|---|---|---|---|---|---|
| Chunks | 1.98445 | 1.98445 | 1.99967 | .03077 | .06155 | 1.99967 | .01538 | .99983 | 1.01521 | .03076 | 65.00000 | .01539 |
| ChunksA | 2.47668 | 2.47668 | 2.96873 | 1.01522 | 2.03045 | 2.98412 | .49223 | 1.47668 | 1.96890 | 1.96890 | 3.00000 | .50761 |
| ChunksB | 2.49214 | 2.49214 | 2.50745 | .03078 | .04617 | 2.52283 | .01538 | .99984 | 3.01489 | .03077 | 64.98976 | .00000 |
| ChunksC | 2.98445 | 2.98445 | 3.01522 | .03078 | .04617 | 3.01522 | .03077 | 2.01522 | 5.06103 | .07692 | 65.49488 | .00000 |

1 An uncorrelated statistic.
2 An uncorrelated statistic.

Figure 18 cycled snippet:
1 aaa bbb ccc ddd eee fff ggg hhh results:

| Script | thread | trans | arcnum | instr | spawn | prune-simple | prune-event | prune-arc | prune-weight | prune-accum | prune-length[3] | accept[4] |
|---|---|---|---|---|---|---|---|---|---|---|---|---|
| Chunks | 1.00000 | 1.00000 | .00000 | .00000 | .00001 | .00001 | .00000 | .00000 | .00000 | .00000 | .00000 | .00000 |
| ChunksA | 1.00000 | 1.00000 | .00000 | .00000 | .00001 | .00001 | .00000 | .00000 | .00000 | .00000 | .00000 | .00000 |
| ChunksB | 2.00000 | 2.00000 | 1.99999 | .00001 | .00002 | 2.00000 | .00000 | .00000 | .00000 | .00000 | .00000 | .00000 |
| ChunksC | 2.00000 | 2.00000 | 1.99999 | .00001 | .00002 | 2.00000 | .00000 | .00000 | .00000 | .00000 | .00000 | .00000 |

3 An uncorrelated statistic.
4 An uncorrelated statistic.

Figure 19 cycled snippet:
```
1  aaa bbb ccc ddd eee fff ggg hhh
2  aaa bbb ccc ddd eee fff ggg hhh
3  aaa bbb ccc ddd eee fff ggg hhh
4  aaa bbb ccc ddd eee fff ggg hhh
5  // comment preceded by 4 codelines
``` results:

| Script | thread | trans | arcnum | instr | spawn | prune-simple | prune-event | prune-arc | prune-weight | prune-accum | prune-length[5] | accept[6] |
|---|---|---|---|---|---|---|---|---|---|---|---|---|
| Chunks | 1.00000 | 1.00000 | .00000 | .01227 | .01228 | .00000 | .00000 | .00000 | .00000 | .00000 | .00000 | .00614 |
| ChunksA | 1.00000 | 1.00000 | .00000 | .01227 | .01228 | .00000 | .00000 | .00000 | .00000 | .00000 | .00000 | .00614 |
| ChunksB | 1.79141 | 1.79141 | 1.58896 | .01228 | .01229 | 1.59509 | .00000 | .00000 | .00001 | .00000 | 2.00000 | .00000 |
| ChunksC | 2.00000 | 2.00000 | 2.00613 | .01228 | .01229 | 2.00613 | .00614 | 1.00613 | 2.01840 | .01841 | 163.93401 | .00000 |

---

[5] An uncorrelated statistic.
[6] An uncorrelated statistic.

POLYMORPHIC REGULAR EXPRESSIONS

2 CROSS-REFERENCES TO RELATED APPLICATIONS

This United States non-provisional patent application is based upon and claims the filing date of U.S. Provisional patent application Ser. No. 60/469,036, filed 05/06/2003.

3 STATEMENT REGARDING FEDERALLY SPONSORED RESEARCH OR DEVELOPMENT

None.

4 REFERENCE TO SEQUENCE LISTING ON CD-ROM

None.

5 BACKGROUND OF THE INVENTION

5.1 Field of the Invention

The field of the present invention encompasses principles of (1) object-oriented design and polymorphism based on virtual class members, (2) C++ and derivative languages (Java ™, etc.) which are reductions to practice of the former, (3) regular expressions and production rules, and (4) Perl-like and Lex-Yacc like languages which are reductions to practice of regular expression grammars and production rule grammars.

Little commonality is presently found between the fields of (1)/(2) relative to the fields of (3)/(4). The present invention applies the principles of polymorphism and virtual member derivations to production rules of the present invention (which are embodiments of regular expressions), introducing commonality, thereby allowing regular expression programmers to gain the benefits of virtual member polymorphism, previously only available across various "OO" grammars for member function derivations.

5.2 Description of Related Art

The related art includes C++, Perl, Lex-Yacc, and the inventor's previously filed U.S. provisional application Ser. No. 60/469,036 [filed May 6, 2003] and related, pending U.S. non-provisional application Ser. No. 10/691,414 [filed Oct. 22, 2003], hereinafter referred to as 'first invention'. The 'first invention' shows how to integrate regular expressions into a C-style language, by overloading/adapting the C-expression syntax for regular expressions, and, additionally, shows how parameterizable production rules can be used to create re-usable regular expressions.

In terms of Perl, related art aspects involve regular expressions, and how they can be incorporated in solutions to problems of document recognition and tokenization. In terms of Lex-Yacc (i.e. its usefulness in building parsers), related art aspects involve the use of regular expressions to create "atomic" tokens, and how Lex-Yacc production rules are used to combine tokens into higher-level tokens, implying a parsing tree for all of the tokens of the document (normally a very "well-formed" document conforming to a particular grammar). In terms of C++and its derivatives such as Java™, related art aspects involve the concept of virtual function members of class definitions, and how virtual function members relate to the concepts of polymorphism. The term "polymorphism" implies in the art that an instance of a structured object can be assigned to and used/viewed as multiple (poly) data-types (morph), but invocation of its virtual functions will always call the most-derived function within the class hierarchy of the object's actual type.

In the present invention, which extends the 'first invention' by incorporating the essential elements of object-oriented class declarations, it will be seen that those same object-oriented design goals are applied to parameterizable production rules—in that production rules, previously available in the 'global scope' of the scripts of the 'first invention', are now also available polymorphically as virtual members of class/struct definitions, with the same advantages that normally accrue to virtual function members in the (object-oriented) art. This novelty is core to the present invention, in that the production rules described by the 'first invention' (re-usable parameterizable regular expressions) are additionally offered to the programmer of the present invention in a form consistent with the principles of object-oriented languages, and can therefore be used polymorphically.

Additionally, it will be demonstrated that the present invention's collection of grammar forms and engine optimizations offer a novel and preferred design approach for solving problems of document tokenization, hereinafter referred to as the 'document design pattern'. This design pattern allows for a more effective approach to problem decomposition and modeling, an approach encouraging object-oriented principles of encapsulation, behavior derivation, and improved library design and re-use, ultimately allowing solutions of fewer lines of code, without performance disadvantages relative to solutions given in the grammar of the 'first invention' or in other related art.

Further, it will be demonstrated that by adoption of the 'document design pattern' in the present invention, a reliable estimate of performance can be made by the programmer at design time, and that in general, the performance of a 'document-level production rule' is within the same order of magnitude as 'DFA-maximum speed', as demonstrated by examples.

Just as programmers have learned a variety of optimal techniques to leverage virtual class member functions in C++ and Java ™ for functional decomposition, programmers of the present invention will learn analogous advantages and techniques of formulating regular expressions as (polymorphic) virtual production rule members of struct/class definitions.

5.3 List of Prior Art

Languages:
Perl
Java ™
C++
Lex/Yacc
Other Publications:
The 'first invention'

6 BRIEF SUMMARY OF INVENTION

Regular expressions have become popular in the world of computer programming today, primarily through Perl, based on its significant range of regular expression forms and features. Some of the defects of Perl and other regular expression engines were addressed in the 'first invention', such as the absence of parameterizable production rules, the absence of comprehensive integration of side-effects into the regular expressions (with accompanying ambiguity resolution), the absence of a solution to the problem of nested, indeterminate, side-effect-including, repeat expressions (implying the possibility of non-finishing automata), and the absence of the subjunctive grammar form. Perhaps more significant than these defect corrections offered by the 'first invention', was the adoption of the C-language model for its grammar, both because there are a large contingent of C++ and Java™ programmers in the world who will find it very easy to learn its new grammar, and also because of the subtle advantages afforded by adapting the C-expression model for regular expressions, as discussed in the document referred to as the 'first invention'.

An approach to solving problems in the domains of parsing, document tokenization, and document recognition was also alluded to in the 'first invention', involving the creation of libraries of re-usable and parameterizable production rules, to encapsulate the regular expressions that help solve such problems in re-usable form. The present invention expands upon these novelties as follows: (1) that there are great benefits to further extending the grammar of the 'first invention' such that it includes structs, inheritance, and member function polymorphism, such as in C++ or Java™, (2) that the concept of polymorphism can also be adapted and applied to production rule definitions, so that (virtual) member production rules can provide the essential token recognition and parsing capability through inclusion in a "Base" class, and can then be overloaded in a (derived) sub-class to solve specific problems by providing side-effect producing statements ('do-patterns' and 'capture-patterns'), (3) that polymorphic production rules encourage the programmer to employ what is seen as a superior design pattern, that of building a set of related production rules that work together to recognize and tokenize an entire document, and providing these rules within one struct/class object, (4) that the automata required for a given 'document-level rule' instantiation (in a tokenize statement) is the same across all runtime 'object instances' of the class/struct, and can therefore be cached and re-used across all instance variables (in all scripts) of a given 'most derived' class, such that the cost of subset construction to create automata is effectively amortized, and (5) that it is demonstrated that a polymorphic approach to the use of production rules does not carry a performance disadvantage (in the present invention) versus the use of simple static production rules or inline-coding of regular expressions.

Up to the present time, languages such as Perl have added value in allowing programmers to solve problems of document recognition and tokenization. However, effective solutions programmed in Perl (and related regular expression languages) often involve the manual decomposition of the problem into a mix of (1) regular expressions that recognize smaller (fine-grained) units (tokens) of the document, (2) loops and functions that integrate those parsed units into (less fine-grained) higher level tokens, and (3) multiple passes of recognition/extraction. In contrast, the programmer of the present invention is encouraged by its novel grammar forms and performance characteristics to solve document parsing, recognition, and extraction problems of arbitrary complexity (almost entirely) via collections of related production rules (and their derivations), accruing not only the advantages of object-oriented design, but performance advantages as well. The performance advantages derive from a design pattern which correlates a particular 'document classification' with a solution comprised at the highest level of a fully composed 'document level production rule', requiring only one automata for that 'document classification', and requiring only one parsing pass through the data in order to produce all of the required side-effects of recognition and tokenization.

In summary, as shown in the present invention, polymorphic regular expressions can lead to a paradigm shift in viewing problems of document tokenization—i.e. just as object-oriented design principles encourage programmers to decompose functional programming problems via classes, class inheritance, and virtual member functions, applying principles of polymorphism to regular expressions allows programmers to decompose tokenizing programming problems via classes (structs in the present invention), class inheritance, and virtual member production rules.

6.1 Brief Description of Architecture

For the architecture of the present invention, the inventor's pending non-provisional patent application Ser. No. 10/691,414 [filed Oct. 22, 2003], and referred to as the 'first invention', is incorporated by reference. The five basic components of the present invention (as in the 'first invention') are therefore:

VM Interpreter
VM Engine
Script Translator
Automata Composition Engine
Automata Execution Engine The code-base for the present invention has grown from the code-base supporting the inventor's pending U.S. non-provisional patent application Ser. No. 10/691,414 by about 100 percent (roughly doubling in size), involving solutions to the following additional problems:

Automata Caching
FORTH-Time Production Rule Instantiation
Inline Functions
Load Statements
Automata Diagnostic Statistics
Structs, Constructors, and Virtual Function Members
Structs, and Virtual Production Rule Members The first important point of consideration is that the overall architecture of the present invention has not changed relative to the architecture of the 'first invention' (translator module, FORTH engine, automata engine, and automata composition engine), and the look-and-feel of the example scripts presented herein will therefore be similar to those of the 'first invention'. In fact, the example scripts of the 'first invention' run in the present invention with a minimum of modifications (primarily to employ re-usable libraries through load/include statements).

In terms of the additional feature elements listed above, 'automata caching' is important to the performance of runtime-instantiations of member production rules. Assume, for example, that the programmer has declared a base class/struct such as XmlDoc, which contains a set of member production rules used to recognize portions of a valid XML document. The programmer will then create a sub-class such as MyXmlDoc which changes (derives new behaviors for) various production rules of XmlDoc (polymorphism) primarily to accomplish side-effects specific to the MyXmlDoc sub-classification of documents, as well as adding other production rules, such that the MyXmlDoc struct will recognize/tokenize a specific subclass of Xml documents that conform to the DTD associated with that XML document sub-classification. The programmer might then instantiate multiple instances of MyXmlDoc (through the constructor), possibly because this script runs multiple times, possibly because the MyXmlDoc script is itself a shared library, or possibly because there are different parameters to the constructor of MyXmlDoc. In any case, 'automata caching' ensures that exactly 1 automata is created (constructed) and shared for each tokenize statement usage, and ensures that this caching advantage is available not only to 'global-scope' production rule instantiations but also to production rules defined as virtual members of a struct. Therefore, when the espoused design patterns of the present invention are followed, subset construction (automata generation) time is effectively amortized and does not dominate the total performance of the solution because of automata re-use.

The second new feature, 'FORTH-time production rule instantiation' is critical to the architecture of the present invention, as a modification to the production rule instantiation techniques of the 'first invention'. In the 'first invention', the FORTH-grammar representation (FORTH regular expression) of an instantiated production rule is created during script translation time. In the present invention, which supports virtual production rule member polymorphism, this is not possible. Instead, the code which fully instantiates a production rule must be encapsulated as a FORTH-level 'instantiator-proc', and the (runtime) instantiation involves the lookup of the appropriate FORTH-proc (to perform the instantiation) from the struct-array itself (similar to the C++ feature called 'V-table').

The third new feature listed, 'inline functions', is added for a number of convenience reasons, as well as a particular reason relevant to the present invention, which is to allow a programmer to open and manipulate file streams. With this feature, whenever a new operating system level functionality is required in the engine and grammar, such as manipulating Files or URL-referenced remote documents, suitable FORTH-primitives are added to and supported in the engine, and then an appropriate 'inline function' declaration is added to a system-level library such as those seen in the shared library SYS.TOK of section 8.5.2. Implicit in this approach is that the 'translator module' remains unchanged with the introduction of each new system-level "hook" (also termed "native" functionality in the art).

The fourth new feature listed, 'load statements', allows often used functions, inline-functions, production rules, and class/struct libraries to be written once and re-used via the 'load statement'. It is termed "load" rather than "include" because the "load" terminology is more compatible with the current implementation (which involves sharing of the FORTH translations among all scripts). This does not preclude the future implementation of a supplemental "include" functionality.

The fifth new feature listed, 'automata statistics', is particularly useful in demonstrating the performance characteristics of the examples of the present patent application. In particular, the performance characteristics of test runs for the example scripts (herein) demonstrate that a decision to employ polymorphic solution techniques (using virtual production rule members) does not impair performance relative to a solution employing a more cumbersome collection of 'global-scope' (or static struct member) production rules. Additionally, 'automata statistics' demonstrate the performance viability of the 'document design pattern', versus a mix of functions, loops and regular expression statements. Finally, the 'automata statistics' are shown to correlate (through 'derived factors') closely to the total observed elapsed time attributable to automata execution (not including side-effect accumulation and execution), so that a programmer using the present invention can observe the 'automata characteristics' of his/her 'document level production rules' on "smallish" data samples, and infer expected performance on larger documents, allowing the possibility of design-time corrections to regular expressions that produce better 'automata characteristics'.

The sixth new feature listed, 'structs, constructors, and virtual function members' Provides the essential C++-like object-oriented features (polymorphism). This feature has elevated the present invention from being not only a C-like language (as is the 'first invention') to being a C++-like language. Of course, there are some important variations from the struct/class grammars established by C++ and Java™, which are discussed in section 8.2. For the most part, these variations are grammar-related choices made by the author of the present invention, not feeling compelled to adhere absolutely to all of the class syntax rules of C++ and/or Java™, in part because the present invention is intended as a scripting language. As such it is often appropriate to make grammar choices that increase programming expressivity even when such choices may be at a cost to performance.

The seventh new feature listed, 'structs and virtual production rule members', is a critical feature of the present invention. Production rules in the present invention are instantiated through FORTH 'instantiator-procs', so that when virtual (non-static) rules are defined in a class/struct, the FORTH-procs which instantiate those rules are laid out as FORTH-pointer elements to FORTH executable-arrays, inside the struct array. Further, when a sub-class of a base-class derives a new behavior for a member production rule (polymorphism), the appropriate x-array "pointer" in the struct-array is replaced with another x-array "pointer" which instantiates the sub-classed variation of that production rule. Finally, when virtual production rules are instantiated, the FORTH-level proc which does the instantiation is called not through a global variable (as with static rules), but is called by creating a reference to the appropriate data element of the struct-array, getting this reference's value (an x-array instantiator proc), and then executing this x-array to perform the instantiation. As a result, a programmer can "widen" a sub-classed instance object to its parent (base-class) type, and be confident that all of the sub-classed virtual production rule variations (derived behaviors) will still be used when referenced from an instance variable of the base-class type.

This widening principle is another very important aspect of object-oriented polymorphism, one which has been implemented in the present invention not only for member functions but also member production rules.

7 BRIEF DESCRIPTION OF THE SEVERAL VIEWS OF THE DRAWINGS

Illustrations and figures, which are provided in the 'first invention', are herein incorporated by reference, the 'first invention' serving as the starting point for the present invention. In addition, the following nineteen figures are provided:

FIG. 1—Architecture and Dataflow—This diagram is identical to that given (for overall component architecture) in the 'first invention', demonstrating that the 5 major software components of the present invention have the same inter-relationships as in the 'first invention'.

FIG. 2—This table lists the names of the 5 major software components shown in FIG. 1, and gives the description of each. Required changes to the components to support new features of the present invention include:

VM Engine—Additional primitive atoms were added to the FORTH engine as needed, such as (by example) those atoms which implement extensions to the 'template frame' functionality (section 8.9.2.4).

Script Translator—(1) the translation (to FORTH) of production rule definitions and instantiations was reworked to support polymorphism and FORTH-time binding of rule instantiations; (2) support for compiling class/struct definitions to FORTH was added.

Automata Composition Engine—Support for 'automata caching' was provided in this software component.

Automata Execution Engine—Changes were made to: (1) improve performance, (2) optionally record 'automata statistics', (3) allow for optional 'bucket profiling' of automata.

FIG. 3—Thread Statistics—This table shows (for each of 16 examples) the observed 'automata characteristics' which correlate to the thread-related 'buckets' of automata execution time. "Thread-related" statistics/buckets are those which are primarily affected by the 'NFA-ness' of the automata. There are 5 such statistics, of which the first two are always identical (for a given example script against the same test files), as seen in the first 2 columns of FIG. 3. These statistics of the automata for a compiled regular expression are all "per-character" statistics, so that for a given class of documents, the observed values of the statistics will largely be independent of document size. The column labels are the names of such 'statistics' which are defined in the glossary. These 5 'statistics' are termed 'correlated', because they "co-relate" to the columns of FIG. 6 for the 'buckets' of the same name.

FIG. 4—Prune Statistics—This table shows (for each of 16 examples) the observed 'automata characteristics' which are related to thread-pruning events, which can occur during automata execution. These 5 'statistics' are correlated to the columns of FIG. 7 (for the 'buckets' of the same name). These 'statistics' are separated from the first set of correlated 'statistics', in part because the latter 3 prune-related statistics also serve as indicators of N-squared behavior, discussed in section 8.6.3. These 'statistics' are defined in the glossary section.

FIG. 5—Other (Uncorrelated) Statistics—This table contains other automata related statistics of interest which are not directly correlated to the buckets (through the 'derived factors'). (1) The $1^{st}$ data column represents the 'instrs-per-char statistic', which is the ratio of the total instruction length of aggregated side-effects produced by the winning thread, divided by the number of characters tokenized by the automata. (2) The $2^{nd}$ data column represents a "per character" count of intermediate "accept" states. This 'accept statistic', is not directly correlated to any 'bucket'. However, each intermediate accept is tied to 2 thread spawning-events. (3) The $3^{rd}$ data column represents the maximum thread-count reached at any time for a given tokenize statement, averaged across all tokenize statements. This statistic is a function of both the automata and the document, such that with 94 different documents being tested (other than with Football), some of the 'thread-max' statistics are not evenly divisible by 1.00000. (4) The $4^{th}$ data column is the average pruning comparison length (distance) of all pruning events which occurred across the test suite. This is in contrast with the 'prune statistics' of FIG. 4, which are weighted on a per character basis, and thereby "correlated". (5) The $5^{th}$ data column assumes (in its label name) that the entire document is being tokenized, and is computed as the percent-adjusted ratio of the number of characters "accepted" by the "winning" thread (reflected in how far the stream cursor advances as a side-effect of tokenization) divided by the number of characters actually read from the input stream during tokenization.

FIG. 6—Thread Buckets—This table shows the total number of milliseconds spent in each correlated, thread-related, 'bucket' per million characters processed, across all 15 example scripts. Many of these numbers range into the 1000s, primarily because for purposes of profiling the present invention, which is currently written in Java™, the Java™ Hotspot compiler mode must be turned off. When Hotspot is turned on, the present invention performs (even in its present implementation in Java™) at speeds expected by regular expression programmers, but Hotspot does not allow for uniform 'bucket profiling', as explained in the glossary section ('faster measures as slower'). These 'buckets' have the same names as the columns of FIG. 3, to which they are "correlated", and are also defined in the glossary section.

FIG. 7—Prune Buckets—This table shows the total number of milliseconds spent in each correlated, prune-event-related, 'bucket' (per million characters processed) across 16 example scripts. These 'buckets' have the same names as the columns of FIG. 4, to which they are "correlated", and are also defined in the glossary section.

FIG. 8—Other (Uncorrelated) Buckets—This table shows time spent in all of the CPU 'buckets' in the following way (each entry in the table being in units of millis per million characters): (1) the sum of all of the CPU buckets for the test run for a given example is shown in the $1^{st}$ data column (thus giving the total elapsed CPU time per million characters); (2) the time spent in the MAIN 'bucket' is shown in the $2^{nd}$ data column, which is time spent completely outside of the automata; (3) the time spent in the OVERHEAD 'bucket' is shown in the $3^{rd}$ data column (which, though part of the automata elapsed time, is uncorrelated to any 'statistic'); (4) the time spent fetching a character from the input stream is shown in the $4^{th}$ data column (which is theoretically constant time based on the implementation of a 'cyclestream', should not vary based on any but Java™ VM issues, and is therefore uncorrelated with any 'statistics'); (5) the remaining correlated automata 'buckets' are summed across the rows of FIGS. 6 & 7 and entered in the $5^{th}$ data column.

FIG. 9—Derived Factors (Thread)—This table assumes the premise of section 8.7, which is that not only is performance of the automata 'linear' in the size of the document, but is also extremely predictable, in that the total number of milliseconds spent in each of 5 significant thread-related CPU 'buckets' of automata execution (reflected in the 5 'statistics' of FIG. 3) can be estimated simply by multiplying a 'derived factor' by the observed statistic. The entries in the cells of this table are obtained by dividing the corresponding cells of FIG. 6 by similar cells of FIG. 3, whenever enough 'bucket time' is observed to make an inference. Linearity is partially contingent on the "closeness" of the values in each column across the disparate example scripts. (Linearity is also contingent on the non-growth of correlated 'statistics' with increasing document size.) The actual values of these factors, of course, depend on whether the engine is coded in C++ or Java™, as well as the CPU characteristics of the machine which is running the engine of the present invention. Even the ratios of the factors to one another may be somewhat different in a C++ implementation of the engine, but an important observation is that, across all of the examples, the derived factors remain consistently similar (within a column), meaning that performance is very predictably linear.

FIG. 10—Derived Factors (Prune)—This table is similar in nature to that of FIG. 9, applying the same premise, and the results of FIGS. 4 and 7 to compute its values, in this case, for the prune-event related 'statistics' and 'buckets'.

FIG. 11—Time Estimate Deltas (Thread)—This table assumes 'median estimates' of the thread-related 'derived factors', and shows how close the expected runtime is to the observed runtime for each thread-related 'bucket' and its corresponding 'statistic'. The largest observed differences from prediction also point to areas of the automata which most affect performance (average thread-count and average arc-sequence accumulation), as discussed in section 8.6.1. The values of this table are computed by forming the difference of: (1) "expected time" based on multiplying a cell of FIG. 3 with the 'median estimate' of its corresponding 'derived factor' and (2) "observed time", taken from corresponding cells of FIG. 6. These numbers are all relatively small differences (versus total elapsed time of FIG. 8 for each example), showing the success of the 'derived factors' in predicting performance.

FIG. 12—Time Estimate Deltas (Prune)—This table is similar in significance to that of FIG. 11, except that the "time deltas" between expectation and observation are computed here for the prune-related (also correlated) statistics. The entries for this table are computed based on the same formula as for FIG. 11, applied to the cells of FIGS. 4 and 7 and 'median estimates' of prune-related 'derived factors'.

FIG. 13—Percentage of DFA Max Speed—This table demonstrates how well each example performs relative to the maximum possible speed under the present invention (which occurs in any automata which is 100 percent DFA with a minimum of side-effects, i.e. CountDocs), and how close are the estimates. of this performance according to 'derived factors': (1) The $1^{st}$ data column represents the observed percentage of 'DFA max speed' (including side-effect costs) for a given example and is computed by forming a percent-adjusted ratio of 2 elapsed times, with the known 100 percent DFA example—Docs—in the numerator. These observed elapsed times are all found as entries of the $1^{st}$ data column of FIG. 8. (2) The $2^{nd}$ data column represents the observed percentage of 'DFA max speed' (excluding side-effect costs) for a given example and is computed by forming a percent-adjusted ratio of 2 elapsed times, each denominator of which is the sum (for that example) of the last 2 data columns (excluding MAIN and OVERHEAD) of FIG. 8, and each numerator of which is this same sum of the last 2 data columns, but always for the reference 'DFA-maximum speed' row of FIG. 8, that of Docs (section 8.5.5). This calculated 'observed percentage of DFA max speed' result column is referred to frequently in terms of correlating the 'statistics' of a given example to its observed percentage of 'DFA maximum speed'. (3) The $3^{rd}$ data column represents the estimated percentage of 'DFA max speed' for a given example (based on the predictive power of the 'derived factors') and is computed by forming a percent-adjusted ratio of 2 elapsed times, the numerator containing the same numerator as in (2), i.e. the observed CPU time of Docs (without side-effects), and the denominator containing the estimated elapsed time based on 'derived factors' for that example. This denominator (estimated time) is computed by summing across the corresponding row of FIGS. 11 & 12 (for that example) and adding to this partial sum the sum of the 'chars derived factor' and the value in the "correlated" column of FIG. 8. Because FIGS. 11 and 12 contains deltas, summing the deltas and invariant CHARS estimate to the observed time ("correlated" column) produces an estimated time. This $3^{rd}$ column is used in conjunction with the $2^{nd}$ column to show correspondence between observed percentage of 'DFA maximum speed' and the estimate of same based on 'derived factors'. (4) The $4^{th}$ data column simply shows the degree of correspondence between the $2^{nd}$ (observed) and $3^{rd}$ (estimate) data columns. This so-called "variance" is not true variance but is calculated as follows: form a percent-adjusted ratio, with numerator being the difference formed by subtracting the entry (for corresponding row) in $2^{nd}$ data column (observed) from the entry in $3^{rd}$ data column (estimate), and with denominator being the entry in $2^{nd}$ data column (observed). A number such as 6.22 means that the estimate of percentage of 'DFA maximum speed' was 6.22 percent higher than the observed percentage of 'DFA maximum speed'. Higher positive "variances" indicate that the observed performance was slower than that expected, and it is noted in section 8.7.3 that this result is often related to Java™ garbage collection anomalies.

FIG. 14—Thread Statistics 2—This table corresponds entry by entry to FIG. 3. Whereas the values of FIG. 3 are obtained from a "full-sized" test run of 400000 chars per document per script-test, the values of FIG. 14 are obtained from test runs using a 'cycle-size' of 200000. The "closeness" of the observed 'statistics' for FIGS. 3 & 14 indicate that these thread-related 'statistics' are largely independent of document size, rather being a function of automata complexity and problem statement.

FIG. 15—Prune Statistics 2—This table corresponds entry by entry to FIG. 4. Whereas the values of FIG. 4 are obtained from a "full-sized" test run of 400000 chars per document per script-test, the values of FIG. 15 are obtained from test runs using a 'cycle-size' of 200000. The "closeness" of the observed 'statistics' for FIGS. 4 & 15 indicate that these prune-related 'statistics' are also largely independent of document size, rather being a function of automata complexity and problem statement. This result does not always apply for the latter 3 columns of FIGS. 4 & 15, for which such statistics do grow with document size when N-squared behavior is observed in a "delivered" solution.

FIG. 16—N-squared Behavior—This table is discussed in conjunction with section 8.6.3, in which an example is presented that produces N-squared performance. In this table, the example script of section 8.6.3 is being tested with increasing 'cycle-sizes' (from 2510 to 800016), and the effect on elapsed time is observed in conjunction with those prune-related 'statistics' which are susceptible (in the presence of N-squared behavior) to growth (in document size).

FIG. 17—This figure shows a "cycled" one-line code-snippet and the correlated 'automata statistics' which result when this snippet is "cycled" enough times to reach 400000 characters. This snippet consists of a single Java™-style comment indented by 32 spaces. This snippet is tested against variations of comment "chunk" counting examples (sections 8.5.12, 8.6.1.1, 8.6.1.2, 8.6.1.3).

FIG. 18—This figure shows a "cycled" one-line code-snippet and the correlated 'automata statistics' which result when this snippet is "cycled" enough times to reach 400000 characters. This snippet behaves (for purposes of an automata in the present invention) as a single uncommented line of source code. This snippet is tested against variations of comment "chunk" counting examples (sections 8.5.12, 8.6.1.1, 8.6.1.2, 8.6.1.3).

FIG. 19—This figure shows a "cycled" five-line code-snippet and the correlated 'automata statistics' which result when this snippet is "cycled" enough times to reach 400000 characters. This snippet behaves (for purposes of an automata in the present invention) as 4 lines of uncommented source code followed by a single-line comment. This snippet is tested against variations of comment "chunk" counting examples (sections 8.5.12, 8.6.1.1, 8.6.1.2, 8.6.1.3).

8 DETAILED DESCRIPTION OF INVENTION

The present invention incorporates by reference the glossary definitions of the 'first invention'. In addition, the following additional definitions of terms apply to the present invention. Also, certain definitions of very important terms are copied from the 'first invention' upon which the present is based. Many terms that are defined in the present glossary have special significance to the present invention and are enclosed when used in single-quotes. Other terms of more general relevance to, and seen in the literature and parlance of, the art are enclosed in double-quotes.

8.1 Glossary of Terms

@@ operator—A new operator of the present invention which allows the programmer to save capture points during input stream processing of the automata, without actually doing a capture. This operator is used inside do-patterns, as seen in the CountCharsA example.

Accept statistic—A count of intermediate "accept" events during automata execution. Whenever an extant thread becomes an intermediate "accept" candidate, it causes all previous candidates of lesser "accept length" to be flushed, often a characteristic of examples which do not use the new eof2 keyword. This statistic, which is not directly correlated to any 'bucket', counts the total number of flushed candidates on a "per character" basis. As a result of each intermediate "accept" event, 2 thread-spawning events are generated. This is evidenced in the Count-Comments example, which shows a thread count of 1.00000, yet does show thread spawning events. In fact, for this example, the correlated 'spawn statistic' from FIG. 3 is exactly twice that of the uncorrelated 'accept statistic' from FIG. 5.

Accumulation—This term is used in reference both to the 'arcnum statistic' (accumulation of arcnum-sequence references to an extant automata thread) and the 'instr statistic' (accumulation of x-array snippet references to an extant thread). For the latter, see also 'side-effect accumulation'.

Aggregation—see side-effect aggregation.

Automata—a collection of character-arcs and instruction-arcs (connecting the nodes of the automata) which "physically" represent (to the engine) regular expression compositions of the present invention (when used in a tokenize statement), including instantiated production rules, which are themselves regular expressions, being type-compatible with the Pattern primitive data-type.

Automata caching—a feature added to the present invention for caching subset-constructed automata for possible re-use. The cache is "aged" by standard techniques, so that more frequently used automata are less susceptible to being purged from the cache. The purpose of the cache is to amortize the cost of subset-construction of automata.

Automata statistics/characteristics—These diagnostic characteristics of automata performance are calculated during automata execution (when this feature is turned on) by accumulating the value of a particular statistic of the automata at each character position of the stream (or the mathematical equivalent to such accumulation), and then, when reporting the 'statistics' at the end of a test run, returning the ratio of the accumulated statistic to the total number of characters encountered in the input stream during tokenization. Thus each 'statistic' (or 'characteristic') is reported on a "per character" basis. Smaller values of a statistic imply less time spent in the corresponding 'bucket' (with Hotspot off, see 'faster measures as slower'), so that a programmer using these 'statistics' and their corresponding 'derived factors' should strive to create regular expressions that exhibit smaller values of the statistics for a typical data sample. The following set of 10 correlated 'statistics' are reported by the performance metrics and are used to obtain values of 'derived factors':

thread-count statistic—a characteristic of automata execution which measures NFA-ness, referring to the average number of threads required throughout an automata's execution. A value of 1.00, as reported by 'performance diagnostics', is normally seen in conjunction with an 'arcnum statistic' of 0.00, and together, such values indicate that an automata is functioning at 'DFA maximum speed'. For the examples given, this statistic ranges from 1.00 to 1.43 in the main examples, and from 1.11 to 2.13 in the AntiDFA examples (FIG. 3).

transition statistic—This statistic correlates with the 'transition bucket', but is always identical to the 'thread-count statistic', based on the current automata engine design. This reflects the number of "lookups" from the node-character-arc transition map per character processed from the input stream.

arcnum statistic—Arcnum-sequence references must sometimes be accumulated to extant threads during automata execution (for a possible future arcnum-sequence pruning-comparison), so that this statistic reflects the average number of such accumulations per character processed from the input stream. Combined with the 'thread-count statistic' and various prune-comparison 'statistics', this statistic is very important in determining the degree of NFA-ness and 'pinning specificity' for a given 'document-level production rule'. This statistic ranges from 0.00 to 0.93 in the main examples, and 0.23 to 2.13 in the AntiDFA examples.

instr statistic—Whenever a snippet of instructions embedded on instruction arcs in an automata is traversed during automata execution, its reference must be accumulated to the thread for which this traversal occurs. This statistic counts the total number of such accumulations per character processed, and ranges from 0.00 to 0.22 in the main examples. Even the AntiDFA examples show some variation in this statistic. The value of 0.22 is for the Football example, which has relatively small recognition units, and the high value of 1.00 is seen for the CountChars example (an anti-example since CountCharsA is superior).

spawn statistic—The 'spawn statistic' reflects the total number of AutomataThread.New( ) calls made, on a "per character" basis. This statistic ranges from 0.00 to 0.18 in the main examples, again for which the Football example shows the least "pinning specificity" and the most fine-grained 'recognition units'.

prune-simple statistic—This statistic counts (on a "per character" basis) the number of times a thread arrives at a new node when at least 2 threads are "extant". The name is given to signify that a simple check is made to see if pruning at this node will be necessary. This statistic ranges from 0.00 to 0.92 in the main examples, and up to 2.13 in the anti-examples.

prune-event statistic—This statistic counts the number of times (on a per-character basis) that two or more "extant" threads arrive at the same node at the same character position. The pruning algorithm of the 'first invention' ensures that only the "best" thread remains extant, without affecting the ultimate selection of the "winning" thread.

prune-arc statistic—This statistic counts the number of arcnum-sequence references which must be compared (averaged across all characters and all prune events) to make a prune-elimination decision. As seen from FIG. 16, this is the statistic which most dominates performance in N-squared solutions (see section 8.6.3). However, in the main examples of the present document, this statistic ranges from 0.00 to 0.19, and from 0.10 to 0.90 in the AntiDFA examples.

prune-weight statistic—This statistic counts the total number (per character) of arcnum-sequence element comparisons (across all characters and all pruning events) which are needed to make a prune-elimination decision. This statistic is also (along with 'prune-arc' and 'prune-accum') susceptible to growth (in document size) in the presence of non-linear (N-squared) solutions such as seen in section 8.6.3. The relationship between this statistic and prune-arc statistic is that of weight versus count: an arcnum sequence for a given arc, as described in the 'first invention', is a sequence of integers, much like a "string" of integers, and when two such sequences are compared (up to the current necessary depth), this statistic counts each element of the integer-string compared. This statistic is always greater than or equal to the prune-arc statistic, because for any arcnum sequence, at least one sub(integer-string)-element must be compared to make a decision.

prune-accum statistic—Before a prune-comparison event occurs, the arcnum-sequence references are accumulated as a prior stage to the comparison, and this statistic reflects the "per character" weight of such accumulations. Although not as significant as prune-arc and prune-weight, this statistic also becomes a bottleneck in N-squared solutions.

Automata maximum speed—also referred to as 'DFA maximum speed', a term which describes the functioning of the present invention for certain programming problems, such as the CountDocs and CountCharsA example, which produce very simple automata, and with such a high degree of DFA-ness, that it is reasonable to state that those solutions function at "maximum speed". This moniker, used herein, pertains only to the time required to process the input stream against the automata, and select the winning thread. The time required to accumulate side-effect instructions (proportional to the number of instructions queued by the "winning" thread), and the time required to execute those side-effects is considered separately (see 'instr-per-char statistic'). The 'automata max speed' across all example scripts presented (when run on a 2.4 gighz machine within a Java™ 1.3.1_07 virtual machine with Hotspot compilation turned on) is roughly 7 million characters per second. However, Hotspot enabled test runs exhibit the 'faster measures as slower' phenomenon, as well as uneven performance gains across the 'buckets', so that Hotspot-on cannot be used to profile the 'buckets', nor to derive meaningful estimates for the 'derived factors' for each 'bucket'. With Hotspot turned off, 'automata maximum speed' (as seen in CountDocs) is roughly 400,000 characters per second, a number serving as a point of reference for all examples presented herein. 'Automata maximum speed' is approximately achieved by 4 of the example scripts (CountDocs, CountComments, CountLines, and CountCharsA), whose automata statistics exhibit almost 100 percent DFA-ness, in terms of an average 'thread-count statistic' of 1.0000 and an average 'arcnum statistic' of 0.0000—explaining why the term 'DFA maximum speed' is also used.

Base class—a term which applies when class A inherits from or extends class B (B is the base-class). This term is often used interchangeably with the term "superclass", but carries the additional implication that a base-class serves as a starting point, a class in which most of the 'recognition-units' of a 'document-classification' are defined.

Bucket—The automata execution algorithm of the present invention is seen as currently having 13 primary bottlenecks ('bucket') which account for the CPU time during automata execution—MAIN, OVERHEAD, CHAR, THREAD, TRANS, ARCNUM, INSTR, SPAWN, PRUNE-SIMPLE, PRUNE-EVENT, PRUNE-ARC, PRUNE-WEIGHT, and PRUNE-ACCUM. The first 3 'buckets' are not included in 'derived factors' and have the following significance:

MAIN—represents the time spent in the FORTH engine to execute the side-effects produced by a particular example, as well as amortized automata lookup time. This time is largely an invariant of the problem being solved, and is not significantly affected by the quality of the regular expressions used to solve the problem, because this is simply the time required to execute the FORTH side-effect instructions scheduled for execution by the automata engine based on tokenization of the input stream.

OVERHEAD—represents the time required to aggregate the side-effects of the "winning" thread into a FORTH x-array, as well as other overhead of automata execution that does not belong to any of the 10 correlated buckets discussed below. This 'overhead' time is, like that of the 'main' bucket, primarily a function of the side-effects needed for the solution, and not the quality of the regular expression.

CHAR—represents the time required to fetch the next character from the input stream. This bucket is also not associated with a 'statistic' because the character-fetch time is not a property or in any way affected by the quality of the automata. Note that for CountDocs example, character-fetch time is roughly 22-percent of the total time, indicating that even if a hypothetical automata engine were created (that looked at each character) which took no time at all to make transition decisions, pruning decisions, and instruction and arcnum accumulations, it would only be 4× to 5× faster. Most likely such a hypothetical engine would have not only much less grammatical power than the automata engine of the present invention, but much less grammatical power than Perl and other regular expression engines of the art.

The next 10 buckets of CPU time measured in the automata performance diagnostics are correlated with associated 'automata statistics', from which 'derived factors' can be calculated:

THREAD—the CPU time which is roughly proportional to the number of threads extant at any one time, and represent tasks (not falling into other buckets) which must be done for each extant thread. This is correlated with the 'thread-count statistic'.

TRANS—the CPU time which is required to determine the next arc transition for a given thread based on the most recent character fetched from the input stream. This is also correlated with the 'thread-count statistic'.

ARCNUM—the CPU time which is required to accumulate a reference to an arcnum sequence encountered by an extant thread for the purpose of a possible prune comparison at a future character position, in accordance with the algorithms of the 'first invention' regarding arcnum sequences, automata composition, and automata thread pruning.

INSTR—the CPU time which is required to accumulate a reference to an x-array snippet encountered by an extant thread so that in the event this thread eventually becomes the "winning" thread, those snippets can be aggregated into the side-effect x-array of the "winning" thread and queued for execution by the FORTH engine.

SPAWN—the CPU time which is required to create and release threads during automata execution, such as when NFA-style transitions are encountered and when pruning events occur.

PRUNE-SIMPLE—the CPU time which is required to put a thread into the correct pruning "slot" after each transition is determined, in accordance with the associated 'pruning' algorithm of the 'first invention'.

PRUNE-EVENT—the CPU time involved in prune-comparison decisions which cannot be specifically allocated to PRUNE-ARC, PRUNE-WEIGHT or PRUNE-ACCUM.

PRUNE-ARC—the CPU time involved in prune-comparison decisions which begins and ends with each arcnum sequence comparison made, but excludes any nested PRUNE-WEIGHT time.

PRUNE-WEIGHT—the CPU time involved in prune-comparison decisions which begins and ends with each sub(integer-string)-element comparison within an arcnum sequence.

PRUNE-ACCUM—the CPU time which is required to accumulate all of the snippets of arcnum sequences of 2 threads for which an arcnum sequence comparison must be made.

Bucket profiling—A profiling technique which uses the equivalent of Java™ interrupts (higher priority thread ending a brief sleep period) which occur every 2 milliseconds for the performance profiling of the test results of the examples. At each "interrupt" point, the profiling class checks to see which 'bucket' the automata engine is currently found to be in, and increments a counter for that 'bucket', so that at the end of the profiling period, a report of what percentage of CPU time is spent in each 'bucket' can be generated. These reports are used to generate the CPU time results of FIGS. 6, 7, 8, 13 and 16.

Built-in primitive—As in the 'first invention', the Pattern primitive data-type is a "built-in", immutable primitive type, such that all regular expression compositions, including production-rule instantiations, 'capture-patterns', 'do-patterns', and certain literals, are type-compatible with the Pattern data-type. This property, as described in section 8.9.1.3, facilitates the usage of a low-level Pattern object as an 'automata cache key' (discussed in section 8.9.1.1).

Capture-pattern—A regular expression grammar form of the 'first invention' which resolves to a low-level 'do-pattern', and which allows capture into a scoped string variable of any 'recognition-unit'/Pattern-expression, at any composition-nesting level. There is a transformation from a 'capture-pattern' to a low level 'do-pattern', and in turn from low-level 'do-patterns' to instruction arcs which contains capture-instructions. Capture instructions contribute to the 'overhead bucket', because some additional work must be done to associate the stream position of the points of capture with the capture instruction.

Choppiness—Given the 'linear algorithm' of the 'first invention' (which the present invention shares) and given the 'automata caching' algorithm, 'choppiness' of an automata is a primary runtime performance characteristic of a tokenization/recognition solution delivered in the language of the present invention. Less 'choppiness' is observed when an automata thread traverses a greater number of character arcs between instruction arc traversals. Less 'choppiness' of the problem and its solution script generally implies faster automata, due to less automata thread spawning and pruning. The present invention ensures that to as great a degree as possible, 'choppiness' is a property of the tokenization requirement and the 'recognition units' of the 'document classification', that is, the automata thread insertion points of side-effects (due to 'do-patterns' and 'capture-patterns') and not an implementation artifact. The implementation of the present invention has tuned the translation of the "this pointer" for member (non-static) production rules, so that (virtual) member production rules which instantiate one another other do not contribute to 'choppiness' so long as the (implied) "this pointer" is not actually used for side-effects in the most derived versions of the production rules (section 8.9.2.3). The 'choppiness' of a solution can be inferred primarily from the 'arcnum statistic' and the 'thread-count statistic' (see the AntiDFA section which discusses how to avoid solution techniques that produce unexpected 'choppiness').

Class—As in C++, a collection of data elements and function members defined as a structure. However, in the present invention, because there are no private and public visibility operators, the class keyword is not offered, rather the struct keyword, is used to define a class. This does not prohibit future implementations from incorporating the class keyword and private and public visibility operators. Throughout this document, the word "class" will be used interchangeably with the word "struct".

Constructor—As in Java™ or C++, it is possible for the programmer to define a member constructor function (with optional parameters) which is automatically invoked in new statements, according to the following syntax—new MyStruct(param1, param2, ... ). The syntax of the constructor declaration is most similar to that of Java™, except that the keyword constructor replaces the name of the struct/class in the declaration body of the constructor.

Construction cost—refers to the cost of subset construction for any tokenize statement of the present invention. The present invention has not optimized subset construction in any way, yet performance claims are still made for the 'document design pattern', because 'automata caching' permits automata re-use, thereby amortizing the cost of subset construction. By virtue of the feature of 'automata caching', which amortizes 'construction cost', the 'linear algorithm' dominates the performance metrics, even for large automata, so long as the 'document design pattern' is being used, and so long as the same 'document-level production rule' is re-used to process additional documents.

Correlated statistics—see 'automata statistics', 'automata buckets', and 'derived factors' for an explanation of how certain 'statistics' and 'buckets' are correlated through 'derived factors'.

Cycle-size/cycle-stream—a 'cycle-stream' is a special type of inputstream created for the purpose of profiling the present invention, whereby the entire file upon which this stream is based is read into memory, and the source stream is then mathematically (through modulus arithmetic) simulated to be concatenated onto itself enough times to reach or exceed a given number ('cycle-size') of "goal" characters for the 'cycle-stream', which for the purposes of profiling the present invention, is set to 400000. Thus a stream of size 40001 will be cycled 10 times for a total of 400010 characters, thus comprising the actual document tokenized. This technique ensures that issues relating to file i/o and character decoding (Unicode) are not manifested in the profiling results, and that each character fetch from any such "cycled" stream is accomplished in constant time across all examples (outside of issues related to Java™ garbage collection).

Deep equality—refers in the present invention to the matching technique used to match FORTH-level Pattern objects on behalf of "gets" and "puts" to the 'automata cache'. Pattern objects are hash keys in the 'automata cache'. The keys are matched based on deep-equality, and a deep-equality match result of true implies that all of the instruction arcs and all of the character arcs of the resulting automata will be the same whenever two low-level Pattern objects match, so that rather than constructing the automata once again, it can be fetched from the cache.

Default constructor—When no parameter-less constructor is defined (in the most-derived class), it is still possible to code an expression such as—new MyMostDerivedStruct( )—because the "default constructor" concept applies, ensuring that (1) the struct is created with data members set to null and with 'V-table' entries initialized, that (2) any data member declaration statements of the struct are invoked upon the "new" call, and that (3) an explicitly declared default constructor in the most-derived class of the super-hierarchy is invoked (if present). In this, the hiding rules of the grammar are more flexible than those of C++.

Default in-param—refers to a parameter of functions or production rules without any of the following modifiers—in, in out, and out. Unlike the 'first invention', the present invention treats the default in-parameter differently from the explicit in parameter for production rules—i.e. default in parameters are used for parameterizing the recognition aspects of the instantiation (character-arcs) whereas explicit in parameters are used to pass container objects (arrays and structs) for use with side-effects (do-patterns, capture-patterns), the latter affecting the instruction-arcs of the resulting automata.

Derived behavior—an OO (object-oriented) term which refers to the fact that a sub-class derives all of the behaviors (member functions) of its super-classes. In the present invention, derived behaviors include not only functions, but production rules as well. The focus of this document is on derived behaviors of production rules, a novelty relative to the art. The term 'most-derived behavior' is used in reference to a production rule (or function) of a given name/parameter signature, whose declaration is often found in the super-most class of the hierarchy, and specifically for which there are no name/parameter signature matches for a member declaration in any sub-classes of its declaration point. It is recommended in the present invention to put recognition characteristics (i.e. the matching regular expressions) in less-derived production rules, and to put side-effect characteristics (do-patterns that affect data members) in more-derived production rules.

Derived factor—There are 10 such factors associated with the 10 correlated 'buckets, and one such factor for the CHARS 'bucket'. The CHARS 'derived factor', denoted as $F_{CH}$ in section 8.7.1, is associated with a "synthetic" statistic of 1.00000, since there are always exactly 1.00000 character fetches per character fetch. The other 10 'derived factors' associate a correlated 'bucket' and correlated 'statistic' of the same name as described in section 8.7.1. All factors are in units of milliseconds, which, when multiplied by the corresponding 'statistic', produce an estimate of the time expected to be spent in that bucket during automata execution per million characters processed. These factors are seen as being largely independent of automata and document, but rather a property of the Java™ virtual machine (and ultimately a natively compiled FORTH engine) selected for execution of the invention, as well as the CPU speed of the machine being used for the test runs. A factor is calculated (for each example) by dividing the number of milliseconds spent in the 'bucket' corresponding to that factor (per million characters) by the corresponding 'statistic' observed for that 'bucket' in that example. The observed 'statistics' vary greatly from example to example, while the inferred (calculated) factors do not. Because derivable estimating factors exist for a given Java™ virtual machine (1.3.1_07, Hotspot off) and "Linux-box" CPU speed (2.4 gighz), the following inferences can be made: (1) factors scale down as CPU speeds increase, (2) factors are reduced by a C++ port of the FORTH engine and automata engine, and although the relative values of the factors would not necessarily scale proportionally with a C++ port, derivable factors would exist under such a ported engine, (3) factors are used along with 'statistics' to help the programmer tune his/her regular expressions to improve "pinning specificity" of the production rules used to recognize a document within a document classification, as seen in section 8.6.1, (d) once a solution has been tuned based on a set of 'derived factors' such as those presented by example in the present invention, Hotspot can be turned on, which will change the overall performance of the 'document level production rule' against a 'document classification', but will not at all alter the 10 correlated 'statistics' used to derive these factors (against a particular test suite), and will thus not affect the degree of 'pinning specificity' of the solution delivered.

Destructor—not supported in the current implementation of the present invention. However, as a garbage-collected scripting language, the term "finalize" is more appropriate to describe the counterpart to the constructor. Subsequent versions of the invention may include a finalize grammar, allowing easily coded cleanup of system resources as well as allowing other programming short-cuts.

DFA maximum speed—see 'automata maximum speed'.

Document classification—a group of related documents to be processed by a document level production rule for tokenization. If the documents within the classification are sufficiently well-formed (such as a subset of XML documents, HTML documents, or source code documents), a group of production rules can be defined in a "Base" class in order to recognize/tokenize the various individual recognition units within the classification.

Document design pattern—the design pattern espoused in the present invention, the adoption of which involves several steps, or "aspects". The end result (and defining aspect) of the 'document design pattern' is that for each tokenization requirement in each different 'document classification', there exists exactly one class/struct inheritance hierarchy, and within this hierarchy there exists one (normally parameter-less) member production rule, with a name such as DoEat< >, whose instantiation is sufficient to tokenize any single document in the 'document classification'. Solutions to complex problems will often be delivered via multiple classes in a class hierarchy. The recognition work of such a DoEat< > production rule should generally be decomposed into production rules that match the 'recognition units' of the 'document classification', and those rules declared in base-classes. The side-effects of such a DoEat< > production rule (and its decomposition) should be incorporated into more/most derived classes, as new versions (according to same name/parameter signature) of the various virtual production rules of the base-classes. Whereas in the 'first invention', in out and out parameters of production rules were critical to the incorporation of side-effects, in the 'document design pattern' espoused by the present invention, side-effects will generally be applied to data members of the struct/class, via the implicit "this pointer" concept and its implementation analog, the 'this global'. By following the 'document design pattern', the programmer is assured that the performance characteristics of his/her solution is primarily a function of the programming problem (the document structure, its tokens or recognition elements, and the level of detail of tokenization/extraction required). Exceptions to this problem-centric performance characteristic are discussed in the AntiDFA examples (section 8.6.1) and the AntiLinear example (section 8.6.3).

Document level production rule—refers to production rule(s) whose definition(s) match/recognize the largest portion of the document (normally the entire document).

Do-pattern—refers to a special regular expression grammar form of the present invention (introduced in the 'first invention') which allows a programmer to wrap any regular expression with side-effect generating statements (termed 'pre-stmt list' and 'post-stmt list'), such that the compiled pre- and post-statement lists ultimately get executed if, any only if, the sub-expression of the composition is traversed by the "winning" thread, subject to the ambiguity resolution rules described in the 'first invention' (which rules have not changed in the present invention). Note that the 'capture-pattern' of the present invention, as also introduced in the 'first invention', resolves to a low-level 'do-pattern'.

eof2—A new keyword of the present invention relative to the 'first invention', allowing the programmer to use eof as part of an elemental 'recognition unit' and eof2 as part of the 'document level production rule'. Such usage can often be an effective tool in minimizing the values of the 'thread-count', 'arcnum', and 'accept' statistics, as demonstrated in the CountLines example. The eof Pattern literal matches the first eof-sentinel when the end-of-stream has been reached, and the eof2 Pattern literal matches the second (and last) eof-sentinel when the end-of-stream has been reached.

Execution time dominance—as a result of the 'automata caching' algorithm and other factors, this is a characteristic of the 'document design pattern'. For example, when the 'document design pattern' is applied to XML documents, so long as the automata can be constructed (fits in memory) and is re-used (i.e. the same script or most-derived library class is used many times to tokenize several document instances), then automata construction time is effectively amortized.

Faster measures as slower—an effect of turning on Java™ Hotspot mode, in which after optimizing a bottleneck of a Java™ program (such as areas of the automata execution engine), that bottleneck can actually measure as slower within the context of the entire program (although normally it will measure as at least somewhat faster), because the Hotspot compiler focuses its attention elsewhere (as it should). Just as the best way to measure the success of an optimization against a bottleneck is with Hotspot off, so must the 'derived factors' be determined with Hotspot off.

Finite automata (or automata)—a graph of nodes, connected by arcs that represent a transition from one node to another. The automata of the present invention (and the 'first invention') includes 2 types of arcs—recognition arcs labeled with characters or character-classes (matching the next character from the input stream) and instruction arcs, permitting a spontaneous transition to the destination node with the simultaneous accumulation of side-effects. The "null transition" of the art is a special case of an instruction arc with no instructions. When nodes marked as "accept" nodes are reached, a match against the stream has been found. In practice, finite automata are used to implement regular expressions.

FORTH—see 'virtual machine'.

FORTH array—the low-level representation for all array data-types defined in scripts (in both the present invention and the 'first invention'). Also used in the present invention to model user-defined structs in the FORTH VM.

FORTH proc—the low-level representation of functions, loop blocks, if-else blocks and the like (in the present invention and the 'first invention'), also used in the present invention to model production rule 'instantiator-procs', so that rule instantiations can be accomplished polymorphically through a 'V-table' element of the struct-array.

FORTH instruction—implies that the FORTH words of a translated script resolve ultimately to a sequence of integer instructions. Analogous to the byte-code instructions of Java™. Sometimes a FORTH instruction requires 1 or more instruction parameters (also integers) to go along with the instruction opcode. In the 'instrs-per-chars statistic', a 3-word instruction consisting of 1 opcode and 2 parameters is counted as 3 instructions.

FORTH word—refers to the space-separated strings generated by the Script Translator. There is often, but not always a 1-1 correspondence between a FORTH word (string) generated by the Script Translator, and a FORTH instruction integer.

FORTH x-array—or FORTH executable-array, same as a FORTH proc, which resolves to an array of FORTH instructions.

Function-level production rule instantiation—as opposed to 'nested production rule instantiations', these instantiations occur anywhere other than within the body definition of another production rule, often at function scope. Function-level instantiations require binding of parameters to the instantiation, an added overhead not required for nested instantiations, which simply pass parameters through the 'template frame'. Therefore, function-level instantiations should be kept to a minimum, ideally, appearing only as instantiations of document-level production rules within the tokenize statement. Avoiding the additional overhead of a function-level production rule instantiation is an important motivation for adopting the 'document design pattern'.

Global scope—synonymous with 'static scope', defined below.

Hiding—a term which relates to name-space scoping, which (in the art) allows the programmer to re-use variable names, such that variables declared in inner scopes hide variables declared with the same name in outer scopes. However, the present invention applies the same technique not only to variable definitions, but also to the name-space scoping of structs, functions, and rules, such that rather than name collisions (for user defined names of the same meta-type) in the present invention, there is hiding. The four meta-types which support name-space scoping are—variables, structs, production rules, and functions.

Hotspot—a term used in conjunction with the Java™ virtual machine, in which the virtual machine can selectively compile byte-codes into native code during runtime, giving performance boosts of from 10:1 to 20:1 depending on the version of the Java™ virtual machine and depending on the nature of the application bottlenecks being optimized by this technique. The Java™ Hotspot feature must be turned off during 'bucket profiling' because the performance boost is not even across all areas of automata execution, which is related to the 'faster measures as slower' effect.

Inheritance—a well-known OO term, meaning that a subclass can inherit and extend any of the behaviors of its super-class(es). Inheritance is accomplished in the present invention with the extends keyword, as in Java™. The present invention extends the OO concept of inheritance to member production rules.

Inline function—in the present invention, a special type of function declaration for a function which has no function body, only a parameter list, replacing the function keyword with an inline keyword. When the 'translator module' translates a function call for an 'inline function', it does so as follows—rather than creating the FORTH which references the global address of a compiled function (followed by invoking it), an inline call simply drops an inline String constant into the FORTH translation output. This "dropped-in" string constant includes 1 or more FORTH-engine atom-words which implement the inline functionality. The Java™ analog to 'inline functions' is provided by the JNI (Java™ Native Interface).

Instance variable—a variable, which references a struct-array representing a class object. The data-type definition of the instance variable can (through widening) belong to any of the super-class definitions of a given struct object. Within a virtual production rule member (which at 'global-scope' is always instantiated from an instance variable), the 'this global' contains the value of the instance variable used to instantiate the rule. Within virtual member definitions (production rules and functions), a this keyword is supported, which is a built-in instance variable for invoking other members of the struct hierarchy, sometimes needed to circumvent variable name hiding, and sometimes needed (with calls/instantiations) to avoid the 'V-table'. The super keyword is another built-in instance variable, allowing the explicit invocation/instantiation of member functions/production rules in the super-class hierarchy, rather than having the call/instantiation routed through the 'V-table'.

Instantiation—refers to production rule instantiation. One type of instantiation is at function level, which means that the actual parameters passed into the rule are bound into a FORTH-array and this FORTH-array is in turn bound into a TmplGrammar object (discussed in the 'first invention') that represents the instantiation. Nested instantiations are quite different in terms of implementation, subject to optimizations which lessen the degree of 'choppiness' (section 8.9.2.1).

Instr-per-chars statistic—refers to the ratio of (a) the number of FORTH instructions generated as side-effects during automata execution, divided by (b) the number of characters processed from the input stream during same. This ratio, as reported by 'performance diagnostics', reflects the aggregation and execution costs of the side-effect instructions required to complete the tokenization. A larger number means a greater cost due to side-effects. This performance cost is primarily a function of the problem statement and not the solution delivered (because only the instructional side-effects of the winning thread are accumulated and executed), which is why this cost is not considered among the other 'automata statistics' for determining 'bucket factors'.

Instruction—same as 'FORTH instruction'.

Instruction arc—a type of automata arc which behaves like a spontaneous (null) transition, except that the execution thread (upon traversal of an instruction arc) accumulates (queues) any instructions, which label such an arc, as side-effects. In the present invention (versus the 'first invention'), instructions can also label character arcs.

Java™—a trademarked programming language and virtual machine of Sun Micro-systems, Inc. The significance of Java™ to the present invention is as follows: (a) Java™ and C++ both serve as grammar reference points, in that the basic grammar of the scripting language of the present invention is modeled after both, in particular the C-style expression syntax (with its novel application to regular expressions) and additionally the object-oriented grammar elements; (b) the FORTH engine, automata execution engine, and translator module are all currently written in Java™; (c) the Java™ Hotspot compiler must be turned off during the performance metrics test run, reducing 'automata maximum speed', but significantly improving the uniformity of the test results, the goal being to 'derive factors' that correlate 'statistics' to 'buckets', demonstrating the usefulness of 'statistics' in predicting overall performance of automata.

Library—a term given to any script written with the expectation not only of re-use, but also of being loaded into the name-space (subject to hiding rules) of another (loading) script.

Library loading—the process and grammar for loading the definitions of one script into the name-space of another. The term "load" is used rather than "include" because of the shared nature of the translated FORTH. All of the load statements must come before any other non-comment statements of a script. In terms of name-space scoping and name hiding, the 'translator module' looks first in the script itself, and then in loaded scripts in inverse order of the load statements to resolve name-token references to structs, variable names, function names, and production rule names.

Linear algorithm—the novel runtime automata execution algorithm of the 'first invention', including its pruning techniques, which ensures that once an automata has been constructed (subset construction time has not been optimized and is not linear in the present invention), the automata execution time is normally linear in the size of the input stream (also assumed is the 'document design pattern' which involves a 'document-level production rule' whose purpose is to "eat" the entire document). This algorithm was shown (within the algorithms section of the 'first invention') to be worst case N-squared in the size of the input stream. In the example section 8.6.3 of the present invention, an example is offered to demonstrate N-squared behavior, and some factors that cause this to happen. Contrast this with the art, such as Perl, in which nested indeterminate repeat expressions with side-effects (which yield recognition variables such as $1) can be non-finishing unless carefully coded. This linear characteristic of runtime automata execution is so important to the present invention because of the espousal of the 'document design pattern', in which all of the chores of parsing, recognition, extraction, and tokenization are ultimately decomposed from one document-level production rule. In practice, such decomposition involves many levels of nested indeterminate quantifiers and side-effects, thus making the 'linear algorithm' a key factor in performance. This linear property is required in order to advocate the ubiquitous use of the 'document design pattern'. A key statistic from which to judge linearity is the 'prune-arc statistic', which is normally a characteristic of the automata and the documents being recognized and not the size of the documents. If on the other hand, the 'prune-arc statistic' can grow with the 'cycle-size' of documents, then N-squared behavior is exhibited (see the AntiLinear section).

Load statement—See library loading.

Median estimate—a composite estimator chosen from observed estimates of 'derived factors' of FIGS. 9 and 10. The term "median" is used because a value is chosen somewhat near the median value. The chosen value is also rounded to a multiple of 25. Estimates from FIGS. 9 and 10 which correspond to greater elapsed 'bucket' times (FIGS. 6 and 7) are given more weight in the selection process, so that 'median estimates' of 'derived factors' can produce a quality estimate of 'DFA maximum speed' as seen in FIG. 13. The chosen estimates for the correlated 'derived factors' are shown in the top row labels of FIGS. 11 and 12. The estimate for the CHAR 'derived factor' (FCH of section 8.7.1) is chosen as 550 (millis/million chars), based on a study of the CHARS column of FIG. 8, for which 550 is somewhat near the median value of this 'bucket'.

Member visibility—refers as in standard C++ and Java™ to the 4 possible visibilities—default, public, private, and protected. In the present invention, there is only default visibility, which is the same as public, and the public, private, and protected keywords are not currently supported, although subsequent versions may support such visibility grammar forms.

Most derived behavior—see 'derived behavior'. The term 'most derived behavior' applies with both virtual member functions and virtual member rules in that the most derived behavior for any member for a given object instantiation is not based on the current data-type of that object, but on which actual class was used to construct it with the new operator. The most derived behavior is determined by the object's actual data-type (though it may have been widened in assignment to another variable/parameter). The most derived behavior is the definition (function or production rule) for which no signature/name-matching definitions are found in any sub-classes.

Multiple inheritance—applies to structs which extend more than one super-class and all of the behaviors in each. This feature is not offered in the current implementation of the present invention.

Name-space scoping—well-known in C++ as pertains to variables, in that scoping precedence of variables proceeds from the innermost (block-scope) to outermost (static scope), such that for variables used within a member function of a struct, the 'translator module' attempts to resolve that variable name first in block-scope(s), then function-scope (parameter list), then data member scope, and then 'global-scope'. This technique of the art allows variable hiding, to save the programmer from always creating and assigning a singularly unique name to each variable in his/her program. In the present invention, name-space scoping also applies to the names of structs, production rules, and functions. This is somewhat different from C++ and Java™, which typically do not allow or resolve name collisions for struct names.

Narrowing—unsupported in the current invention, narrowing would be the opposite of widening, and would involve the assignment of a less-derived struct to a more-derived struct, which may not in fact be possible if the less-derived object does not include the behaviors of the more-derived variable's expectation. Narrowing is a source of runtime casting exceptions, whereas widening is always successful at runtime if allowed at translation time.

Nested production rule instantiation—production rules which are instantiated within the declaration body of another rule. There can in fact be multiply nested instantiations within a particular body, such as the very complex example adv4.tok in the 'first invention'. Such nested instantiations are optimized, especially with respect to the 'this global', as well as when a production rule's parameter list includes only the default parameter variety, in ways that ensure that 'choppiness' due to side-effects is lessened (section 8.9.2.1).

NFA—or, non-deterministic finite-automata. Two conditions cause a finite automata to be non-deterministic—the existence of at least one instruction-only or null arc, called a null or spontaneous transition, or the existence of a node, from which there are two or more arcs (labeled with different instructions) for the same character. The meaning and significance of this designation is that the automata thread which is traversing an automata relative to the input stream cannot determine a single valid transition, but must spawn thread(s) to try all valid transitions. More so than in other regular expression languages, the grammar of the present invention encourages the embedding of side-effects into regular expressions (based on the 'document design pattern'), resulting in automata which are normally, to some degree at least, non-deterministic. The goal of a good programmer should be to keep the degree of NFA-ness to a minimum by choosing regular expressions which maximize the specificity of 'recognition units'. This idea is explored in the AntiDFA examples (section 8.6.1) as well as the AntiLinear example (section 8.6.3).

OO Design—a very broad term that encompasses all well-known "object-oriented" design techniques in computer programming. In the present invention, the featured OO technique is polymorphism, for which a novelty is explored, that of applying polymorphic techniques to regular expressions which have been encapsulated as production rules.

Package—There are no packages in the present invention, such as in the Java™ language. Instead, the programmer can use package-like name-tokens when defining structs, functions, or production rules at static scope. This is done with the :: operator, by separating name elements of the struct, function or production rule with ::, as much as desired. However, this is truly a naming syntax for name-tokens, in that there is no implied package-scoping mechanism currently offered at the script level, although there could be in the future. An example of package-like naming in the present invention is the definition of system::println(String) in the SYS.TOK script library.

Pinning specificity—a concept illustrated by several of the 10 correlated 'statistics' and discussed in the AntiDFA section, in which the various composition elements of the document-level production rule rely as little as possible on the ambiguity resolution rules of the union, repeat and concatenation operators. Sometimes the document classification makes it unnecessary for the programmer to be concerned with this, such as with the XML and HTML data languages which were designed to be reasonably "parser friendly". Other times, the problem being solved is of sufficient complexity (such as the CountCommentChunks example) that the pinning specificity of the solution can be dramatically effected by the proper use of the subjunctive, the 'signaling find rule', and other factors. The term implies that when a programmer is most successful at reaching "maximum" pinning specificity, then the automata engine, as it traverses the various boundaries of 'recognition units' (as seen from the reference point of the "winning" thread), spawns a minimum of additional threads at these points, and if spawned, such additional threads have a very short duration relative to the next 'recognition unit' boundary point.

Placement operator—see the definition of the @@ operator.

Polymorphism—a term that encompasses a number of properties—(a) virtual class members (both functions and production rules), which implies (b) inheritance of super-class behaviors, which includes (c) the ability to create more derived behaviors for member functions and rules (especially through use of the super keyword), and which supports the feature (d) that when an instance of a most (or more) derived struct is passed/assigned to a variable expecting a less-derived struct (one of its super-classes), invoking/instantiating a virtual member (from the base-class-typed variable) will invoke/instantiate the most derived member in the hierarchy for the actual object (via the 'V-table'). As with Java™, non-static members are always 'virtual', meaning that (d) is always supported for non-static members, whereas in C++, polymorphic members may or may not be made 'virtual', by choice of the programmer.

Post-list statement—refers to the second list of (side-effect producing) statements in a 'do-pattern'.

Pre-list statement—refers to the first list of (side-effect producing) statements in a 'do-pattern'.

Production rule—as in the 'first invention', refers to the fact that a regular expression can be encapsulated as a production rule, including possible parameters, for re-usability purposes. However, the present invention offers the following added benefit: that with or without explicit parameters, a production rule can be defined as a virtual (non-static) member of a struct, allowing side-effects to be coded based on the implicit "this pointer" (a hidden parameter of that rule). Such a production rule is therefore polymorphic, permitting more derived variations of this production rule to be declared in sub-classes, generally for the purpose of "mixing in" tokenization/extraction side-effects.

Production rule instantiation—instantiation of a production rule in the present invention is more like a function call than in the 'first invention'. However, it still involves the use of a 'template frame' stack (introduced in the 'first invention' as separate from the function frame stack), so that instantiation is a better term. Instantiation involves the passing of parameters to a production rule expecting those parameters. Nested (inner) instantiations are those occurring in the body definition of another production rule, which are treated differently from function-level instantiations, the latter involving the binding of parameters to the FORTH-level instantiation object. Nested instantiations are more like function calls (but using the 'template frame' instead of the function call-frame) whereas function-level instantiations are instantiations in the truest sense.

Production rule polymorphism—a novelty of the present invention, production rules can be polymorphic, in the sense that like functions, they can be declared as virtual (non-static) members of a struct, and then given more-derived behaviors in sub-classed definitions. As with virtual functions (whose function pointers are stored in the 'V-table'), the FORTH-level instantiator-proc for a non-static production rule is stored in the 'V-table' elements of the struct-array.

Prune-length statistic—an uncorrelated statistic, which is shown in the $4^{th}$ data column of FIG. 5, this statistic can be used to quickly diagnose a regular-expression solution which is producing N-squared behavior. The prune-length is an average of the number of arcnum-sequences which are compared averaged across all prune(comparison)-events (and therefore usually different in value than the 'prune-arc statistic' which averages the comparison distance across all character positions). In the case where an expression has reached a state where it is repeatedly comparing all the way back to the front of the document (or earliest entry into this "state"), then the average could reach one-quarter to one-half the length of the document, as discussed in section 8.6.3, rather than being related to the average length of a recognition unit.

Recognition unit—a term of the present invention referring (within the automata execution algorithm) to a succession of characters traversed between instruction arc traversal points, and referring (within the 'document design pattern') to the production rules of the "Base" class. This term relates to the definition given for 'choppiness', in that for problem domains and requirements of greater 'choppiness', the average 'recognition unit' wrapped immediately in side-effects will be more fine-grained. A recommended coding habit in the grammar of the present invention is to identify 'recognition units' of the problem domain (independent of tokenization requirements) and to create a virtual (non-static) production rule for each 'recognition unit' in a Base class. Collectively, the 'recognition units' of the Base class should imply a document composition hierarchy, and include one or more document-level production rules that treat the entire document being tokenized as a 'recognition unit'. That is, the 'document-level production rule' is a 'recognition unit' which matches any well-formed document belonging to the 'document-classification'.

Regular expression—a class of programming language expression grammars consisting of literals and operators, used to compose patterns for matching against streams. In the present invention (as well as in the 'first invention'), the term regular expression is synonymous with any expression that is type compatible with the Pattern primitive data type, and therefore includes instantiated production rules.

Regular expression matching—occurs through deep-equality comparisons on behalf of the 'automata cache'. Matching of two FORTH-level Pattern objects involves the matching of both side-effect characteristics (which generate instruction arcs in the output automata) and recognition characteristics (which generate character/character-class arcs in the output automata). The matching proceeds recursively, because such low-level Pattern objects, which model regular expressions, can recursively contain more such objects, forming an expression tree.

Side-effect accumulation—reflected in the correlated 'instr statistic', such an event involves the accumulation (to an extant automata thread) of a reference to an x-array snippet of side-effects encountered during an instruction-arc transition. Alternatively, such an event can occur during a character-arc transition which includes an instruction-snippet reference.

Side-effect aggregation—reflected in the uncorrelated 'instr-per-char statistic', such aggregation is part of the 'OVERHEAD bucket'. This process involves the following steps: (1) aggregation of all of the instr-snippets which where accumulated to the winning thread during automata tokenization, (2) the further resolution of any capture points, and (3) the production of a FORTH x-array as the output of the tokenization process.

Side-effect parameter—in contrast to a 'default in param', a 'side-effect param' is any parameter to a production rule with any of the following modifiers: in out, in, and out. Such parameters to production rules are not for use in building recognition elements of the regular expression, but instead are to be used in 'capture-patterns' and 'do-patterns', to allow the co-generation of side-effects along with recognition. This novel feature of the 'first invention' is core to its power of expressivity, and in the present invention and the 'first invention', the proper inclusion of side-effects through the use of such production rule parameters (in 'do-patterns' and 'capture-patterns' of the body of the rule) can be done at any composition depth within the document-level production rule. For example, an in param might contain a pointer to an array, and a 'capture-pattern' could specify capture into this array within the production rule. Note that there is actually an invisible side-effect parameter of every virtual production rule member of a struct, which is the 'this param'. Examples presented herein use the implicit 'this-param' rather than the above 3 side-effect parameters for "counting" and "capture" side-effects.

Side-effects—refers to the FORTH instructions accumulated during automata execution and traversal. The side-effect instructions accumulated by the winning automata thread will be immediately executed by the FORTH engine after the winning thread is selected (based on ambiguity resolution rules).

Signaling find-rule—a 'global-scope' production rule defined in the library FIND.TOK, and discussed in section 8.5.2. This variation of the Find< > rule has two pattern parameters: the $1^{st}$ parameter is the Pattern which is to serve as a "signal" that the target Pattern (the $2^{nd}$ parameter) is about to begin. This rule is especially useful when the target of the Find< > is a union of 'recognition units', each such unit being itself Find< > based, whose endpoints are two brief sentinel strings, such as "/*" and "*/". Such a union of targets can interleave its elements, and in this case, the signal of the 'signaling find-rule' should be the union of the 'begin-sentinels' for each of the targets. When searching for a union of interleavable targets, this rule gives accurate results, behaving like a Perl non-greedy quantifier, and creating a high-degree of 'pinning specificity' for the find.

Single inheritance—In the present invention, only single inheritance is supported, meaning that a class/struct definition can inherit from (extend) at most one other struct.

Super keyword—a keyword which is available within constructors, virtual member functions, and virtual member production rules. The super keyword allows the definition of a constructor body, function body, or production rule body to include a behavior defined by (or implicitly inherited by) its immediate super-class in its definition. The super keyword is treated as a special instance variable which refers to the nearest explicitly declared signature-matching member found in the inheritance super-class hierarchy. This feature is more flexible than in Java™, in which the super keyword limits the signature-match search only to the immediate super-class. As with the this keyword, the selected behavior is not invoked through the 'V-table'.

Static member—in normal practice, when production rules and functions and data elements of global/static implications are most closely associated with a given struct (versus belonging to 'global-scope'), they should be defined inside the struct, but defined using the static keyword modifier. These members behave as if defined in 'global-scope', but are accessed (from 'global-scope'), as in Java™, first with the name-token of the struct, followed by the. (period) operator, followed by the member name-token. Caution must be exercised when choosing to make a production rule static—such a rule cannot be further derived to insinuate side-effects in a sub-class. A proper use of a static production rule is shown in the BASE.TOK class as pertaining to string literals (section 8.5.3) in which the non-static string literal rules StringLit< > and CharLit< > are composed from a static rule—CharLit<char term>—the latter being viewed as a "helper-rule" rather than a "recognition-rule."

Static scope—also called 'global-scope', this term implies the division of the name-space of a script into two scopes—struct-scope and non-struct scope. The non-struct scope is referred to as 'static-scope' (or 'global-scope'), and applies for all variable definitions, production rules, and functions defined outside of any struct-declaration. With variables defined in 'static-scope', the static keyword must be used. With functions and production rules defined in 'static-scope' (or 'global-scope'), the static keyword is not to be used, rather to be implied. The 'first invention' had only the 'static-scope'.

Statistic—see 'automata statistic'.

Struct—Essentially the same as a class. In the present invention, there is currently no class keyword, therefore classes/structs are defined with the struct keyword. The logic in this is that private and public visibility keywords are not currently supported, and so the convention of C++ is followed, whereby a class definition based on the struct keyword is the same as a class definition based on the class keyword, except that when using struct as keyword, the initial member is assumed public. In the present invention, since all members of a struct are publicly accessible from any other script locale, it is suitable to follow C++ conventions, by using the keyword struct as the keyword to define structs, rather than the keyword class. Throughout the present document, the terms struct and class are synonymous.

Sub-class—a term which applies when class A (the sub-class) inherits from or extends class B.

Subset construction—a technique of the art for converting an NFA to a DFA, allowing more efficient execution of automata. In the present invention (and the 'first invention'), subset construction is used to create more efficient NFAs, as well as to solve the convolution problem associated with subjunctive expressions.

Super-class—a term which applies when class A inherits from or extends class B (the super-class).

Template frame—a VM abstraction from the 'first invention', which is extended in the present invention to include set/remove/load/restore semantics, to allow a production rule's 'template frame' (referencing the variables local to each instantiation nesting-level) to find the proper frame context (in cases where necessary). Such unpinning of 'template frame' context can be necessary as demonstrated in section 8.9.2.5. In the 'first invention', the template frame stack had in normal usage only one frame at any given time, because instantiation was done at translator-time, and the frames effectively unrolled, so that this feature was not necessary. However, in the present invention, because of the need for virtual production rules, the instantiation is deferred to FORTH-time, and thus there is normally a separate template frame for each nested rule instantiation—thus creating conditions that require "context unpinning".

This global—the 'this global' is a global variable (specially reserved at the FORTH engine level) which is loaded and restored when virtual member functions are "called" and when virtual member production rules "fire", such that before such a function or rule "fires", the pointer to the struct-instance to which it belongs is loaded into the 'this-global'. An optimization within the 'translator-module' ensures that for production rules, manipulation of the 'this-global' at side-effect time is kept to a minimum, and in particular, does not occur for simple 'recognition-only' rules. This optimization helps to ensure that instruction-arcs insertion points only occur when side-effects are intended by the programmer for a particular recognition unit—helping to reduce 'choppiness' and to increase 'DFA-ness'.

This keyword—refers to the special this keyword used within constructors, virtual member functions, and virtual member rules, which allows other constructors and virtual members in the same hierarchy to be invoked therefrom. Also allows explicit reference to a data member when a parameter (to the rule or function) has the same name. In the present invention, the this keyword behaves like a special instance variable, very similar to the super keyword, except that the scope of the search also includes the class in which the this keyword is used. Therefore, the this keyword, for function calls and production rule instantiations, does not yield a virtual member access, behaving somewhat differently semantically than a virtual invocation (without explicit use of the this keyword).

This pointer—refers to a hidden parameter of virtual member functions and rules which points to the struct-array instance variable from which the instantiation or call is made. Within the body of the production rule or member function, the "this pointer" is contained in the 'this global', and allows that function/rule to access any non-static element of the struct (data, function, or rule).

Translator module—the software component of the present invention (also described in the 'first invention') responsible for translating any script of the present invention into FORTH token-words to be "handed-off" to the FORTH interpreter for translation into FORTH instructions, ultimately allowing execution of a script. Significant additions were made to the 'translator module' to allow the translation of object-oriented elements of scripts into FORTH tokens—that is, to allow the definitions of structs and their elements, and to map these definitions into FORTH.

Virtual class member—In the present invention, as in Java™, when a member is not explicitly given the static keyword modifier, it is virtual by default. This means that a reference to the actual FORTH-level function to be invoked is stored in the struct's FORTH-array, so that the most-derived version of a member is invoked, even when the instance variable referencing the struct is declared of a less-derived type. This property relates to the novel polymorphism of the present invention, applying not only to member functions but also to member production rules. A virtual call/instantiation is made whenever a non-static member is invoked (from another virtual member) without the use of an instance variable, in which case that virtual invocation is from one member to another in the same struct, through the 'V-table'. Invocations/instantiations using the this keyword or super keyword are not virtual, meaning that they are done by global reference rather than the 'V-table'. All other invocations/instantiations of non-static members (such as if made in 'global-scope') through an instance variable name, followed by the . (dot operator), followed by the member name (and parameter list) are virtual (through the 'V-table'). The above description follows general OO conventions, except for the non-virtual aspects of the this and super keywords.

Virtual Machine (VM)—in the present invention, refers to the VM engine, and the FORTH-like VM instruction language. The term FORTH is used because the VM instruction language has some of the "look-and-feel" properties of FORTH, though it is not actual FORTH.

Virtual production rule member—in the present invention, not only functions, but also production rules, can be made either static or else virtual members of a struct. When not explicitly made static with use of the static keyword, a production rule is virtual, meaning that it is invoked indirectly, through a pointer contained in the FORTH struct-array that represents the struct (see 'V-table').

V-table—a concept known in various OO language implementations, which allows a particular (hidden) field of a struct/class object to contain a pointer to a table of all of the pointers to virtual functions. In the present invention, there is no physically separate 'V-table'. Instead, all of the addresses of (pointers to) virtual function and virtual production rule members are laid out in the struct-array in declaration order, intermixed with (non-static) data members. Because of the intermixing of virtual address pointers with data member slots in the struct-array, the present invention does not have a separate 'V-table'. However, the term is still used in this document as a moniker for the algorithm of the present invention which functions as the standard 'V-table' concept of the OO art.

Widening—the technique of assigning a most (or more) derived class object to a variable whose actual type is of a less-derived object. Also applies when passing more derived objects as parameters to functions/rules expecting a less-derived object.

8.2 Coding Conventions and Standard Grammar Variations

The following is a list of documentation conventions, as well as variations relative to standards established by C++ and Java™, and relate to the example scripts that follow.

The C-style for function declarations has been slightly altered, requiring the additional keyword function. This applies to all functions (with the exception of inline functions and constructors), whether static or virtual members of a struct, or whether declared in 'global-scope' or struct-scope. In similar fashion, constructor declarations require explicit use of the constructor keyword, and inline function declarations require explicit use of the inline keyword in place of the function keyword.

Explicit (non-implicit "this") parameters for both functions and parameterizable production rules in the grammar follow the style of various IDLs—that is, there are four types of parameters, the in parameter, the out parameter, the in out parameter, as well as parameters without a modifier. In the case of functions, in parameters and parameters without a modifier are semantically the same. In the case of production rules, (explicit) in parameters are used for inputting container objects (structs and arrays) to the production rule, such container objects intended for use in side-effects (as opposed to recognition aspects), whereas "default-in" parameters (without a modifier) are used for inputting (normally primitive) objects such as Strings, ints, and Patterns to parameterize the recognition characteristics of the automata/regular expression (as opposed to side-effects).

String literals, character literals, boolean, and integer literals are expressed as in Java™. Accordingly, the char data-type is a 2-byte Unicode character.

Character-class literals are syntactically similar to those of Perl, except embedded in single-quotes, signifying that the recognition unit size of a character-class literal is 1 character.

Arrays are defined and used as in Java™, except that arrays are automatically growable as needed, whenever an element is stored in an array.

Every variable type, even char and int and boolean, can be assigned with the null object. In fact, any variable not assigned when declared, is implicitly given an initial null value.

Casting from one type to another currently uses a syntax that looks like a function call, not the syntax adopted by Java™.

Widening from a char or String to a Pattern is done implicitly wherever necessary. Widening from a sub-class type to a valid super-class type (of that subclass) is also done implicitly with variable references.

Static blocks of code look and behave as in Java™.

system::print(myString) and system::println(myString) print to standard out. These are inline functions defined in the SYS.TOK library script.

The grammar of the present invention has greatly relaxed C's restrictions concerning the comma-separated pre-list and post-list (statement lists) of the for-statement. In fact, any valid statement of the language (except tokenize and return) can be included in those comma-separated statements; not because it is necessary to extend the capability of the C-style for statement, but because the syntax (and therefore common coding portions) of the for-statement is the same as that of the 'do-pattern', and because it is important that the pre-list and post-list of the 'do-pattern' allow almost any type of statement that the programmer wishes to use (other than tokenize and return).

Use of the super keyword and this keyword are syntactically similar to that of Java™, with the implementation variation of non-'V-table' routing discussed in the glossary section.

Data member initialization is accomplished as in Java™, not C++. That is, the initial values of a data member of a struct can be specified in the declaration statement for that member. If not specified, the initial value is null. If the initial value is to be parameterized in the constructor, it must be done by a statement within the body of the constructor, as there is no C++-like initializer list.

From within a given constructor, it is possible to call other constructors with the this and super keywords, but the syntax is a little different from that of Java™—the programmer must formulate the constructor "call" as follows—this.constructor(. . .) or super.constructor (. . .)—versus this(. . .) and super(. . .) respectively in Java™.

Load statements consist of the load keyword following by a string literal which specifies the absolute or relative path of the script being loaded by the loading script. Load statements must precede all other statements (except for comments) in any script. With load statements of multiple libraries, name conflicts are acceptable (but not acceptable for multiple, same-signature definitions within the same library), and are resolved as follows—name resolution first searches the script being translated for a definition, then searches all of the library scripts referred to by 'load statements', in inverse order of 'load statement'. There are no collisions between libraries, only hiding, and this characteristic applies to all name-token resolutions of the 4 meta-types (variables, structs, functions, production rules). In languages like C++ and Java™, it is common to use hiding for variables, but to otherwise force compile-time collisions.

8.3 Inherited Grammars

The following novel language grammar forms (relating to regular expressions) of the 'first invention' have been brought into the present invention, and are discussed in detail in the 'first invention'.

All regular expression compositions are type-compatible with a 'built-in primitive' data type called Pattern. This includes production rule instantiations.

Binary regular expression compositions use existing C++ operators (via built-in operator overloading) whenever possible, as follows: the | operator is used for the "union composition", + is used for the default "left-to-right concatenation composition", * is used both for the "repeat N or more times composition" and the "repeat from N1 to N2 times composition". These operators follow the normal binding precedence of the C++, Java™, and C languages. These operators are all left-to-right associative in the absence of parentheses, as is standard for these operators in the C-style languages. Two new operators have been introduced at the same precedence level as the + operator for explicit "right-to-left" and "left-to-right" concatenation compositions, which are <+ and >+ respectively. The two forms of concatenation specify the relative greediness of the two terms, a distinction of importance (in the presence of side-effects in one or both terms) when the two terms can compete to match 1 or more characters of the input stream at the right-boundary of the $1^{st}$ term and the left-boundary of the $2^{nd}$ term.

The ambiguity resolution characteristics of the above binary compositions are significant in the presence of side-effects, and adhere to the same principles disclosed in the 'first invention'. (1) Adding side-effects or removing side-effects ('do-patterns', 'capture-patterns') anywhere in a composition never effects whether or not other side-effects are triggered as part of the "winning" match. (2) Ambiguity resolution proceeds recursively from outer terms to inner terms, such that for any binary term of the entire composition, the choice is amongst all threads which match the same characters of the stream, and is as follows for each binary composition—for union compositions, the best "winning" thread of the first term is selected, and if none matches from the first term of the union, then the best of the second term is selected and so on; for "left-to-right" and "default" concatenations, the candidate "best" threads that allocated a different number of characters to the two terms are arranged in order of greediness, and the "left-to-right" composition prefers that thread which allocates the most number of characters to the first term, and the "right-to-left" composition prefers that thread which allocates the most number of characters to the second term; for "repeat" compositions, all threads which qualify according to N or more repeats, or alternatively, N1 to N2 repeats, are compared starting from the first repeat, eliminating all threads which matched fewer than the maximum number of characters matched for that term, and if there are two or more threads left, repeating this procedure for the next match, and so on.

The unary compositions of the grammar are—repeat 1 or more times, accomplished by the + operator (as with other regular expression languages), but with the position of the operator and modified term reversed, the operator coming first; repeat 0 or more times, accomplished by the * operator (as with other regular expression languages), but with the position of the operator and modified term reversed, the operator coming first; and the composition which "optionalizes" another expression, accomplished by the ? operator, again with the operator coming first. In all three cases, the unary operator must come first in accordance with C++ syntax.

The literal Patterns are—null, any, eof, and reject—with the following respective meanings of, "match no characters from the stream", "match any single character from the stream", "match the end-of-file sentinel character", and "match an imaginary non-existent character" (the latter effectively forcing any automata thread that "traverses" the reject literal to always terminate). Another literal has been added to the present invention called eof2, which "matches the second end-of-file sentinel" of any input stream. This distinction allows the programmer to match the first end-of-file sentinel as part of a 'recognition unit', and then to match the second end-of-file sentinel as part of the 'document level production rule', sometimes giving better performance characteristics as seen in the examples.

The 'do pattern' composition, which allows the arbitrary embedding of side-effect producing statements, as seen in the "count++" 'post-list statement' of the counting examples.

The 'capture-pattern' composition, which allows the characters matching any given composition (wrapped within the 'capture-pattern') to be accumulated as a string-object and saved to the variable (or reference expression) named in the 'capture-pattern' syntax. The scope of the capture-variable or capture-reference follows the normal scoping rules of C++ at function-level, but is also extended in the present invention to include that of (1) a 'do-pattern' and (2) an out or in out parameter of a production rule (both as in the 'first invention'). Additionally, the present invention further extends the capture-scope to include members of a struct, when the composition expression (and its 'capture-patterns') are defined in the body of a virtual member production rule, as seen in the "football example" of section 8.8.

The 'subjunctive' composition, which is a novel binary composition introduced in the 'first invention', and which has two forms—p1 but p2 and alternatively p1 but-not p2—the former using matches to p2 to qualify matches to p1, and the latter using matches to p2 to disqualify matches to p1. It is seen in examples of the present invention that performance of the 'document design pattern' can be improved by the use of the subjunctive, because of increased "specificity" relative to equivalent expressions (which match the same characters of the stream, and produce the same side-effects) formulated without the subjunctive. Of course, as demonstrated in the 'first invention', the subjunctive compositions also solve certain problems not easily solved at all without their use.

The 'parameterizable production rule', which is an embodiment of a regular expression rendered as a template, such that recognition characteristics and/or side-effects can be parameterized. In the case of recognition characteristics, another regular expression (Pattern parameter) can be passed as a formal "default in" parameter, and then used within the body of the production rule 1 or more times to form its composition. Alternatively, a String parameter, or character parameter can also be used in the same way. Similarly, boolean parameters and int parameters (of the default "in" variety) can be used to parameterize conditional expressions and repeat expressions, also allowing a single production rule embodiment to have different recognition characteristics for its various instantiations (based on different default "in" parameters). Further, explicit "in", explicit "in out", and explicit "out" parameters can be used within 'capture-patterns', 'do-patterns', or sub(rule)-instantiations within the body of a production rule definition, thus allowing the effective parameterization of side-effects. In the present invention, examples of parameterization of production rules are not shown, as this was done in the 'first invention'. Rather, it is shown herein that production rules, when they are virtual members of a struct, carry an "implicit this" parameter, which allows the body of the production rule to capture into or otherwise modify data members of the struct (side-effects).

8.4 Inherited Algorithms

The following novel engine algorithms (relating to the implementation of regular expressions) of the 'first invention' have been brought into the present invention.

The 'linear algorithm' of the automata runtime execution engine, which uses a node pruning technique disclosed in the 'first invention' to ensure that the performance of automata is normally linear in the number of characters which must be traversed from an input stream to find (or not find) a match, but which in some cases (as proved in the 'first invention') is N-squared in the number of characters fetched from the input stream. An example of N-squared performance is given in the present invention, as well as an explanation of surrounding issues (section 8.6.3).

The 'sequence of arcnum-sequences' algorithm of the first invention, which allows for the ambiguity resolution rules of both inventions to be upheld during the selection of a "winning thread" in the runtime automata engine. As seen in the examples, the accumulation of arcnum-sequence references becomes a more significant cost as examples get increasingly complex, contributing to a reduction in performance, which is reflected in the 'arcnum statistic' and its associate 'derived factor'. The actual use of these accumulated arcnum sequences to make pruning decisions (to both maintain the 'linear' property as well as to determine the correct "winning" thread) may or may not in fact occur, and is related both to the data set and to the automata complexity. The performance-wise cost in terms of using these arcnum sequences to make pruning decisions is also illustrated in the examples, and is reflected by the prune-comparison 'statistics'.

The 'instruction arc' composition algorithm and subset construction algorithms as presented in the 'first invention', are important: (1) in building a composition graph with instruction-arcs (a special kind of null transition) that model side-effect producing statements of 'do-patterns' and the implicit side-effects of 'capture-patterns'; (2) in that the presence or absence of instruction arcs affects the arcnum sequence algorithm, such that all of the character-arcs within a composition that has no side-effects will always have the same arcnum sequence; (3) in that instruction arcs are treated as null transitions by the automata execution engine, and can cause the spawning of new automata threads, and lead to an increase in NFA-ness. The effect on performance of the 'document design pattern' by the presence of 'instruction arcs' is threefold. First, instruction arcs, when accumulated to "extant" automata threads during traversal of the input stream, cause a performance reduction proportional to the "instr statistic'. Second, the presence of instruction arcs at deeper levels of nesting (especially within repeat compositions) contributes to an increase in average thread count and a possibly higher value for the 'arcnum statistic', as seen in both the CaptureCodeLines example and the AntiDFA examples of section 8.6.1. Third, at the end of automata execution, the instruction arcs must themselves be accumulated into a FORTH executable instruction-array for execution, which can effect performance as seen in the instrs-per-char statistic and the CountChars anti-example.

8.5 Document Design Pattern

The primary design pattern (for tokenization of documents) proposed for the grammar of the present invention is termed the 'document design pattern'. In this design pattern, the programmer typically first considers the classification of documents to be processed, and defines a set of production rules that describe how to recognize an instance of this document classification. For example, if all instances of the 'document classification' were Java™ source files, the production rules would be similar in name and number to those rules which describe the Java™ language, as written in the Java™ language specification. The programmer would also consider his/her audience—i.e. is the user of these production rules to be another programmer or group of programmers, and if a group, how large is that group? Depending on the answer to this question, the script programmer would create a more or less robust set of production rules, trying in some cases to anticipate the forms of extraction required by the users of the production rules. However, in most cases, this first set of production rules would be written only to recognize or filter valid instances of the 'document classification'. Naturally, these rules would be written in the grammar of the present invention, and most likely would belong to a single library script, which declares and defines the base-class(es).

Because it will have been demonstrated that there is no appreciable performance cost to making the set of production rules polymorphic, these recognition rules will for the most part be made non-static (virtual) member production rules of an appropriately named struct. Since it is likely that the programming requirement involves much more than document validation, the programmer or team of programmers will now begin to subclass this struct, creating a derivation class for each unique tokenization/extraction functional requirement needed for this 'document classification'. Some of these subclasses will have non-intersecting requirements, in which case their only relationship will be that they subclass the initial base class/struct (of the production rules that simply recognize an instance of the document). In other cases, there will be additional inheritance relationships between the subclasses, as requirements are brought into the solution layer by layer.

In the above description, the typical OO design approach of a good programmer is seen. What is novel in this approach, relative to the present invention, is that polymorphism is also allowed/encouraged for production rules rather than only functions. Of course, such a thing is possible only in a language that offers re-usable production rule embodiments for regular expressions, a feature introduced in the 'first invention'. When the programmers are done creating a solution or set of solutions for extracting/tokenizing all instances of this 'document classification', there will most likely be one or more document-level parameter-less production rules, which are declared as virtual members of the base class (or other less-derived classes). Then, when using any of the most-derived classes of this class hierarchy (for each of the re-purposings for this 'document classification'), that same document-level production rule, such as EatDoc< >, will be used polymorphically by functions which know only that the struct instance variable supports the production-rule behavior EatDoc< >, and does not necessarily know (have access to) the production rules that implement that behavior (as those rules are further down the inheritance tree for each re-purposing struct definition). Of course, visibility keywords such as private and public could be used to draw out this distinction, and may be offered in a future implementation to help enforce "best practices".

The term 'document classification' has been used above in the problem description, because regular expressions are well-known to describe a union of many valid strings (document-streams) to be "accepted", in this case each valid "string" is a valid instance of that 'document classification', which in the examples to be developed below, is a particular classification consisting of Java™ source files. In the OO design approach described above, one (or more) base classes are created to describe just the recognition characteristics of that classification. Then, for each unique extraction and/or tokenization purpose needed within this 'document classification', there will be a more-derived sub-class that describes with appropriate production rules both the recognition characteristics (by using the super keyword to access inherited base-class rules) and the side-effect characteristics of tokenization (such as by capturing into member variables of the sub-class definition).

8.5.1 Problem Definition

In the specific examples that follow, the broad classification of documents being considered is Java™ source files. However, the functional requirements will be stated as follows: (1) count the number of documents, (2) count the number of lines in all of the sources, (3) count the comment lines in all of the sources, (4) count the weight of string literals in the sources, (5) count the comment "chunks" in all of the sources, (6) count all of the lines of source code which contain non-comment tokens of the Java™ language, and (7) capture those same "true" source code lines.

For the above problem, an appropriate starting point might be a $3^{rd}$-party recognition library for this particular 'document classification', but such does not yet exist. However, since this problem statement does not require a validation of each source file (as a well-formed Java™ source), a simpler Base class is presented that distinguishes only the 'recognition units' of interest. Therefore, a solution which actually looks at and validates each Java™ non-comment token (following closely after the actual production rules that describe the Java™ language) would be excessive (unless a library such as java.tok already existed). Thus the scripts developed below will distinguish "comments", "whitespace", string and character literals, and "non-comment lines", and as such could actually be used for the same purposes against documents belonging the classification of valid C++ files. (Some of these example scripts will also successfully tokenize many varieties of malformed documents of these 2 classifications.)

8.5.2 Library Scripts

The example scripts of this patent application use two stripped down versions of common libraries that have been identified as re-usable components during development of various examples of the present invention, as well as for rewriting the examples of the 'first invention' to make use of re-usable components wherever possible. The first library is primarily based on a set of inlines that provide access to FORTH level functionality. The first 23 lines of this library script (SYS.TOK) are as follows:

```
1   inline void system::print (String s)
2       "print";
3
4   inline void system::println (String s)
5       "println";
6
7   inline String[ ] system::listfiles (String path)
8       "listfiles";
9
10  inline String[ ] system::listfolders (String path)
11      "listfolders";
12
13  inline Stream system::filestream (String path)
14      "filestream";
15
16  inline Stream system::filestream (String path, String enc)
17      "filestream2";
18
19  inline Stream system::cyclestream (String path, int minbytes, out int numcycles)
20      "cyclestream";
21
```

```
-continued 22  inline void system::resetstream (Stream is)
23      "resetstream";
```

The above illustrates the syntax chosen for inline functions, which are similar to normal 'global-scope' function definitions, except that the keyword function is replaced by the keyword. inline and that the function body (in curly-braces) is replaced by a string literal which lists the FORTH atom-words that implement this function, followed by a semi-colon.

The second useful library script (FIND.TOK) is a stripped down version reduced to just 5 'global-scope' production rules that will be used in various examples:

```
1   production Contains <Pattern p> –>
2       *any + p + *any
3       ;
4
5   production StartsWith <Pattern p> –>
6       p + *any
7       ;
8
9   production Slack <Pattern signal> –>
10      *any butnot Contains<signal>
11      ;
12
13  production Find <Pattern target> –>
14      Slack<target> <+ target
15      ;
16
17  production Find <Pattern signal, Pattern target> –>
18      Slack<signal> <+ target
19      ;
```

The 'global-scope' production rules of lines 1-3 and 5-7 are parameterized regular expressions that define "containment" and "startswith" respectively, which are useful in subjunctive qualifier expressions, and was seen in examples of the 'first invention'. The 'global-scope' production rule of lines 13-15 is a parameterized.regular expression that defines "find-first", and was also seen throughout examples of the 'first invention'. The 'global-scope' production rule of lines 17-19 defines the 'signaling find' > rule, discussed in the glossary, the CountStrings example of section 8.5.9, the CaptureCodeLines example of section 8.5.11.1, and the CountCommentChunks example of section 8.5.12.1. This type of Find< > (line 17) helps with finding a union of target patterns which can interleave each other, in which case the "target" parameter (to the line 17 Find< >) is often a union of interleaving targets and the "signal" pattern (to the line 17 Find< >) is a union of begin-sentinels for all of the targets. The Slack< > rule of lines 9-11 define "eating until", and are used in both Find< >s above as well as some of the examples.

In all of these rules, the instantiation requires that another regular expression, the Pattern parameter "target", "p", or "signal" (often another rule instantiation), is to be passed into the rule. In AntiDFA section 8.6.1, the role of such subjunctive-based rules is discussed in terms of yielding optimal performance for the 'document design pattern'.

8.5.3 Base Class

The base class used by all of the script examples (except Football) within the 'document design pattern' is contained in the script library file BASE.TOK, as follows:

```
1    load "./sys.tok";
2    load "./find.tok";
3
4    struct Base {
5
6        boolean cache = true;            // cache the Eater( ) pattern
7        boolean profile = true;          // use bucket profiling
8
9        int fromIndex = 0;               // 0-based index of first file in dir
10       int toIndex = -1;                // 1-based index of last file in dir
11
12       int initRepeatCount = 1;         // number of times to cycle thru folder
13       int initCycleCount = 1;          // number of times to process each file
14
15       int testRepeatCount = 4;         // number of times to cycle thru folder
16       int testCycleCount = 1;          // number of times to process each file
17
18       int fileSize = 400000;           // minimum number of bytes per file
19       int fileCycleCount = 0;          // num times a particular file is cycled
20       int numDocuments = 0;            // how many documents were seen
21
22       Pattern eater = null;            // cached pattern to tokenize with
23
24       function String Report ( )
25       {
26           return null;
27       }
28
29       production DoEat< > ->
30           reject
31       ;
32
33       function Pattern Eater ( )
34       {
35           if (eater != null)
36               return eater;
37
38           Pattern p = DoEat< >;
39           if (cache)
40               eater = p;
41           return p;
42       }
43
44       function boolean Eat (Stream is)
45       {
46           system::resetstream(is);
47           tokenize (is) {
48               case Eater ( ):
49                   return true;
50           }
51           return false;
52       }
53
54       production LF< > ->
55           '\n' | "\r\n"
56       ;
57
58       production EOF< > ->
59           eof
60       ;
61
62       production EOL< > ->
63           LF< > + EOF< > | LF< > | EOF< >
64       ;
65
66       production Line< > ->
67           Find< EOL< > >
68       ;
69
70       production SP< > ->
71           +'[ \t]'
72       ;
73
74       production Comment1< > ->
75           "//" + Find< EOL< > >
76       ;
77
78       production Comment2< > ->
79           "/*" + Find<"*/">
```

```
 80            ;
 81
 82            production Comment< > –>
 83                 Comment1< > | Comment2< >
 84            ;
 85
 86            production Comment2_withLF< > –>
 87                 Comment2< > but Contains< LF< > >
 88            ;
 89
 90            production Comment2_withoutLF< > –>
 91                 Comment2< > butnot Contains< LF< > >
 92            ;
 93
 94            static Pattern lit_dg = '[0-9a-fA-F]';
 95            static Pattern lit_ch = '[^\r\n]';
 96
 97            static production CharLit<char term> –>
 98                 ("\\u" + lit_dg * 4..4)          |
 99                 ('\\' + (lit_ch butnot 'u'))     |
100                 (lit_ch butnot ( '\\' | term))
101            ;
102
103            static char sq = '\' ';
104            static char dq = '"';
105            static Pattern ch_chars = CharLit<sq>;
106            static Pattern str_chars = *CharLit<dq>;
107
108            production CharLit< > –>
109                 sq + ch_chars + sq
110            ;
111
112            production StringLit< > –>
113                 dq + str_chars + dq
114            ;
115
116            //--------------------------------------------------------------
117
118            String                    folderName = null;
119            String[ ]                 fileNames = new;
120            Stream[ ]                 fileStreams = new;
121            int[ ]                    fileCycles = new;
122
123            function void NotifyBeginMain ( )
124            {
125            }
126
127            function void NotifyEndMain ( )
128            {
129            }
130
131            function void NotifyBeginFile (String filePath)
132            {
133            }
134
135            function void NotifyEndFile (String filePath)
136            {
137            }
138
139            function Stream GetStream (int index)
140            {
141                 Stream stream = fileStreams[index];
142                 if (stream == null) {
143
144                      String name = fileNames[index];
145                      if (name != null) {
146
147                           String path = folderName + name;
148                           fileStreams[index] = stream = system::cyclestream (path,
       fileSize, fileCycles[index]);
149                      }
150                 }
151                 fileCycleCount = fileCycles[index];
152                 return stream;
153            }
154
155            function void DoRun (int repeatCount, int cycleCount)
156            {
157                 int from = fromIndex;
```

```
158             int to = length(fileNames);
159
160             if (0 <= toIndex && toIndex < to)
161                 to = toIndex;
162             if (from < 0)
163                 from = to;
164
165             for (int i = 0; i < repeatCount; i++) {
166                 system::gc( );
167                 for (int j = from; j < to; j++) {
168                     String path = folderName + fileNames[j];
169                     for (int k = 0; k < cycleCount; k++) {
170                         NotifyBeginFile (path);
171                         if (!Eat(GetStream(j)))
172                             system::println("Eat( ) failed for file " + path);
173                         NotifyEndFile(path);
174                     }
175                 }
176             }
177             numDocuments = to − from;
178         }
179
180         function void Run (String folder)
181         {
182             folderName = folder;
183             fileNames = system::listfiles(folder);
184             fileStreams = new;
185
186             if (initRepeatCount > 0 && initCycleCount > 0) {
187                 system::println("running initial iterations to prime java
        virtual machine...");
188                 DoRun(initRepeatCount, initCycleCount);
189             }
190
191             NotifyBeginMain( );
192             if (profile)
193                 system::startprofiler( );
194             system::aa_start_stats( );
195             DoRun(testRepeatCount, testCycleCount);
196             if (profile)
197                 system::stopprofiler( );
198             system::aa_stop_stats( );
199             NotifyEndMain( );
200
201             system::println("test run completed for " + numDocuments + "
        documents");
202             system::println(Report( ));
203             system::println(system::cnt_cache_getstats ("cache hits"));
204             system::println(system::aa_getstats ("aastats"));
205         }
206     }
```

Lines 1 and 2 are load statements which load the script libraries discussed in the previous section. Note that load statements precede all other non-comment statements in the script. The base-class is named "Base" and is declared beginning on line 4, with its body and struct-scope covering lines 6-205. As in C++ or Java™, the member data elements and functions use much the same syntax for declaration as in 'global-scope' of the script (outside of a struct definition).

Lines 6-18 define test run parameters shared by all of the scripts, in order to ensure that each example script's test run covers the same number of characters, and the same number of iterations through each test file. Note on line 18 that the target fileSize is set to 400000 characters. This means that even though the suite of test files, which is simply the folder containing the 94 Java™ source files of the 'first invention' (filed on CDROM with the filing of the provisional of the 'first invention'), contains files much smaller than this, each of the 94 files will be concatenated (via a 'cycle-stream') onto itself enough times to total at least 400000 characters. This is done in order to process enough characters in each document-level tokenize statement so that elapsed CPU time is significant enough for reliable 'bucket' measurements. Lines 15 and 16 indicate that there will be 4 iterations through each of the 94 Java™ source files, and since each file has synthetically been made to be around 400000 characters in length, a single test run of any of the scripts which inherit this Base class will consist of a total of 400000*94*4 characters.

The function Report( ) on lines 24-27 is to be provided by 'more-derived' sub-classes of this Base struct. It (the derived version) will return a string reporting the results of the test. The sub-classes of Base will define overloaded production rules to provide side-effects (ultimately leading to the test results), and the sub-classes of Base save the results in member variables (of the sub-class), so that the Report( ) function can generate a string based on those results. The current implementation of the present invention does not implement an abstract keyword (as in Java™), but in fact, this Report( ) function is to be thought of as "abstract".

The next member of the struct Base is the (non-static) virtual production rule DoEat< > de-fined on lines 29-31. This production rule should also be thought of as "abstract", because the most-derived sub-classes of the examples must provide a derived behavior/declaration for this production rule as well. Here, a novelty of the present invention is seen in action—polymorphic regular expressions. A production rule, in this case containing only the "hidden" (implicit) "this param", is declared as a non-static member of the struct with the intent that it will be given new (polymorphic) behaviors in the sub-classes. The default behavior is to "reject", meaning that if this production rule is not provided by the sub-class, the "Eat" function (below) will not recognize any characters at all.

The Eater( ) function on lines 33-42 is simply a caching function to help minimize Java™ garbage collection issues during the test. Note that this is not the same as 'automata caching', which is discussed in section 8.9.1.

The Eat(Stream) function defined on lines 44-52 is also non-static (as are most members of this struct). This is to ensure that Eat(Stream) has access to non-static production rules (through the implicit "this pointer"), especially the 'document-level' DoEat< > rule, and all of its sub-compositions. This function—Eat(Stream)—obtains its document-level production rule via the. Eater( ) function discussed above, which is simply caching the document level production rule. Note the simple form of the tokenize statement on lines 47-50. Here (lines 47-50) is where 'automata caching' takes place, i.e. where subset construction to produce the automata occurs the first time this tokenize statement is called, and subsequently finds the automata from the 'automata cache'. In this tokenize statement, the document-level production rule DoEat< > (returned by Eater( )), is applied to the input stream passed by the caller, and simply returns "true" if any characters are recognized, and "false" if the DoEat< > rule fails to match any characters of the input stream. Note that the Eater( ) function and the DoEat< > rule are virtual, ensuring that the instantiation of line 48 is routed through the 'V-table' so that the most-derived version of DoEat< > (of the class hierarchy) is actually used. Of course, as in the 'first invention', the tokenize statement ensures that the input stream's cursor is advanced if there are characters recognized, and more importantly, that any side-effects hidden in sub-classed, derived behaviors for DoEat< > and its sub-compositions are properly executed as side-effects of the tokenize statement.

The next member of the struct is another (non-static) virtual production rule (lines 54-56)—LF< >—which recognizes a line terminator for both the Windows and Linux operating systems. Examples will show the value, with this member production rule, of creating a virtual base rule to do the recognition only, allowing subclasses to "mix in" side-effects, and also that for those examples that do not provide a derived behavior with side-effects, there is no cost to making such a rule virtual. The key principle behind this is the management of the 'this global' for the implicit "this-pointer" of non-static production rules.

The next member of the struct is another (non-static) virtual production rule (lines 58-60)—EOF< >—which recognizes the "eof" sentinel character. Examples will show the value, with this member production rule, of creating a base rule to do the recognition, allowing subclasses to "mix in" side-effects, and for those examples that do not provide a derived behavior with side-effects, that there is no cost to using a virtual EOF< > rule to recognize the "eof" sentinel versus the use of the "eof" sentinel-literal by itself. The key principle behind this is the management of the 'this global' for the implicit "this-pointer" of non-static production rules.

The next (non-static) virtual member production rule is EOL< > defined on lines 62-64 and defines a line termination as one of three possibilities—a true LF< > (1 or 2 char sequence), a LF< > followed by an EOF< >, or an EOF< > with no preceding linefeed (in case the programmer of the source code file being processed forgot to terminate his/her last line of code with a line-feed). This rule is intentionally non-static (virtual) as well, and one of the examples, CountCodeLines, does provide a derived behavior. Again, so long as none of the derived behaviors include side-effects, the decision to make this rule virtual carries no performance penalty, as a result of the implementation of the 'this-global' in member production rules.

The next (non-static) virtual production rule is Line< >, and is defined on lines 66-68. This production rule defines the behavior of "eating" from the current position in the stream, up to and including an "end-of-line", as defined by the EOL<> rule discussed above. Note that even though only one of the examples, CaptureCodeLines, explicitly provides a derived behavior for Line< >, the fact that Line< > is defined in terms of the virtual instantiation of EOL< > (as passed to the Find< > rule contained in the library FIND.TOK) means that if a sub-class provides a more-derived behavior for EOL< >, this Line< > rule of the Base class will indeed use that more-derived behavior (see CountCodeLines section 8.5.10). This technique is reasonable (from the standpoint of the implementer of this Base struct class) because EOL< > and Line< > should be consistent with each other.

The next (non-static) virtual member is the production rule SP< >, defined on lines 70-72. This rule defines the "eating" (recognition) of whitespace, which by default is defined as either the ASCII space character or the ASCII tab character, and is coded via a character-class style of regular expression on line 74. This rule expects to find 1 or more instances of a either of these ASCII characters (because of the + unary operator in front of the character-class), meaning that if used in an instantiation, at least one whitespace character must be found. In the CountCodeLines example, a more-derived behavior is given for SP< >, also consistent with the meaning of "looking for 1 or more" whitespace elements, where, for that example, whitespace is expanded to include source code comments of the $2^{nd}$ variety which do not span lines.

The next (non-static) virtual member, Comment1< > on lines 74-76, is another virtual production rule, defining the behavior of "eating" a Java™/C++ comment that starts with // and extends to the end-of-line. Note that this rule is based on the definition of EOL< >, which may or may not be appropriate depending on the derivation. CountCodeLines (section 8.5.10) provides an example wherein the EOL< > behavior is changed to include Comment1< > itself, and though that is consistent (and useful in the virtual sense with Line< >), Comment1< > must be redefined to avoid an unwanted recursive loop.

The next (non-static) virtual member, Comment2< > on lines 78-80, is another virtual production rule, defining the behavior of "eating" a Java™/C++ comment that starts with /* and extends to the first */ after that. A case (Count CommentChunks of section 8.5.12) of a derived behavior for Comment2< > will also be given.

The next (non-static) virtual member, Comment< > on lines 82-84, defines a union of either comment style, which although not further described in any examples, are used in more than one, and therefore add value to the Base class. However, in the AntiLinear example of section 8.6.3, elements of risk, in providing such a non-pinning union rule in a "Base" class, are demonstrated.

The next two virtual production rules are variations of Comment2< >, one of which includes at least one LF< >, and one of which does not include an LF< >. These two rules are not further derived (polymorphically) in any examples shown, but are useful in more than one, which is why they are defined in the Base class.

The next non-static rules (lines 108-114)—CharLit< > and StringLit< >—are used to recognize a Java™ character literal and Java™ string literal respectively, including certain escaped characters within the string literal. Note the use of the static CharLit<char term> rule of 97-101 to define a character element on behalf of either literal type, in which there is a parameter indicating whether it is a CharLit< > terminated by a single-quote, or a StringLit< > terminated by a double-quote, and in which a subjunctive is used within the body of the static CharLit<char term> rule to disqualify the terminator. In just 21 lines of code (94-114) the syntax of the Java™ string literal and Java™ char literal have been successfully encapsulated as two virtual production rules in the base class. CountStrings will demonstrate a use-case for these 2 rules for Java™ literals.

The next set of virtual member functions (lines 123-137) are abstract in nature—Notify-BeginMain( ), NotifyEndMain( ), NotifyBeginFile(String), NotifyEndFile(String)—and will be used in the BaseCount subclass script discussed in the next section.

The next function, GetStream(int) on lines 139-153, is used to cache the Java™ source code file being read, so that the test run statistics are not affected by the time required to open a file and read it into memory. Note that on line 148 the file is opened by the special inline function system::cyclestream(String, int, out int), whose purpose is especially for testing, in that it not only opens and creates a Stream for the named file, but also allows the caller to specify a minimum number of bytes needed in the Stream, so that the file can be concatenated to itself ('cycled') enough times to reach the number of goal-bytes requested by the caller in the second parameter, which for the test runs reflected in the various FIGS. 1-7 of this document, is 400000. Note that the third parameter to system::cyclestream(String, int, out int) returns the number of times cycled through a test file to reach the goal of 400000 characters. It is important to save this result on line 148 into the data member array "fileCycles[ ]" so that each of the particular counting examples can have their counts adjusted to reflect the actual number of units counted in the original Java™ source code file. It has been verified that this number is the same for any given example regardless of whether the goal character count is 100000, 200000, 400000, etc.

The next (non-static) virtual member, DoRun(int, int) on lines 155-178, is a member function, which performs the requested series ($1^{st}$ and $2^{nd}$ parameters) of test runs on the source code files found in a given directory path. In the case of the performance tests done herein, there are 94 documents (from the source code folder of the CDROM of the 'first invention'), and 4 iterations through the group of documents. Lines 170-173 make the calls to perform a single document tokenization, line 170 making a NotifyBeginFile call (which actually calls the version of this function given in BaseCount), line 171 making the Eat(Stream) call which calls the virtual Eat(Stream) of Base, but which ultimately uses the document-level production rule of the most derived class (polymorphic derived behaviors applied to production rules), and line 173 making the NotifyEndFile call (which calls the version of this function given in BaseCount).

The next (non-static) virtual member, Run(String) on lines 180-205, is a member function, which calls DoRun(int, int), described above, to perform all of the required tests. Note that there is a call on line 188 to run through the suite of test files initially just to make sure that all of the Java™ object pools for automata execution have been created in advance (so that the overhead of Java™ object creation is not reflected in the test results) and then there is a second call on line 195 to perform the actual test. On lines 192-194 'bucket profiling' is turned on, as well as the recording of the 'automata statistics'. On lines 196-198 recording is subsequently turned off, after which the remainder of the function prints out the reports from which the data of FIGS. 3, 4, 5, 6, 7, 8, 14, 15, and 16 are obtained. Note that the call on line 202 to print out the report is routed through the 'V-table' to the function given in BaseCount, which is a subclass of this Base class that "mixes in" additional "counting" functionality shared by all of the examples except Football.

Note that most members of this Base class are defined as non-static, regardless of whether or not such members use the implicit "this-pointer". This is the recommended design approach for production rule members, because as seen in section 8.9.2.3, the present invention has optimized the incorporation of the 'this-global' to happen only when needed, so that making a production rule virtual (non-static) will not increase 'choppiness' unless one of its sub-classed derivations actually produces side-effects for the corresponding 'recognition unit' and its production rule. On the other hand, the recommended design pattern rarely involves putting side-effects in the Base class production rules, intending rather that the Base class production rules be used exclusively for recognition, therefore not cumbering performance for derivations which do not require the side-effects.

Finally, the AntiPoly example (section 8.6.2) will demonstrate that the automata, for a sub-class contrary to the polymorphic design approach, typically produces an identical automata to its polymorphic equivalent, therefore offering no performance advantage, and thus underscoring the principle that Base class production rules should normally be declared as virtual.

8.5.4 BaseCount Class

In the next example class to be defined, the functional requirements, shared by all of the example scripts which "count", are "mixed in". This class is seen as another, but more-derived, base-class, called BaseCount, extending the Base class above. Since all of the examples are based on counting various elements of a Java™ source code file, this second base class provides additional common code (BASECOUNT.TOK):

```
1     load "./base.tok";
2     load "./sys.tok";
3
4     struct BaseCount extends Base {
5
6         int millis;
7         int totaldocs;
8         int totalcount;
9         int actualcount;
10        int count;
11
12        function void NotifyBeginMain( )
13        {
14            totaldocs = 0;
15            totalcount = 0;
16            actualcount = 0;
17            millis = system::millis( );
18        }
19
20        function void NotifyEndMain ( )
21        {
22            int elapsed = system::millis( ) – millis;
23            system::println("total elapsed millis = " + elapsed);
```

-continued

```
24            }
25
26            function void NotifyBeginFile (String filePath)
27            {
28                count = 0;
29            }
30
31            function void NotifyEndFile (String filePath)
32            {
33                String frac;
34                int avg = Count(frac);
35                if (frac != null)
36                    system::println("unexpected fractional
                        count(" + frac + ") for
     file " + filePath);
37
38                totaldocs++;
39                totalcount += avg;
40                actualcount += count;
41            }
42
43            // if there's no fraction, leave the fraction
                parameter as null,
44            // otherwise return the fractional digits beyond
                the decimal point
45            // and the result itself is the integer portion
                of the result
46            //
47            function int Count (out String fractionalDigits)
48            {
49                String Q, R;
50
51                int avg = count / fileCycleCount;
52                if (Ratio(count, fileCycleCount, Q, R) )
53                    fractionalDigits = R;
54
55                return avg;
56            }
57
58            function String ReportUnits ( )
59            {
60                return "units";
61            }
62
63            function boolean Ratio (int numer, int denom, out
                String quotient, out
     String remainder)
64            {
65                int     Q     = numer / denom;
66                int     R     = numer % denom;
67                boolean frac = R != 0;
68
69                quotient = "" + Q;
70                if (frac) {
71                    R     = R * 1000 / denom;
72                    int R0    = R / 100; R %= 100; int
                        R00 = R / 10; R %= 10; int
     R000 = R;
73                    remainder = "" + R0 + R00 + R000;
74                }
75                return frac;
76            }
77
78            function String Report ( )
79            {
80                String Q, R;
81                boolean frac = Ratio (totalcount,
                    totaldocs, Q, R);
82                String s1 = "aggregate count of " +
                    ReportUnits( ) + " across all
     files: " + actualcount;
83                String s2 = "average number of " +
                    ReportUnits( ) + " per uncycled
     file: " + Q + (frac ? '.' + R : "");
84                return s1 + '\n' + s2;
85            }
86        }
```

The data members "mixed" in by this second base-class are defined on lines 6-10. On line 6 a variable is used to hold the "wall-clock" time recorded at the beginning of the test in Notify-BeginMain( ), so that the total elapsed time of the test (in milliseconds) can be printed on line 23 in NotifyEnd Main( ). On lines 7 and 8, member variables are defined to hold the total document and unit counts respectively, which are used in the Count(out String), Ratio(int, int, out String, out String), and Report( ) functions to determine how many actual units where found relative to the original document (before it was concatenated onto itself enough times to reach 400000 characters). Also on line 9, the variable "actualcount" is defined to hold the total aggregate count from the beginning of a test run to its conclusion.

On line 10, this class provides the "count" (non-static) member variable, which is used in each of the most-derived sub-classes (the various examples in the sections that follow), and contains the cumulative count of document elements being recognized by each specific example. Therefore, it is appropriate to also provide here a derived behavior for Notify BeginFile(String), which initializes the "count" to zero on line 28 prior just prior to the tokenize statement of the Base class. Although this technique is known in the art, and is a standard element of polymorphism, its novel variation will be discussed, wherein a polymorphic member production rule (as opposed to member function) updates the "count" member variable in 'do-pattern' statements.

Note the relative complexity of the functions that must do various arithmetic computations to infer the "real" unit count based on how many documents where processed and to infer how many times each original source code document from the test suite of 94 files was cycled through to reach 400000 characters. The fact that this regular-expression scripting language "looks and feels" like Java™ and/or C++ (outside of its built-in support for regular expressions) means that programmers who adopt this scripting language will be very comfortable with its standard expression, function, and loop syntax, as well as the object-oriented forms added in the present invention, and will thus find it relatively easy to quickly code such intricate arithmetic functionality.

Finally, note that on lines 58-61 this BaseCount class mixes in another "abstract" style function called ReportUnits( ), which here returns the generic string "units", but which is meant for being derived in each specific example that follows to return a more precise string that describes the units actually being counted. This function is called on line 83 to generate the report string expected by the "abstract" Report( ) function which was originally defined in Base. The end result of this design is that all of the examples that follow need only to update the "count" variable within 'do-patterns' of various 'recognition-unit' rule derivations, and the rest of the work of running through the entire test suite the desired number of times and printing out the report information is all handled in Base and BaseCount.

8.5.5 CountDocs Example

The first fully-derived example class to examine (following the 'document design pattern') is the script (COUNTDOCS. TOK) presented as follows:

```
1    load "./basecount.tok";
2
3    struct CountDocs extends BaseCount {
4
5        production DoEat< > –>
```

-continued

```
6            do (; *any + eof2; count++)
7            ;
8
9            function String ReportUnits ( )
10           {
11               return "docs";
12           }
13
14           function int Count (out String fractionalDigits)
15           {
16               return count;
17           }
18       }
19
20       static {
21           BaseCount doc = new CountDocs ( );
22           doc.Run("./CDROM/SRC/");
23       }
```

In this example, note on line 1 that the second base class library—BASECOUNT.TOK—is being loaded at the front of the script, which inserts all of the definitions of the BaseCount class into the scope of this script. The struct called CountDocs extends and inherits (line 3) all of the behaviors of the BaseCount struct, including also its behaviors that are inherited from the Base class. Here, 2 behaviors which were previously described as being "abstract", are now given. Lines 5-7 (polymorphically) provide the fully derived behavior for the DoEat< > virtual member production rule, which is to eat all of the characters of the document, including the sentinel eof2 character. This is seen from the regular expression (which is a sub-expression of the 'do-pattern' on line 6)—*any+eof2—reflecting the fact that the entire document is to be "eaten"/recognized by this rule, befitting the 'document design pattern'. This sub-expression is wrapped inside a 'do-pattern' which increments the "count" variable (of the BaseCount class) once, as a side-effect of the recognition of any file in the 'document classification'. The generality of this 'document level production rule' (line 6) allows it to recognize (and to deliver a count of 1 for) all documents in any classification.

On lines 9-12 a definition is given to the "abstract-style" ReportUnits( ) of the immediate super-class (BaseCount), returning "docs" as the name of the units being counted in this example.

This also is the one example where the units do not "scale" in terms of number counted, as the file is cycled enough times to total at least 400000 characters. The reason is that there is no sentinel at the concatenation points of the "cycled" file, so that eof2 is matched only at the end of 400000 characters of the cycled-document. This is why lines 14-17 redefine the Count(out String) function of BaseCount to return the "count" variable as is, without further division by the number of cycles through the file to reach 400000. The fact that the test reports all show a value of 1 indicate the correct functioning of the do-pattern on line 6, in that the side-effect of incrementing the "count" variable occurs only once per tokenize statement.

Aside from the polymorphically derived behavior given for the DoEat< > rule on lines 5-7, another point of polymorphism illustrated in this example is seen on lines 21-22. On line 21, the new operator is used to create a CountDocs( ) object instance, but the result of the construction is assigned to a BaseCount reference variable through widening, which allows the fully-derived version of DoEat< > to be found only through the 'V-table'. Thus, the correct functioning of line 22 in triggering all of the derived behaviors of the CountDocs class demonstrates that the principle of polymorphic widening has been successfully adapted to production rules in the 'V-table' of the present invention.

8.5.5.1 CountDocs Performance Results Analysis

The CountDocs example is seen as being nearly 100 percent DFA-like from the "Docs" row of FIG. 3. The average 'thread-count statistic' at each character position of the document is 1.00000 indicating that there are rarely more than 1 extant automata thread at any one time. The 'spawn-statistic' of 0.00001 indicates that there are very few spawning events for this example script, in fact occurring only at the beginning and end of the 400000 characters, corresponding to the end-points of the 'do-pattern' on line 16 above. There are no 'prune-simple' events (0.00000) also suggesting that for almost the entire time there is exactly 1 extant automata thread. The 'instr statistic' (0.00001) is minimal, meaning that only a few instructions are generated as side-effects (required to set up the 'this-global', and then increment "count" one time only), yet 400000 characters are being processed. Without a need to prune, it is unnecessary to accumulate arcnum sequences (0.00000).

For the reasons given above, this example serves as the reference example for "DFA maximum speed".

8.5.6 CountComments Example

The next example (of providing a fully-derived "counting" behavior) demonstrates how to use the 'document design pattern' to count Java™/C++ source code comments. This example (COUNTCOMMENTS.TOK) produces a somewhat more complex automata, and hence is a little slower than the CountDocuments example, but is almost as simple in its document-level production rule.

```
1        load "./basecount.tok";
2        load "./find.tok";
3
4        struct CountComments extends BaseCount {
5
6            production DoEat< > –>
7                *do (; Find< Comment< > >; count++)
8                ;
9
10           function String ReportUnits ( )
11           {
12               return "comments";
13           }
14       }
15
16       static {
17           BaseCount doc = new CountComments ( );
18           doc.Run("./CDROM/SRC/");
19       }
```

The derived behavior on line 7 of the DoEat< > document-level production rule above is described from inner to outer (in the regular expression composition) in the following steps. (1) The expression—Comment< >—(whose definition is found in section 8.5.3) looks for exactly one of either Java™/C++ source code comment style. This production rule describes a union of two separate and interleave-able 'recognition-units', which hides a performance risk that should normally not be taken in the Base class. Nevertheless, the Base class definition of Comment< > is sufficient in this example, so this CountComments class does not further derived Comment< >. (2) This Comment< > rule instantiation is passed into the Find< > production rule of the FIND.TOK library, which is in 'global-scope', and made available by the load statement of line 2. (3) This Find instantiation (looking for the next of either of two comments) is wrapped inside a 'do-pattern', which increments the "count" variable by 1 to reflect that another comment has been "eaten". Finally, (4) this do-pattern is wrapped inside a "repeat 0 or more" expression with the unary * operator.

This DoEat< > rule does not attempt to eat to the eof2 sentinel, only to the last comment found in the file. As demonstrated in the AntiDFA section, there will be an added cost to recording and purging intermediate-accept states, but a solution that performs as well as this one using the eof2 sentinel is most likely unwarranted due to its complexity.

Though the DoEat< > rule does not explicitly include the eof2 sentinel, the report for this script demonstrates that the same number of characters are fetched and tokenized from the input stream as with the CountDocs example in the prior section. However, as seen from FIG. 5, cumulatively only 79.72 percent of the test suite documents were "matched" by the DoEat< > expression of line 7, which is caused by the fact that some source code files are completely uncommented, and therefore, for those files, though 400000 characters are tokenized from the stream, 0 characters are matched by the "winning" thread which is attempting to do repeated Find< >s.

This is not an indictment of, but rather support for, the document design pattern. In this case, the goal is to find all comments, and certainly the automata must proceed to the last character of the file to find the last possible comment, even if there are no comments at all. In contrast, solutions which do not follow this paradigm, but rather use loops and multiple tokenize calls, an "accept" which does not recognize/tokenize all characters visited will cause characters to be revisited in the subsequent iteration of the tokenize statement.

Though this problem is solved essentially in one line of code by leveraging the base-classes, the automata produced for this solution is rather complex. Without 'do-patterns' for side-effects, without proper ambiguity resolution for all regular expression compositions involving side-effects, and without the 'linear-algorithm', all introduced in the 'first invention', a solution based on a 'document design pattern' would not likely be found. The advantage of the present invention relative to the 'first invention' is that the 'document design pattern' can be offered in an OO style (polymorphically with virtual production rules and side-effects based on a "this-param" reference to the struct-array object), allowing solutions that leverage Base class members to be delivered in fewer lines of code. This advantage-criterion can therefore be termed "increased expressivity without performance penalty".

With the proper coding of base-classes, this example is accomplished in 19 total lines of code, and the polymorphic regular expression which does all of the work is delivered in 3 lines of code (6-8).

8.5.6.1 CountComments Performance Results Analysis

FIG. 13 indicates that whether or not side-effect aggregation and execution are included in the performance figures, the CountComments example performs at roughly 97 percent of 'DFA maximum speed', as defined by the CountDocs reference example. This 3 percent loss in speed is not significant, in contrast with the complexity of the problem being solved, that of counting both styles of C++/Java™ comments. FIG. 6 shows that the additional time is primarily due to instruction arc traversal, and a few thread spawning events (which are caused by intermediate accept conditions). Despite the extra spawning events, FIG. 3 shows that the average thread-count is still 1.00000 and the average arcnum-sequence traversal count is 0.00000. More importantly the "thread max" statistic of 1.00000 (FIG. 5) indicates that whenever threads are spawned, they immediately replace the parent threads. Collectively, these 'statistics', as well as observed results indicate that this example runs at nearly 'DFA maximum speed'.

8.5.7 CountLines Example

The next example is a little more simple than the previous, and certainly reduces to an automata with fewer nodes and arcs than for counting both styles of comments. However, it is presented after the comment counting example above, because its runtime performance shows decline, which as seen in the results section to follow is due to the added weight of side-effects (there are many more lines than comments). This example is contained in the script COUNTLINES.TOK:

```
1       load "./basecount.tok";
2
3       struct CountLines extends BaseCount {
4
5               production DoEat< > ->
6                       *do (; Line< >; count++) + eof2
7                       ;
8
9               function String ReportUnits ( )
10              {
11                      return "lines";
12              }
13      }
14
15      static {
16              BaseCount doc = new CountLines( );
17              doc.Run("./CDROM/SRC/");
18      }
```

Again, the code for this script is fairly simple, since the basic infrastructure of the solution is already provided by the Base and BaseCount classes. The code snippet begins with the fully derived behavior for the DoEat< > rule, given on lines 5-7. From inner to outer in the composition of line 6: there is an instantiation of the Line< > rule provided in the Base class; this instantiation is then wrapped in a do-pattern, incrementing the member "count" variable each time the Line< > rule fires; finally, the do-pattern is wrapped in a "repeat 0 or more" expression based on the unary * operator.

Because the Line< > rule is defined as Find<EOL< >> in the Base class, and because the EOL< > rule in the Base class properly includes the various possibilities of LF-terminated and non LF-terminated last lines of a file, the DoEat< > rule above will always "eat" all the way to the first eof-sentinel, whether or not the eof2 sentinel is included on line 6. The inclusion of the eof2 sentinel is therefore not going to change the tokenization results. For this reason, the repeated 'do-pattern' of line 6 is concatenated with eof2, thereby avoiding the overhead of intermediate-accept conditions and keeping automata thread-spawning at a minimum.

Three points of polymorphism are illustrated in this example: (1) the line 11 derived behavior for ReportUnits( ) which gives the name of this type of unit being counted as "lines"; (2) the line 6 definition of DoEat< >, in which, not previously possible in the art, a production rule definition is given a polymorphically derived behavior; (3) the widening of the CountLines new object instance on line 16 to a variable of the BaseCount type, yet the call on line 17 to the member Run( ) function, from which ultimately (through the 'V-table') the derived version of the DoEat< > production rule (lines 5-7) is found.

8.5.7.1 CountLines Performance Results Analysis

The main difference between performance of CountLines and CountComments is the 8× increase in the amount of time spent in the 'main bucket', as seen from FIG. 8. This increase is primarily due to the time required to execute the side-effects, which are reflected in the value of the aggregate count ("actualcount" of BaseCount class), which is reported for the test runs of CountComments and CountLines as 652164 and 5094076 respectively, also a 8× increase between the examples.

It is useful to note the 'instrs bucket' of FIG. 6, which reflects accumulating instruction arcs to an extant automata thread (rather than the aggregation of the side-effects of the "winning" thread). In this case, there is only a 4× increase (from 6.39 millis to 25.91 millis), indicating that though the thread-count is 1.00000 for both examples, the CountComments examples spawns an extra thread at every 'do-pattern' insertion point, and the traversal of the instruction arc is by 2 threads simultaneously, and then one thread is immediately eliminated. This is in keeping with FIG. 6, which reports that CountLines, like CountDocs, shows almost no time spent in the 'spawn bucket', whereas CountComments does show some time, also reflected in the 'spawn statistic' of FIG. 3, which shows 0.00002 for CountLines and 0.00863 for Count Comments.

Finally, FIG. 13 reports that both estimated speed and observed speed (not including side-effects) are about 97 percent of 'DFA maximum speed' for both the CountComments and CountLines examples, based on the 'statistics' of FIG. 3, in which the extra time is attributable to the 'spawn statistic' and the 'accept statistic' for CountComments, and to the 'instr statistic' for CountLines.

From the 97 percent values of 'DFA maximum speed' for this example and the prior example, and from the various correlated 'statistics' as well, it can be inferred that the 'pinning specificity' of both examples is very high, even somewhat higher for CountLines because of less thread spawning.

8.5.8 CountChars Example

The CountChars example is broken into 2 approaches, the first of which is actually an anti-example because of the unnecessarily large amount of side-effects produced.

8.5.8.1 CountChars (Anti-Example)

The anti-example version of this script (COUNTCHARS.TOK) is presented as follows:

```
1    load "./basecount.tok";
2
3    struct CountChars extends BaseCount {
4
5        production DoEat< > ->
6            *do (; any; count++) + eof2
7        ;
8
9        function String ReportUnits ( )
10       {
11           return "chars";
12       }
13   }
14
15   static {
16       BaseCount doc = new CountChars( );
17       doc.Run("./CDROM/SRC/");
18   }
```

From line 6 above, there is only one difference between this derived behavior for the DoEat< > document-level production rule and that of CountDocs—namely, that the unary * operator has been moved from inside to outside the 'do-pattern'. In both this case and that of CountDocs, the encapsulated regular expression aside from side-effects is simply—*any+eof2. However, in line 6, the repeat is outside the 'do-pattern' and its 'post-stmt' which increments the "count" variable for every single match to the wild card in the document. For 4 test runs of 94 documents, and 400000 chars per document (because of the system::cyclestream to repeat a source file upon itself as many times as necessary to reach 400000), enough side-effects are generated to increment the "count" variable roughly 150 million times. This is not advisable, in light of the new @@ operator of the present invention, which can record the capture position during automata execution execution within 'do-pattern pre- and post- statement lists'.

8.5.8.2 CountCharsA Example

Therefore a better solution (COUNTCHARA.TOK) is presented as follows, which performs at 100 percent of 'DFA maximum speed.'

```
1    load "./basecount.tok";
2
3    struct CountChars extends BaseCount {
4
5        production DoEat< > ->
6            do (int savepos = @@;
7                *any
8                ; count += @@ - savepos)
9
10           + eof2
11       ;
12
13       function String ReportUnits ( )
14       {
15           return "chars A";
16       }
17   }
18
19   static {
20       BaseCount doc = new CountChars( );
21       doc.Run("./CDROM/SRC/");
22   }
```

This example has the same essential automata structure as CountDocs, in that there is a 'do-pattern' which wraps the *any expression, and this expression is followed by a concatenation with the eof2 literal. Here, the capture position (of the inputstream being tokenized) is recorded at the beginning of the document (line 6), then the *any expression on line 7 "eats" the entire document (except for eof2 which any is not able to match), and then in the 'post-stmt' on line 8 the stream position is again captured, from which it can be deduced how many characters were tokenized (the entire document) and this value then added to the "count" variable.

8.5.8.3 CountChars Performance Results Analysis

From FIG. 3, both the CountChars anti-example and Count CharsA produce an automata which is 100 percent DFA-like, in that the 'thread-count statistic' for both is 1.00000, the 'arcnum statistic' is 0.00000, and the 'spawn-statistic' is 0.00001. Additionally, FIG. 5 shows that for both examples, 'thread max' is 1.00000, all of which indicates that there is never more than 1 automata thread. This is not surprising, since the regular expressions are very simple. However, the anti-example version of CountChars generates side-effect instructions that increment the "count" variable for every single character, in total 6.00004 instructions (FIG. 5) per character tokenized, whereas the CountCharsA version only encounters the pre- and post-statement lists of the 'do-pattern' one time for the whole document, which is why it generates only 0.00013 instructions per character.

Thus, the anti-example version of CountChars generates a very large amount of side-effects, unnecessarily in view of the better version. The significance of the anti-example version of CountChars is that in this case, FIG. 8 shows that a large amount of time is being spent in the two uncorrelated 'buckets'—"main" and "overhead"—4997.08 and 2453.30 millis respectively. The "main" bucket reflects the amount of time to execute the side-effects. The "overhead" bucket represents the amount of time to aggregate the side-effects into a FORTH x-array, and resolve all of the capture point instructions. Only one other example generates such a large overhead due to side-effects, and in that one (FOOTBALL.TOK), it is necessary to do so because of the problem statement. Since side-effects are generally an aspect of the problem statement and not the solution, the weight of the side-effects is not a factor within the programmer's control, because the "main" and "overhead" buckets apply only to the aggregation of the "winning" thread, whereas the correlated 'statistics' and their associated 'buckets' reveal aspects about the complexity and quality of the regular expressions involved. However, in this example, a simple change eliminates almost all of the weight of the side-effects and is therefore advisable.

FIG. 13 shows that CountCharsA functions at 100 percent of 'DFA maximum speed' as expected, and the estimate from the 'derived factors' and the correlated 'statistics' indicates that this should be the case. Similarly, the anti-example version of CountChars functions at about 70 percent of 'DFA maximum speed' (excluding side-effect aggregation and execution), again agreeing with the estimate based on 'derived factors'. In this case, the 30 percent reduction from maximum speed is entirely due to 'instruction arc traversal', for which, as shown in FIG. 3, there is on average 1.00000 arc traversals per character tokenized. Even the Football example of section 8.8 which solves a typical HTML extraction problem, and has relatively small recognition units, only shows a value of 0.22703 for this statistic. A conclusion from this example is that except for contrived cases like the anti-version of CountChars, instruction traversal, aggregation and execution is not a tremendously important factor for the programmer to consider, being normally a fixed aspect of the problem statement. However, as shown in the AntiDFA section, proper positioning of the 'do-statement' insertion points can have a significant effect on the DFA-ness of the generated automata.

8.5.9 CountStrings Example

The example now considered is that of counting the overall weight of Java™ String literals in source code files. For example, the weight of the string literal "abc" (which might appear in a Java ™ source file) is counted as 5, 3 for each character of the literal, and 2 for its endpoints. Thus, rather than counting the number of String literal 'recognition units' found in the test suite, their weight is instead counted. The Base and BaseCount classes as already coded can still be sub-classed for this example, and the new @@ operator is again used to record capture positions rather than actually capture substrings, so that substring lengths can be deduced without incurring the penalty of actually creating a String object in memory as a side-effect. The script required (COUNTSTRINGS.TOK) is as follows:

```
1    load "./basecount.tok";
2    load "./find.tok";
3
4    struct CountStrings extends BaseCount {
5
6        production StringLit< > ->
7            do (int savepos = @@;
8                super.StringLit< >
9                ; count += @@ - savepos)
10       ;
11
12       static Pattern signal = "/*" | "//" |
                                 "'" | '\';
13
14       production DoEat< > ->
15           *Find<signal, Comment< > | StringLit< >
                    | CharLit< > >
16       ;
17
18       function String ReportUnits ( )
19       {
20           return "string literal total length";
21       }
22   }
23
24   static {
25       BaseCount doc = new Countstrings ( );
26       doc.Run("./CDROM/SRC/");
27   }
```

In this example, additional polymorphic leverage of production rules is evident. The StringLit< > production rule has already been defined in the Base class (section 8.5.3) to recognize a valid Java™ string literal. In keeping with the 'document design pattern', side-effects are now "mixed into" the 'most-derived class' above, by re-defining the StringLit< > rule on lines 6-10. A 'do-pattern' is used, whose 'pre-list stimt' on line 7 saves the capture position just prior to the beginning of the StringLit 'recognition-unit' (which is the lead double-quote character). Following the 'pre-list stint', the embedded sub-composition of the 'do-pattern' is simply the super-class version of StringLit< >. Note that contrary to the syntax of Save Java™, the super keyword in the grammar of the present invention does not stop at the immediate super-class in its search for a less-derived version of StringLit< > (which would have it look only in BaseCount) but does successfully find the definition in the Base class. The 'post-list stint' of the 'do-pattern' on line 9 also obtains a capture position, in this case being just after the recognition of the trail double-quote character of the string literal, and computes the length of the string which it adds to the "count" variable of the BaseCount class. Thus the only place where side-effects insinuate themselves into the automata (thereby solving the problem statement) are on lines 7 and 9, and, again these side-effects are in the 'most derived' class of the hierarchy according to recommended practice.

The second step of the solution is creating a 'most-derived' version of the 'document-level production rule', DoEat< >, appropriate to the solution of the string-literal weight-counting problem statement, found on lines 14-16. Here it is not sufficient to Find each "next" occurrence of a String literal, such as by the expression—*Find<StringLit< >>—because it is not desireable to include String literals in the source code which have been commented out, nor to misinterpret a character literal containing a double quote as the beginning of a string literal. Therefore a correct expression which excludes commented-out string literals is the find expression of line 18, for which the order of the union does not matter because the 3 elements of the union can never match the same characters.

The 'pinning specificity' of this example is very high, which is why the example functions at nearly 'DFA maximum speed ' despite the complexity of the automata. The reason for this high degree of 'pinning specificity' is the choice of the alternative 'signaling find-rule' used on line 15. In this case, rather that letting the target itself signal the beginning of the next element to "find" a specific union of sentinels is defined on line 12, which represent all of the ways to start any of the union of elements which form the target. This technique not only ensures a very high degree of 'pinning specificity', it also in this example ensures correct results. Both styles of comments, as well as valid string literals can nest each other in a variety of ways. Also, all of these sub-targets of the find rule are themselves formulated with a Find< >, which starts with a begin-sentinel and then looks for the nearest end-sentinel. Without the version that passes the individual sentinels of the inner hidden-finds to the outer find of line 15, the average 'thread-count statistic' rises to about 1.2, resulting in about a 25-percent loss in performance, and a string literal such as "/ / nested comment!"will match as a Comment1 rather than a string-literal. Thus, using the 'signaling find-rule' is a very important technique when the target is a union of sentinel-based (inner find) sub-targets that can nest/interleave one another. Fortunately, in many 'document-classifications' (especially very well-formed grammars) being tokenized, this is possible because both data grammars like XML and programming grammars like Java ™ are built to be at least somewhat friendly to parsers. In other types of problems whose 'document classifications' are of a more "fuzzy"nature, use of a 'signaling find' may not be possible, and the average thread-count is likely to rise, along with an expected reduction from 'DFA maximum speed' which can be inferred from the 'derived factors'.

8.5.9.1 CountStrings Performance Results Analysis

As seen from FIG. 13, this example runs at about 94 percent of 'DFA maximum speed', which is quite high considering the complexity of the problem statement and the generated automata. Although not exactly 1.00000 and 0.00000 respectively as in the 3 previous examples, the 'thread-count statistic' and the 'arcnum statistic' are close enough to these ideal values that the high level of performance is obtained, as seen from FIG. 3 (1.00861 and 0.02153 respectively). The 'instr statistic', 'spawn statistic', 'prune-simple statistic', 'accept statistic' are also non-zero, again reflecting automata complexity, but because of the success in the 'signaling find-rule' in allowing a high degree of 'pinning specificity', the result (excluding the weight of side-effect aggregation and execution) is 94 percent of 'DFA maximum speed'. Note also from FIG. 13 the closeness of the observed and estimated speeds.

8.5.10 CountCodeLines Example

In this example, lines of source code which contain source code tokens, other than just comments or whitespace, will be counted. Given the complexity of this problem, a Perl-like approach would likely make two passes, stripping the comments on the first pass, and on the second pass through the output of the first pass, would simply count the non-blank lines—this being preferred to a loop-based approach. However, the script now presented (COUNTCODELINES.TOK) requires exactly one complete pass through any document in the classification of Java ™/C++ source files, thus demonstrating a successful application to this problem statement of the 'document design pattern'.

```
1    load "./basecount.tok";
2    load "./find.tok";
```

-continued

```
3
4    struct CountCodeLines extends BaseCount {
5
6        production Comment1< > ->
7            "//" + Find< super.EOL< > >
8        ;
9
10       production EOL< > ->
11           super.EOL< > | Comment1< > | Comment2_withLF< >
12       ;
13
14       production SP< > ->
15           + (super.SP< > | Comment2_withoutLF< >)
16       ;
17
18       production BlankLine< > ->
19           ?SP< > + EOL< >
20       ;
21
22       production CodeLine< > ->
23           do (; Line< > butnot BlankLine< >; count++)
24       ;
25
26       production DoEat< > ->
27           *(BlankLine< > | CodeLine< >) + eof2
28       ;
29
30       function String ReportUnits ( )
31       {
32           return "code lines";
33       }
34   }
35
36   static {
37       BaseCount doc = new CountCodeLines( );
38       doc.Run ("./CDROM/SRC/");
39   }
```

The first step in solving this problem, as presented above, is to treat two varieties of comments, all comments of style 1, and those comments of style 2 which span two or more lines, as a form of EOL< > termination, much like a linefeed. Secondly, comments of style 2 which are fully contained within one line of source code are treated as another form of "whitespace". In this way, simple definitions for CodeLine< > and BlankLine< > can then be given, supplementing the definitions of the Base class, and allowing a very simple derived definition for the DoEat< > production rule (line 27) that "eats" the entire document in one pass. The important production rules of the fully-derived class comprise a total of essentially 6 lines of code, i.e. the regular expressions of lines 7, 11, 15, 19, 23 and 27.

On lines 6-8, the definition of Comment1< > is copied from the Base class, but the instantiation of EOL< > is changed to super.EOL< > to allow concurrent re-definition/derivation of EOL< >, discussed as step 1 above. This is necessary to avoid unwanted recursion (routed through the 'V-table'), because Comment1< > in the base-class is already defined in terms of EOL< >, and the more-derived version of EOL< > (given on line 11) is based in turn on Comment1< >.

On lines 10-12, a derived (extended) behavior for EOL< > is given, which is to be a union of (1) the super (Base) class behavior of EOL< >, (2) the behavior of Comment1< >, and (3) the behavior of Comment2_withLF< >. In this way, the definition of a linefeed is expanded to include also a Comment1 (which ends with a linefeed) as well as any Comment2 which spans multiple lines. This is a "one-pass" approach to stripping out such Comment1s and Comment2s by effectively turning them into an EOL< > recognition unit.

On lines 14-16, a derived (extended) behavior for SP< > is given, which looks for one or more repeats of either the super (Base) class definition of SP< > or a Comment2< > unit which is fully contained within one line (Comment2_without LF< >). In this way, the definition of a "whitespace" chunk is expanded to include any Comment2< >s fully contained within one line. This is a "one-pass" approach to stripping out such Comment2< >s by effectively turning them into SP< >s.

The definition for the BlankLine< > rule (lines 18-20) can now be given as an optional whitespace chunk (based on the newly given derived behavior of line 15 for SP< >) followed by an EOL< > (which is the newly given derived behavior of line 11 for a linefeed). This definition (of BlankLine< >) could reasonably have been included in the Base class, since its definition is based polymorphically on just SP< > and EOL< >, and if given in the Base class, would therein describe a line containing only ASCII tabs and ASCII spaces followed by a standard linefeed sequence.

The definition for a CodeLine< > (lines 22-24) starts with the Line< > definition of the Base class, and then disqualifies any matches which also match the BlankLine< > definition, through the use of the subjunctive butnot grammar, introduced in the 'first invention'. Note that the Base class's definition of Line< > is still appropriate (not needing derivation), because it is based (through the 'V-table') on the new derived behavior of EOL< > given above. Here (CodeLine< >) it is appropriate to include the increment to the "count" variable as a side-effect to recognizing a CodeLine< > unit.

Finally, the definition of DoEat< > (lines 26-28) is given, and defines the fully-derived behavior of the document-level production rule for the problem at hand (counting "real" lines of source code in one pass). This definition states that the DoEat< > behavior is to be a repeat (0 or more times) of a union of either a BlankLine< > sub-match or a CodeLine< > sub-match. Note that line 27 also includes explicit recognition of the eof2 sentinel, which is possible because the repeated union is guaranteed to always "eat" to the first EOF< > (hidden in EOL< >'s definition), and its use in this case does improve 'automata statistics'.

It has been verified through other examples as well as unit testing that this simple script does produce the correct behavior of counting all "relevant" lines of source code (in this case revealing how many "real" lines of code were required to achieve the "reduction to practice" requirement for the 'first invention'). The script is very easy to read and understand, and exhibits excellent one-pass performance as discussed in the next sub-section.

8.5.10.1 CountCodeLines Performance Results Analysis

Compared to the examples previously given, the CountCodeLines makes the first significant jump in 'thread-count', up to 1.36386 from FIG. 3 (relative to numbers all previously close to 0.00000). Along with this comes a large increase in the 'arcnum-statistic', simply because arcnum sequences now have to be accumulated in anticipation of the possibility of prune events.

As a result, a drop to 54 percent of 'DFA maximum speed' is seen in FIG. 13, which is predicted successfully by the estimate from 'derived factors', shown also in FIG. 13.

This example therefore has less 'pinning specificity' and less DFA-ness than the previously given examples. It can be seen from FIG. 6 and FIG. 7, that though no prune-comparison/elimination events actually occur ('prune-event' bucket is 0.00000 for the "codes" row of FIG. 7), much of the drop to 54 percent of max speed is due to the possibility of such 'prune-events', as reflected in (1) the 'arcnum bucket' of FIG. 6 which has jumped to 565.46 millis from 0.00 millis in the 'DFA-like' examples and (2) the 'prune-simple bucket' of FIG. 7 which has jumped to 287.34 millis from 0.00 millis in the 'DFA-like' examples.

8.5.11 CaptureCodeLines Example

An approach for extending the previously given CountCodeLines solution is now considered—wherein it is desireable not only to count the "true" lines of code encountered, but also to capture those lines into an array, demonstrating the 'expressivity' advantage in polymorphic production rules. The performance impact of such a solution is also considered.

The programming problem of this example is stated as follows: rather than simply counting "true" lines of source code, each code-line of the target file is captured into a member array of strings belonging to the most-derived class object. Care is taken not to include any trailing Comment1s or multi-line Comment2s which were made part of the expanded behavior of EOL< > in the CountCodeLines class (to be leveraged polymorphically for this solution). It is reasonable also not to include a linefeed in the captured String, common practice for a "readLine( )" function in any language. It is acceptable in this problem statement not to strip out single-line embedded Comment2s, rather treating them as valid elements of a "codeline", much as would a source-control viewer.

The script (CAPTURECODELINES.TOK) to solve this extended problem by leveraging the prior solution is as follows:

```
1       load "./countcodelines.tok";
2       load "./find.tok";
3
4       struct CaptureCodeLines extends CountCodeLines {
5
6           String[ ]   ar;
7           int         arpos;
8
9           production DoEat< > ->
10              do (ar = new, arpos = 0;
11                  super.DoEat< >
12              ;)
13          ;
14
15          production Line< > ->
16              &ar[arpos++] (
17                  Slack< EOL< > >
18              )
19              <+ EOL< >
20          ;
21
22          function String ReportUnits ( )
23          {
24              return "capture code lines";
25          }
26      }
27
28      static {
29          CountCodeLines doc = new CaptureCodeLines( );
30          doc.Run("./CDROM/SRC/");
31      }
```

The first noteworthy point of interest is that the entire solution, through OO leverage (polymorphic production rules) of the CountCodeLines class, is accomplished in a "struct" definition comprising 23 lines, and of these 23 lines, the essential new behavior is accomplished by the data definitions of lines 6-7 and the new behavior for Line< > coded on lines 15-20.

Line 6 defines an array of strings, which is initialized each time the document-level DoEat< > rule is "fired" (see line 10). Along with this variable, is a position index, to track the proper insertion point of each new "codeline" recognized. This variable is initialized along with the array of strings as a 'pre-list stmt' of the 'do-pattern' of the derived DoEat< > (line 10). In fact, the only reason to give a derived behavior for DoEat< > (relative to the super-class CountCodeLines) is the need to reinitialize the array of Strings each time the document-level DoEat< > rule is fired by the test-run code of the Base class.

Lines 15-20 provide a replacement behavior for the Line< > definition found in the Base class. This new definition of Line< > is sufficient to completely solve the problem as stated above. Note that rather than using the Find< > rule (see the load library FIND.TOK discussed in section 8.5.2), as was done with Line< > in the Base class of section 8.5.3, the Find< > rule is essentially rewritten in-line, so that the EOL< > is not included in the capture, only what comes before the EOL< > on a line (as per the problem statement). Because of the polymorphic workings of the 'V-table', the EOL< > referred to here on line 17 is actually the expanded EOL< > behavior given in the CountCodeLines super-class, which includes line-terminating comments (extraneous to desired string capture output). By this means, not only linefeeds, but also any Comment1s or trailing multi-line Comment2s, are excluded from the capture.

Because CodeLine< > (as written in the super-class Count CodeLines being leveraged from section 8.5.10) uses Line< > through the 'V-table', the new behavior for Line< > will "fire". Also, BlankLine< > (as written in CountCodeLines) does not use Line< > at all, which ensures that "blanklines" are not part of the capture.

8.5.11.1 CaptureCodeLines Performance Results Analysis

FIG. 13 shows that the performance of this example (41 percent of 'DFA maximum speed') is reduced relative to the super-class (CountCodeLines) upon which it is based (54 percent of 'DFA maximum speed'). There are primarily two reasons for this result—side-effect related costs, and automata-complexity related costs.

In terms of side-effect costs, there is: (1) an increase in the cost of side-effect execution (string capture and array manipulation in addition to the still occurring increment of "count"), a cost reflected in the "main" CPU bucket of FIG. 8 (780.66 millis for "capturing" versus 125.97 millis for "counting"); (2) an increase in the cost of side-effect aggregation time (primarily due to resolving the "capture" points of the inputstream), a cost reflected in the "overhead" CPU bucket of FIG. 8 (610.78 millis versus 368.31 millis). The additional time in the MAIN 'bucket' is also related to a 4× increase in the instrs/char column of FIG. 5 from "counting" to "capturing".

In terms of automata complexity related costs, there is in order of decreasing significance: (1) increases in CPU time measured in both the 'thread bucket' and 'trans bucket' as seen in FIG. 6, which is due to the increase in average 'thread-count' from 1.36386 to 1.43030 (FIG. 3); (2) an increase in the 'spawn-bucket' CPU-time as seen in FIG. 6, due to the increase in 'spawn statistic' from 0.06270 to 0.16996 (FIG. 3); (3) increases in all of the 'prune bucket' CPU-times of FIG. 7 and increases in the correlated 'prune statistics' of FIG. 4; (4) an increase in the 'arcnum bucket' CPU-time of FIG. 6, which is correlated with increased accumulation of 'arcnum sequences' due to more average extant automata threads (an increase from 0.75907 to 0.93817 in FIG. 3); (4) an increase in the 'instr bucket' CPU-time of FIG. 6, which is correlated with increased accumulation of 'instr snippets' due to more average extant automata threads as well as 2 additional instruction insertion points corresponding to "capture" (lines 16 and 18).

An indication for the cause of the problem is that the super-class (CountcodeLines) has given a derived behavior for EOL< > which is quite complex, and not very "pinning" for use as a sentinel parameter to the Slack< > rule on line 17. A second indication is that side-effects (lines 16 and 18) separate the two terms (lines 17 and 19) of the in-lined 'find-paradigm'. In particular, analysis using the 'automata statistics' for both example scripts using various test cases reveals that the following simple, "cycled, snippet of Java™ source code exhibits a high 'thread-count'differential between both examples ("counting " and "capturing"):

```
int a; // a comment1-style comment // nested upon // itself
```

The Slack<EOL< >> term of line 17 in the "capture" example is not sufficiently "pinning" to give performance close to the "counting" example, because: (1) the sentinel parameter to Slack< > is EOL< >, which includes an entire Comment1< > rather than just its start-sentinel; (2) such a Comment1< > can nest itself as shown above, accounting for two threads not seen in the "counting" example for such durations, one of which is pruned based on "right-to-left" greediness when the line 19 <+ operator is reached; and (3) subset construction is unable to overcome (for the "capture" example) the looseness of the EOL< > sentinel (with respect to a Comment1< > terminator) because of the insinuation of side-effects on line 18 between the line 17 and line 19 terms. Even a standard Comment1< > without the nesting shown above poses the same problem of requiring a second automata thread for the duration of the Comment1< > unit in the above test snippet, because the automata must anticipate the possibility of such nesting of a Comment1< > unit.

The following snippet of corrective script code addresses the "looseness" of the sentinel, by creating a set of begin-sentinels that pin ("alert") the start of the EOL< > as defined by the CountCodeLines super-class:

```
32        static Pattern signalLF = '[\r\n]' | eof;
33        static Pattern signalC2 = "/*" +
          (Find<signalLF> butnot Contains<"*/">);
34        static Pattern signalEOL = "//" |
          signalLF | signalC2;
```

And the following line of code is then a candidate replacement for line 17 above:

```
35                Slack< signalEOL >
```

With these simple changes, readability is somewhat reduced, but performance is improved significantly when tested against the same data, as seen in the "CaptCodesS" (signaling) rows throughout FIGS. 3-15.

From FIG. 13, the improved "capture" version now functions at 63 percent of 'DFA maximum speed' (excluding the cost of side-effect aggregation and execution), which is not only better than the 41 percent figure for CaptureCodeLines, but also better than the 54 percent figure for CountCodeLines. These few lines of corrective code employ the 'signaling paradigm', of the 'signaling find rule' (of FIND.TOK) by recoding the 'signaling find rule' in-line, so that capture of the "slack" (excluding the terminator) can be accomplished. The same technique can be applied to CountCodeLines, also with benefit.

One key to understanding this performance benefit (to the use of the 'signaling find' paradigm) is the 'prune-event' bucket of FIG. 7, which shows 0.00000 for the improved CaptCodesS row. There are no longer any events wherein two automata threads arrive at the same node at the same character position, and all of the cost of prune comparison/elimination is saved. A second key is that the average thread-count has dropped enough to make a noticeable impact (from 1.43030 to 1.23958 in FIG. 3). This drop in average thread-count shows that the 'signaling find paradigm' has indeed ensured that when a "codeline" (such as the test snippet shown above) contains a trailing comment 1 (quite frequent in source code such as that of the test suite being used) there are no longer 2 threads required for the duration of the trailing comment1, and that for such cases only 'prune-simple events' are needed to eliminate threads (not requiring a comparison).

A number of conclusions can be made: (1) when the thread-count statistic is higher than expected, a detailed examination of the regular expressions may uncover the possibility of improvement; (2) increasing the 'pinning specificity', especially through the use of the 'signaling find paradigm' is an important optimization technique (when needed); (3) the 'automata statistics' can be used to diagnose not only the effectiveness of various optimization attempts, but also to diagnose causality, especially when used with simple boundary-condition test cases; (4) solutions which do improve performance may come at a cost to readability, though not severe in this case.

8.5.12 CountCommentChunks Example

The example now presented is an alternative way to count comments. In this case, as opposed to counting the number of individual occurrences of (either Comment1< > and/or Comment2< > style) comments in the source code, "chunks" of comments are "counted" in the following way—comments that are on adjacent or same lines and not separated by any source code are all counted as one "chunk". This example does not require much additional code versus the CountComments example, but the automata complexity is much increased, and the reduction from 'DFA maximum speed' is noticeable. Significantly, the automata complexity is such that this example can be used in a sensitivity analysis (in the AntiDFA section to follow), in which various changes to the structure of the regular expressions are attempted which produce the same counting result, but different values of the various 'statistics', with expected changes in performance.

This example is contained within the script COUNTCOMMENTCHUNKS.TOK as follows:

```
1    load "./basecount.tok";
2    load "./find.tok";
3
4    struct CountCommentChunks extends BaseCount {
5
6        production Comment2< > –>
7            super.Comment2< > + ?(?SP< > + EOL< >)
8        ;
9
10       production CommentChunk< > –>
11           +(?SP< > + Comment< >)
12       ;
13
```

```
14       production DoEat< > –>
15           *do (; Find< CommentChunk< > >; count++)
16       ;
17
18       function String ReportUnits ( )
19       {
20           return "comment chunks";
21       }
22   }
23
24   static {
25       BaseCount doc = new CountCommentChunks( );
26       doc.Run("./CDROM/SRC/");
27   }
```

An expression to count chunks is based on defining an appropriate production rule to recognize one chunk (lines 10-12), and then wrapping this rule from inner to outer in a Find instantiation, a do-pattern to increment the member "count" variable, and a repeat expression (line 15).

The above approach is accomplished in the following way. (1) A new behavior for Comment2 (line 7) is derived, such that in the case where a Comment2's terminating */ is followed immediately by optional "whitespace" and a line-feed, both are incorporated into the recognition of a Comment2< >. The purpose is that this kind of "nearby" (seperated by only whitespace) linefeed should not separate a Comment2 recognition unit from any comments on the next line.

(2) This done, on line 11, a CommentChunk< > is defined as a repeating sequence of either SP< > (whitespace) or Comment< > (union of a Comment 1 or the newly derived version of Comment2 through polymorphism of the Base class). Given also (1) above, only an "un-comment-attached" linefeed or an actual non-whitespace, non-comment, code-token will now "break" the "eating" of a CommentChunk< >. Thus an "unattached" linefeed will be found on a blank (whitespace-only) line, or else most immediately preceded (other than whitespace) by a code-token. In contrast, linefeeds which are automatically "attached" to every Comment 1 and which are "attached" to Comment2's as in (1) above will not "break" the CommentChunk< > rule's "eating" behavior as defined on line 11.

As a result of (1) and (2) above, the Find< > rule, when applied to a CommentChunk< >, will successfully "eat" up to and including the next CommentChunk (in its entirety), and this CommentChunk will be broken by the first Java™/C++ "code-token" or "whitespace-only" line, as it should. The complete script was coded in 27 total lines, by leveraging the base-classes.

8.5.12.1 CountCommentChunks Performance Results Analysis

The fact that Comment1s and Comment2s can contain each other, are "convoluted" in this script through the unions, repeats and subjunctives implied in the solution, and are further combined in "chunks", suggests an automata complexity confirmed in the somewhat higher 'thread-count statistic' (1.13167 from FIG. 3) and 'arcnum statistic' (0.26967 from FIG. 3) versus the "nearly DFA" CountComments. This is reflected in the increase in the corresponding 'buckets' of FIG. 6, and ultimately the value of 74 percent of 'DFA maximum speed' in FIG. 13 (which is a 20-percent drop relative to CountComments.

There are fewer side-effects (increments to the "count" variable) generated by this example versus CountComments, reflected both in the reduced count produced by the example (13.500 chunks versus 32.734 comments) and the reduced 'instrs-per-char statistic' of FIG. 5 (0.00958 versus 0.02593) but in neither case is the number of increments to "count" sufficient to make an impact on overall speed, such as was seen in the CountChars anti-example of section 8.5.8.1.

Note that there are many levels of nested indeterminate quantifiers in this example—(1) the "eat until" behavior of Find< > on line 15, (2) the repeat behavior for a CommentChunk< > on line 11, (3) and the "eat until" behaviors hidden within the use of Find< > in both Comment1 and Comment2 as defined in the super-classes. This example therefore highlights the importance of both the polymorphic grammar power of the present invention to deliver a solution in minimal lines of code, as well as the 'linear algorithm', which allows such a 1-pass document-solution with side-effects to perform not only linearly, but at overall automata speeds that approach "DFA-speed" (74 percent).

A question arises as to the possible effectiveness of using a 'signaling find-rule' to improve this example. Consider the following definition of a signal, which could be added as a static regular expression to the CountCommentChunks class.

```
28    static Pattern signalC1C2 = "//" | "/*";
```

This regular expression would signal the start of either style of Comment. From examination of CommentChunk< > on line 11, and from the new behavior of Comment2< > on line 7, it is apparent that, aside from the issue of intervening spaces, a CommentChunk< > as defined still begins with the sentinel of line 28. Also, an examination of the 'signaling find rule' from FIND.TOK (section 8.5.2) shows that the purpose of the signal in such a Find< > is to ensure that the "slack" of the Find< > does not "eat" the "signal". Since every CommentChunk< > must begin with either "//" or "/*" (after some optional whitespace), use of the 'signaling find-rule' will give identical matches, when considering both the "slack" and target in the matches to Find< >. Line 15 above could then be modified as follows without affecting the "counting" result:

```
29    *do (; Find< signalC1C2, CommentChunk< > >; count++)
```

Such a modification was tested against the same suite of test files, and is reported through-out the Figures as the "ChunksS" row. From FIG. 13, it is apparent that this simple change to use the alternative, 'signaling find-rule', improves performance from 74 percent of 'DFA maximum speed' to 90 percent of 'max speed'. Much of the improvement, as with the similar improvement to CaptureCodeLines, is attributable from FIG. 6 to the 'arcnum bucket' and from FIG. 7 to the various 'prune buckets'. There are many fewer prune comparison/elimination events, and therefore less of a need to accumulate arcnums in anticipation of such a possibility. Such a result is expected when it is possible to employ the 'signaling find-rule', especially in a case such as this when the "signal" to the Find is reduced from the size of the entire target to the size of the begin-sentinels of the target. (A comment "chunk" is normally quite a bit larger than either 2 character sentinel.)

8.6 Anti-Design Patterns

In this section a variety of "non-best practices" are presented, which further illustrate by counter-example various principles of the 'document design pattern'.

8.6.1 AntiDFA Examples

This section presents a sensitivity analysis on the Count CommentChunks example, known to contain much automata complexity in terms of nested indeterminate quantifiers and subjunctive convolutions. In each of the 4 sub-examples to follow, various changes to regular expressions and production rules are explored, most of which make the solutions more difficult to read, but all of which are correctly coded in yielding the same "counting" result of 13.500 chunks found on average across the main test suite of 94 documents. In each case, the generated 'statistics' and 'correlated buckets' are analyzed, and advantages/disadvantages of various regular expression coding techniques are explained.

The first three sub-examples show degraded performance relative to the original CountCommentChunks example. This is seen by comparing the TOTAL column of FIG. 8 for the "Chunks" row versus the "ChunksA" "ChunksB", and "ChunksC" rows. Additionally, three "cycled" snippets of pseudo-Java™ code are used to isolate aspects of the solution which contribute to the degraded performance. For the results of the boundary-case snippets, shown in FIGS. 17-19, each "snippet" is cycled enough times to total 400000 characters.

The first "cycled" boundary-case snippet consists of a single comment of style 1, which is preceded on its line by 32 spaces, as shown in FIG. 17. The "counting" result for this cycled-snippet is one "chunk" for the entire cycled-document, an aggregate total of 1 which is correctly calculated by all 4 variations of the "chunks" examples tested. The second "cycled" boundary-case snippet consists of a single pseudo code-line, "cycled" enough times to total 400000 characters. Because it contains no comments at all, this "cycled" document produces a "count" of 0 for all 4 variations of the "chunks" examples tested. The third "cycled" boundary-case snippet consists of 4 pseudo code-lines followed by a comment1-style line. This "cycled" snippet correctly produces a "count" of 1 per "cycle" for all 4 variations of the "chunks" examples tested. These boundary-case snippets are representative of 3 general "chunk" related areas of the main test suite—(1) comments of style 1 which are indented by 4 or more spaces, (2) large uncommented portions of a source-code file, and (3) interleaving of "chunks" and source-code.

8.6.1.1 CountCommentChunksA ('Pinning Specificity')

In the example now presented, a change to the CommentChunk< > definition is made, which causes a loss in end-point 'pinning specificity'. The important principles to be illustrated include not only the importance of achieving 'pinning specificity' but also that 'automata statistics' can help identify boundary-condition test cases that cause the average thread count to rise significantly from the desired 1.00. The script for this example (COUNTCOMMENTCHUNKSA.TOK) involves a very slight alteration to the original (of section 8.5.12) upon which it is based:

```
 1    load "./basecount.tok";
 2    load "./find.tok";
 3
 4    struct CountCommentChunks extends BaseCount {
 5
 6        production Comment2< > –>
 7            super.Comment2< > + ?(?SP< > + EOL< >)
 8        ;
 9
10        production CommentChunk< > –>
11            + (Comment< > + ?SP< >)
12        ;
```

```
13
14          production DoEat< > ->
15              *do (; Find< CommentChunk< > >; count++)
16          ;
17
18          function String ReportUnits ( )
19          {
20              return "comment chunks A" ;
21          }
22      }
23
24      static {
25          BaseCount doc = new CountCommentChunks( );
26          doc.Run("./CDROM/SRC/");
27      }
```

The change on line 11, relative to the original CountCommentChunks, is simply to swap the order of the two concatenation terms. In CountCommentChunks, the whitespace separator for comments belonging to one "chunk" was the first term of the concatenation with Comment< >, versus for this anti-example, it is found as the second term in the definition of CommentChunk< >. Such a simple change is sufficient to increase all of the 'thread statistics' somewhat, including of special note the 'spawn statistic' (FIG. 3) and the 'accept statistic' (FIG. 5). In fact, all of the correlated statistics in both FIG. 3 and FIG. 4 show increases between the "Chunks" row and the "ChunksA" row.

A cause for this increase is identified by the first of the three "cycled" snippets. The "cycled" snippets of FIGS. 18 and 19 show no differences at all between the "Chunks" and "ChunksA" rows. The "cycled" snippet of FIG. 17, however, shows signficant to very signficant increases in all correlated 'statistics'. The "cycled" snippet of FIG. 17 is a Comment1< > unit indented by 32 spaces, exaggerating the trend across the testsuite of 94 documents, in which most Comment1< > units are indented by 4 spaces (rather than an ASCII tab).

The uncorrelated 'accept-statistic' of FIG. 17 helps to explain the cause of this increase. In FIG. 17, the 'accept-statistic' has increased by a factor of 32.98. Based on the two values (0.01539 and 0.50761), there are roughly 1 intermediate "accepts" per 65 characters of "cycled" snippet for "Chunks" and there are roughly 33 intermediate "accepts" per 65 characters of "cycled" snippet for "ChunksA". These 32 additional intermediate "accepts" correspond to the 32 space characters which precede the indented Comment1< > unit of the "snippet". Along with the additional uncorrelated intermediate "accept" events, comes a 33× increase in the number of spawn events, seen from the SPAWN column of FIG. 17 for "Chunks" and "ChunksA". In fact, half of the spawn events are a direct result of intermediate "accepts", and the other half of the spawn events also scale at 33× along with the increase in intermediate "accepts". These spawn events are a significant cause of performance reduction of the "snippet" of FIG. 17, and are likewise an important cause of performance reduction between "Chunks" and "ChunksA" against the main test suite, as seen from FIGS. 6 and 7.

This result is understood as follows: (1) neither the original "Chunks" nor "ChunksA" uses an eof2 in the solution; (2) without an eof2, an intermediate "accept" is required after every possible end-point for a CommentChunk< >, because (from the standpoint of the automata thread states) each "chunk" could be the last to be found in the "cycled" document; (3) in the original, a CommentChunk< > ends with the end-point of a Comment< >, which in the case of the "cycled" snippet, is the ASCII-LF, occurring once per 65 characters; (4) in the anti-example, a CommentChunk< > ends with optional whitespace, which means that not only does an ASCII-LF (which terminates a Comment1< >) provide a possible end-point, but so do each of the 32 spaces that follow (because of the ?SP< > term); (5) the swapping of the two terms, although not affecting the "counting" result, causes 32 additional intermediate "accept" conditions per "cycled" snippet.

In conclusion, end-point specificity of a recognition unit (in this case CommentChunk< >) is an important factor to consider when there are alternative ways to formulate a repeat expression. It is therefore advisable, in a repeat of two concatenated terms, to choose to optionalize the first term rather than the second term, especially if the optionalized term itself hides a repeat such as a sequence of 0 or more ASCII space characters. It is also advisable to create boundary-condition "cycled-snippet" documents, and verify that a good performance-wise choice has been made based on the 'automata statistics'.

8.6.1.2 CountCommentChunksB (Concatenation Boundaries)

Another area of focus, when 'pinning specificity' choices can be made, involve concatenations in which two adjacent concatenation terms can share matches through nested indeterminate quantifiers. The following example (COUNTCOMMENTCHUNKSB.TOK) illustrates this performance issue:

```
1       load "./basecount.tok";
2       load "./find.tok";
3
4       struct CountCommentChunks extends BaseCount {
5
6           production Comment2< > ->
7               super.Comment2< > + ?(?SP< > + EOL< >)
8           ;
9
10          production CommentChunk< > ->
11              + (?SP< > + Comment< >)
12          ;
13
14          production NonComment < > ->
15              Slack<"//" | "/*">
16          ;
17
18          production DoEat< > ->
19              *do (; Find< CommentChunk< > >; count++)
20              + NonComment< >
21              + eof2
22          ;
23
24          function String ReportUnits ( )
25          {
26              return "comment chunks B";
27          }
28      }
29
30      static {
31          BaseCount doc = new CountCommentChunks( );
32          doc.Run("./CDROM/SRC/");
33      }
```

In the above lines of code, relative to the original CountCommentChunks example (section 8.5.12), only one rule has been added (NonComment< > of lines 14-16) and one rule has been changed (DoEat< >). The motivation behind attempting such a change is to improve the original CountCommentChunks example by eliminating all intermediate accept conditions, essentially by "mixing in" the use of eof2 in the DoEat< > rule (line 21).

In order to allow the 'document-level production rule' of line 18 to include an eof2, another term—Non Comment< >—is inserted into the concatenation sequence, which "eats" the slack between the end of the last "chunk" and the second eof-sentinel (eof2). Since the last "comment chunk" can be followed by lots of source code lines, or by whitespace, NonComment< > must "eat" source code and whitespace, which it does simply by specifying that the "slack" which it "eats" must not include the 2 sentinel sequences—"//" and "/*"—which can begin either style of comment.

The use of the "slack" term (NonComment< >) and the eof2 sentinel is successful in completely eliminating intermediate accepts ('accept statistic' of 0.00000 versus 0.00432 in FIG. 5). The performance cost to "ChunksB" of eliminating intermediate "accept" events (across the main testsuite) is a very large increase in average 'thread-count statistic' (from 1.13167 to 1.99204 in FIG. 3), 'arcnum statistic' (from 0.26967 to 1.96339 in FIG. 3), and 'prune-simple statistic' (from 0.26876 to 1.96820 in FIG. 3).

This is the first example seen herein in which the 'thread count' is essentially 2 throughout automata execution, and this aspect causes all of the aforementioned 3 statistics to take large jumps compared to examples which are "nearly DFA", the result being that performance of "ChunksB" drops (FIG. 13) to 35 percent of 'DFA maximum speed' across the main testsuite of 94 documents.

The "cycled" snippet (boundary-condition case) which helps to expose causality is shown in FIG. 18. This snippet is simply an uncommented line of code, and when "cycled" to 400000, results in one very large document with no CommentChunks< > to be found at all.

For the "cycled" snippet of FIG. 18, the 'thread-statistic' has doubled from 1.00000 to 2.00000 between "Chunks" and "ChunksB". When only one automata thread exists, there is no need to accumulate arcnums, but with 2.00000 threads on average, arcnums must now be accumulated and prune-simple events must now occur, one per "extant" thread per character.

The cause for this significant change, when tested against the "cycled" boundary-case snippet of FIG. 18 (consisting of no comments whatsoever), is as follows: (1) at any given point of the document in which a comment is not being recognized, the Find<CommentChunk< >> term on line 19, because it is wrapped in a repeat 0 or more expression, is "looking" for the start of the next "chunk" to make a automata node-transition into states reflecting the "eating" of the next "chunk"; (2) since it is looking for the start of the next "chunk" (which in fact never arrives in this "cycled" snippet), one "extant" automata thread is required; (3) meanwhile, another possibility exists, which is that there are no more "chunks" to be found; (4) for this possibility, the NonComment< > term of line 19 simultaneously requires one additional thread; (5) the above conditions stay in effect throughout any document such as the "cycled" snippet which contain no "chunks" at all, so a result of 2.00000 threads is to be expected for this "cycled" snippet.

For other documents which do contain "comment chunks", the above conditions are also in effect at character positions which cannot belong to a "chunk". Furthermore, the main testsuite, although well-commented, consists mostly of actual code-lines. Although many additional boundary-condition cases could be tested, this "snippet" (of FIG. 18) has uncovered a significant cause for the average 'thread-count' of 1.99204 (FIG. 3) found for "ChunksB" across the main testsuite. This cause is the fact that the NonComment< > term of line 11 and the repeated Find< > term of line 11 require simultaneous threads (while "eating" characters not belonging to any "chunk") because it is unknown whether or not the file has more "chunks" to follow at any given character position.

The above analysis easily disqualifies this attempt at formulating an expression with eof2, since both the original, and the signaling version, of section 8.5.12, have a much lower average thread-count. The above analysis also demonstrates that the end-points of adjacent concatenation terms should ideally have as little intersection as possible. In this case ("ChunksB"), signficant intersection is found between the begin-point of the first term (the Find< > rule whose "slack" are those characters which precede a "chunk") and the begin-point of the second term (characters which do not include a "chunk"). Because the first term is wrapped in a repeat 0 or more expression, both end-points of the first term must be compared against the begin-point of the second term to look for intersection.

The thread-count average for this example (against the main testsuite) is slightly less than 2. This means that there are indeed document regeneration points in which there is a return to 1 term and thus a return to 1 thread. This occurs whenever a "begin-comment" sentinel is "eaten", which effectively terminates the extra "thread" belonging to the NonComment< > term. Also noteworthy is the fact that the cost of "prune-comparisons" is not increased by the "extra" NonComment< > related thread, but it still confined to the internal complexity of the first term of the concatenation. This is seen from the observation that the 'prune-event statistic' is 0.00224/0.00223 in both this anti-example and the original (FIG. 4), and is explained in the fact that there is absolutely no inter-section between the conditions that terminate the NonComment< > thread (through subjunctive disqualification in the Slack< > rule) and the conditions that allow another Comment< > to be found. Both the disqualification and the continue-criterion are the recognition of a two unambiguous begin-sentinels for either of the two comment styles. Therefore, the "extra" thread can be eliminated without an arcnum-sequence comparison, though such prune-comparison is still needed to a limited degree as before due to the complexity of the "chunk" definition.

Finally, this example, though it performs at only 35 percent of 'DFA maximum speed', still performs 'linearly' and in accordance with the prediction of the 'derived factors', as seen in FIG. 13.

8.6.1.3 CountCommentChunksC (Ambiguity Resolution)

In this example, the NonComment< > instantiation of line 19 above is replaced by *any. A correct result of counting 13.500 "chunks" per test run is still reported, because of the proper ambiguity resolution of the default left-to-right concatenation operator, which also requires many additional prune-comparison eliminations. The purpose of this example is to (1) demonstrate the additional performance costs often incurred by depending on ambiguity resolution rather than "pinning specificity", and to (2) create an example which shows very large prune-comparison costs. The code (COUNT COMMENTCHUNKSC.TOK) is as follows:

```
1    load "./basecount.tok";
2    load "./find.tok";
3
4    struct CountCommentChunks extends BaseCount {
5
6        production Comment2< > –>
7            super.Comment2< > + ?(?SP< > + EOL< >)
```

-continued

```
 8              ;
 9
10              production CommentChunk< > ->
11                  + (?SP< > + Comment< >)
12              ;
13
14              production DoEat< > ->
15                  *do (; Find< CommentChunk< > >; count++)
16                  + *any
17                  + eof2
18              ;
19
20              function String ReportUnits ( )
21              {
22                  return "comment chunks C";
23              }
24          }
25
26      static {
27          BaseCount doc = new CountCommentChunks( );
28          doc.Run("./CDROM/SRC/");
29      }
```

The first change relative to the previous example (Count CommentChunksB) is to remove the definition of NonComment< > shown previously. The second change is found on line 16, replacing the NonComment< > recognition term with *any. This replacement term—*any—still correctly "eats" the final "NonComment" slack in any document because the line 15 and line 16 terms are separated by a default left-to-right concatenator operator, which prefers the line 15 term in relative "greediness". This approach sacrifices the "pinning specificity" achieved previously by using the Slack< > rule (and its hidden subjunctive grammar) to define NonComment< >. In fact, the *any term has no "pinning specificity" at all.

In performance results for the main testsuite, FIGS. 3 and 6 show some degree of increase in the the 'thread-statistics'. FIGS. 4 and 7 show that the major portion of the additional performance loss relative to the "ChunksB" example are found in costs related to prune-comparison eliminations. The net result is a further drop in percentage of 'maximum speed', from 35 to 27 percent (FIG. 13).

The "cycled" snippet boundary condition test cases are again useful in helping to explain the performance loss, and the change in average statistics. FIG. 18 shows that for documents which contain no "chunks" at all, the statistics for this example are identical to those of the "ChunksB" example. In particular, there are 2.00000 automata threads throughout the execution of "ChunksC" against the FIG. 18 snippet. As with "ChunksB", one of those threads belongs to line 15, which is looking for the start of another "chunk" through the inner workings of the Find< > rule, as applied to the CommentChunk< > definition. The second thread required for "ChunksC" is again related to the term responsible for recognizing the final NonComment< > unit, in this case *any.

However, the snippet boundary-case of FIG. 19 (which does include a countable "chunk") shows that this second thread (associated with the line 16 *any term) is never eliminated, even in the presence of "chunks", which is understandable. In fact, throughout automata execution, the line 15 term is always associated with at least one "extant" thread because execution will either be handling the recognition of a "chunk" (requiring at least one thread) or else will be looking for the start of the next "chunk" (requiring at least one thread). The line 16 term is also always associated with one thread (for "ChunksC"), based on the fact that *any matches at every character position of the document.

In terms of a side-by-side analysis of prune-comparison/elimination costs for ChunksC (this example) and ChunksB (prior example), FIG. 19 shows a large differential in prune-comparison costs. The "snippet" for this figure does involve exactly 2 threads for ChunksC (as already explained above) and almost 2 threads on average for ChunksB. The thread-elimination in ChunksB is effected by the use of the subjunctively coded definition of NonComment< >, which causes the thread associated with the NonComment< > term to simply terminate (without a comparison) when the disqualifying sentinel "//" is reached. This is well-reflected in the 0.00000 (on-average) frequency of prune-events for ChunksB against the FIG. 19 "snippet". However, for ChunksC, as already stated, the second thread, i.e. that associated with the *any of line 16, cannot be terminated by subjunctive disqualification (because it involves no sentinels), but rather, when pruned, is immediately replaced. That it must be pruned (and regenerated) is a artifact of the following: (1) a "chunk" occurs every 163 characters in this example; (2) each time a "chunk" is found relative to line 15, automata state must reflect that it is appropriate for the "winning" thread to include this additional "chunk" (instead of allowing the *any term to be the "winner" for that "chunk"); (3) the thread handling the *any term, because it is the "loser" for the current "chunk", must be pruned according to the 'linear algorithm' of the 'first invention' to avoid an exponential explosion of threads; (4) a replacement thread is immediately found for the *any term, because *any matches all characters of the document and can therefore be constantly "mapped" to one thread (as seen in the value of 2.00000 for thread-count for ChunksC); (5) the prune-length is 163.93, corresponding with the "cycle-size" for this "snippet" of 163 characters.

Thus from the "snippet" and results of FIG. 19, it is seen that an important boundary-case exists which contributes highly to the prune-comparison costs for ChunksC (against the main test-suite) and not at all to those costs for ChunksB. This boundary-case represents a large number of code-lines separated by a comment "chunk" (in this case a single Comment1< >). The differential is seen in the above analysis to be caused, in the case of ChunksC, by pruning-aspects of ambiguity resolution for the concatenation operator of line 16 above (in front of the *any term) and, in the case of ChunksB, is seen in the way in which a subjunctive disqualification (of the NonComment< > thread) can take place without the need for a prune-comparison.

A conclusion is that use of the subjunctive is preferred to ambiguity resolution of unions and concatenations, when: (1) a choice is available, (2) neither solution exhibits N-squared behavior, (3) the additional performance gain of a subjunctively coded solution justifies a possible loss in readability.

8.6.1.4 CountCommentChunksD (Full End-Point Pinning Specificity)

The following example does succeed in the original goal of eliminating the intermediate "accepts" of the original, non-signaling, CountCommentChunks example, without the additional (and significant) performance costs exhibited by the previous three AntiDFA examples. In this example, the use of the Find<"chunk"> rule is removed completely from the solution, and the begin-points and end-points of each adjacent term are crafted in a way so as to reduce intersection. The script which accomplishes this goal (COUNTCOMMENTCHUNKSD.TOK) is as follows:

```
1       load "./basecount.tok";
2       load "./find.tok";
3
4       struct CountCommentChunks extends BaseCount {
5
6           production Comment2< > ->
7               super.Comment2< > + ?(?SP< > + EOL< >)
8           ;
9
10          production CommentChunk< > ->
11              Comment< > + *(?SP< > + Comment< >)
12          ;
13
14          production NonComment < > ->
15              Slack< "//" | "/*" >
16          ;
17
18          production DoEat< > ->
19              NonComment< > +
20              *do (;
21                  CommentChunk< > +
22                  NonComment< >; count++)
23              + eof2
24          ;
25
26          function String ReportUnits ( )
27          {
28              return "comment chunks D";
29          }
30      }
31
32      static {
33          BaseCount doc = new CountCommentChunks( );
34          doc.Run("./CDROM/SRC/");
35      }
```

The first step in this solution is to change Comment Chunk< > so that the SP< > term is not found on either end of the "chunk". This increases the 'pinning specificity' of the CommentChunk< > rule, based on the discovery of the "ChunksA" section. The second step in the solution is to incorporate the definition given in CountCommentChunksB for NonComment< >. The last step of the solution (DoEat< >) is to start (line 19) with the NonComment< > "slack" term (which may in fact "eat" no characters at all), and concatenate to this term a repeat (0 or more) of alternating "chunks" (line 21) followed by "slack" (line 22). Note that the document-level production rule, DoEat< >, can now be coded without a Find< > rule.

In consideration of the intersection of begin-sentinels and end-sentinels of adjacent concatenation terms, (1) the transition from the end of line 22 back to line 20 involves the intersection of the end of "slack" with the beginning of a "chunk" and (2) the transition from the end of line 21 into the beginning of line 22 involves the intersection of the end of a "chunk" with the "beginning of "slack". Both the "chunk" and "slack" terms are crafted to reduce intersection at the boundaries of the terms and the result is an automata which performs as well as the original CountCommentChunks (but not as well as the version which is based on the 'signaling find' rule). In fact, the statistics for the rows "Chunks" and "ChunksD" are quite similar in both FIGS. 3 and 4.

The mode of solution avoids the use of the Find< > rule, and is similar to that employed by CountCodeLines and CaptureCodeLines, creating a repeat of 0 or more occurrences of a concatenation of the two terms (line 21 and line 22) which represent the alternating recognition units of the problem. The improvement over "ChunksB" and "ChunksC" is that the two terms which recognize the alternating recognition units are crafted to reduce intersections at begin-points and end-points which could compete for the same characters of the inputstream.

8.6.2 Anti-Poly(morphism) Example

An important question pertains to the performance cost expected for employment of a polymorphic (virtual production rule member-based) solution, versus a solution that uses only (static) production rules and regular expressions defined in 'global-scope'. In the following example (ANTIPOLY.TOK), a solution to the problem of counting "true" source code lines is re-coded, which adheres to the 'recognition-unit' form of the production rules of CountCodeLines. The re-coded production rules (with the exception of the document-level DoEat< > rule) are made static rather than virtual members, in the attempt to gain a performance advantage by eliminating instruction-arc overhead of the implicit "this-pointer". The DoEat< > rule remains non-static in order to have access to the non-static "count" member variable. All of the rules other than the DoEat< > rule are involved in nested instantiations, and include no directly coded side-effects. Finally, a motivating issue is-that using a static member production rule has the same performance-wise effect as using a production rule defined in 'global-scope' (outside of a struct), the differences being semantic in nature and relating to name-spaces.

The re-coded solution (ANTIPOLY.TOK) to CountCodeLines is presented as follows:

```
1       load "./basecount.tok";
2       load "./find.tok";
3
4       struct AntiPoly extends BaseCount {
5
6           static production ThisLF< > ->
7               '\n' | "\r\n"
8           ;
9
10          static production SuperEOL< > ->
11              ThisLF< > + eof | ThisLF< > | eof
12          ;
13
14          static production ThisComment1< > ->
15              "//" + Find< SuperEOL< > >
16          ;
17
18          static production ThisComment2< > ->
19              "/*" + Find<"*/">
20          ;
21
22          static production ThisEOL< > ->
23              SuperEOL< > | ThisComment1< > |
                (ThisComment2< > but Contains< ThisLF< >
            >)
24          ;
25
26          static production SuperSP< > ->
27              +'[ \t]'
28          ;
29
30          static production ThisSP< > ->
31              +(SuperSP< > | ThisComment2< > butnot
                Contains< ThisLF< > >)
32          ;
33
34          static production ThisBlankLine< > ->
35              ?ThisSP< > + ThisEOL< >
36          ;
37
38          static production ThisCodeLine< > ->
39              Find< ThisEOL< > > butnot ThisBlankLine< >
40          ;
41
```

```
42           production DoEat< > ->
43               *(ThisBlankLine< > | do (; ThisCodeLine< >;
                 count++)) + eof2
44
45           ;
46           function String ReportUnits ( )
47           {
48               return "code lines (antipolymorphism)";
49           }
50       }
51
52       static {
53           BaseCount doc = new AntiPoly( );
54           doc.Run("./CDROM/SRC/");
55       }
```

The struct/class contained in the above code is a re-coding of the significant recognition elements of the Base class, as well as all of the recognition elements of the CountCodeLines script, all as static production rules, with the exception of DoEat< > which must still update the non-static "count" member variable. As static members (which never imply a "this" param), these production rules will never generate any code (including possible side-effects) pertaining to the implicit "this param", and therefore seems to offer the possibility of superior performance to the original CountCodeLines. In some cases, a rule definition is "macro-expanded", in that rather than providing separate definitions for the Comment2_withLF< > and Comment2_withoutLF< > rules, the necessary regular expressions are coded in-line (lines 23 and 31). Also, rather than creating a definition for EOF< >, the eof literal is used in-line.

Therefore, the semantics of this example are equivalent to those of the more polymorphic CountCodeLines example, though the resulting FORTH-level regular expression compositions differ. However, the structure and performance characteristics of the automata for the AntiPoly example and that of the original CountCodeLines are identical, based on verifying in testing that all correlated 'statistics' produced by the original and the less polymorphic anti-example are identical. This conclusion also relies upon the premises of section 8.7, in which performance of a solution is dependent on the 10 correlated statistics.

There is no performance advantage (under the 'document-level-design' pattern) to coding a production rules (other than the document-level DoEat< > rule) as static, because the FORTH-engine cost of looking up 'V-table' instantiator-procs is incurred along with other overhead associated with each instantiation of the 'document-level production rule' and is never part of the automata. Also, there is no performance advantage related to the instruction arcs of the 'automata, evidenced by the fact that all of the correlated 'statistics' are unchanged from the original, including even the 'instrs-per-char statistic'. The latter result is attained through optimizations relating to the management of the 'this global' (section 8.9.2.3), which is not made part of implicit 'do-patterns' in rule instantiations, unless there are instantiations of rules belonging to other object instances within the body of a production rule.

Scripts written to the grammar of the present invention should generally be written polymorphically in the following way. First, create a base-class (or hierarchy of base-classes) in which are placed virtual production rules that define the recognition behavior. Side-effects should not be included in the base-class production rules, implying that the default rules of the base-class are not normally to use the "implicit this-param". Nevertheless, there is no performance overhead to this decision to make the production rules that "eat" recognition units virtual, and by doing so, additional "derivation-leverage" options are opened to the programmers of the 'most-derived' classes. After this "Base" class is created, side-effects of recognition should normally be incorporated in more-derived classes, putting "capture" and "control" member variables into the more-derived classes, and using 'do-pattern' and 'capture-pattern' wrappers in conjunction with the super keyword to invoke the base-class behaviors. There is no performance advantage in making the member production rules of the class static (non-virtual). The 'recognition units' of the 'document classification' are therefore ideally coded as virtual production rules of the base-classes, without side-effects—in the anticipation of multiple and changing problem statements relative to the document classification implied by those "Base" class production rules.

8.6.3 Anti-Linear Pattern

A case is now considered in which the 'linear (pruning) algorithm' of the automata execution engine performs at N-squared relative to an input-stream of size N. The stated goal of the following script, which exhibits N-squared behavior, is similar to that of CountComments: simply "count" all comments of either style. In addition, the original problem statement of section 8.5.6 is modified, so that an "unfinished" Comment2< > unit is also now subject to explicit "counting".

Also, an anomaly is intentionally introduced into the script, such that the production rule for OpenComment2< > ("unfinished" Comment2< >) omits the qualification that "slack" from begin-sentinel to "eof" must not "contain" a proper */ end-sentinel. This omission, in combination with the ambiguity resolution rules of the present invention (inherited from the 'first invention'), results in incorrect "counting" results, and additionally results in N-squared behavior for a particular boundary-case "cycled-snippet". This anomalous script is presented as follows:

```
1        load "./basecount.tok";
2        load "./find.tok";
3
4        struct AntiLinear extends BaseCount {
5
6            constructor ( )
7            {
8                fileSize = 80000;
9            }
10
11           production OpenComment2< > ->
12               "/*" + *any + eof
13           ;
14
15           production Comment2< > ->
16               super.Comment2< > | OpenComment2< >
17           ;
18
19           production DoEat< > ->
20               *do (; Find< Comment< > >; count++)
21           ;
22
23           function String ReportUnits ( )
24           {
25               return "comments (antilinear)";
26           }
27       }
28
29       static {
30           BaseCount doc = new AntiLinear( );
31           doc.Run("./testpatent/files/comment/");
32       }
```

The production rule to recognize an OpenComment2 ("unfinished" Comment2) is written on lines 11-13. Its regular expression starts with a string literal to recognize the beginning of such a comment which is the /* sequence. This is followed by *any+eof to "eat" to the end-of-file. The omission is the failure to qualify the *any with a subjunctive, which could have been accomplished as follows, with line 33 replacing line 12:

"/*"+(*any butnot Contains<"*/">)+eof

In the script as written, the problematical version of OpenComment2< > is then used to extend a derived definition of Comment2< > given on lines 15-17. Then, the DoEat< > document-level production rule of line 20, uses the non-'signaling find' to search for repeated occurrences of a union of essentially 3 'recognition units' which now comprise a Comment< >. Note that the interleavability of targets is exacerbated by the third OpenComment2< > target, and even more so by its problematical coding.

This script is now tested (using various 'cycle-sizes') against a single file containing the following snippet of Java™ code:

```
1 /*
2 //67
3 //2345
4 */
```

When "cycled", this snippet produces a series of Comment2< > units, each of which contains an embedded Comment1< > unit. This "inner" comment 1 is not to be recognized as a Comment1, because it is nested in the Comment 2< > unit. In fact, such a comment nesting does take place in the main testsuite, in which a block of source-code including its Comment1s< > is "commented out".

In a properly coded solution which replaces line 12 with line 33, all of the Comment2< > "outer" units are correctly counted, meaning the "count" of 1 (per "cycle") is returned. As written, however, the script produces an aggregate "count" of 1 for the entire "cycled" file, and also exhibits the performance results of FIG. 16.

The problematical version (as coded and tested) "eats" the opening /* sentinel of the cycled-document, and then chooses, through prune-comparisons, to "eat" all the way to the "eof", producing for the "winning" thread exactly one 'recognition-unit' for the whole "cycled" document. This result for the problematical expression of line 12 is produced by the engine (as it should), because line 12 actually matches the entire "cycled" file, and such a singleton-match is expected by application of the ambiguity resolution rules of section 8.3.

FIG. 16 shows the results of testing the above problematical script against various 'cycle-sizes' of the given problematical snippet. It can be seen from this figure that the following statistics double with each doubling of the 'cycle-size': PRUNE-ARC, PRUNE-WEIGHT, and PRUNE-ACCUM. This is a sign to the programmer than pruning-comparisons are occurring at regular intervals of the cycled-document, growing in comparison distance at each occurrence. Also likely with such an observation, and true with this example, is that the (backward) comparison concludes at the same point of the document each time, which is all the way to the front of the cycled-document, which begins with a /* sentinel. Additionally, as with this example, a common origin for the pruning decision at each pruning point implies a 'recognition-unit' state that once entered, will accumulate to itself the entire document. In this case, the singleton-result, which incorrectly "counts" only one unit for the whole document, corresponds with N-squared behavior.

The PRUNE-ARC, PRUNE-WEIGHT, and PRUNE-ACCUM statistics all double with each doubling of document size. When such a normalized (per character) statistic doubles with document size, it eventually becomes a bottleneck of execution, and the point is quickly reached whereby elapsed execution time quadruples each time the document size is doubled. This is seen in the "CPU Time" column of FIG. 16, which gives 'automata time' in units of seconds per million characters. With each doubling of 'cycle-size', the automata buckets require twice as much time on a per character basis, indicating that total elapsed performance is quadrupling. These are the indicators of N-squared performance, as was stated in the 'first invention' is the worst-case performance for the 'linear algorithm'.

Note that the "Estimate" column agrees with the "Observed" column (the last two Columns of FIG. 16). This shows the accuracy of the 'median estimates' of 'derived factors'. The variance increases with increasing 'cycle-size', a sign as discussed in section 8.7.3 that Java™ GC plays a greater role in affecting variance between "observed" and "estimated" results as the chains of arcnum sequences get larger and larger.

This problematical example does not demonstrate good coding techniques in the grammar of the present invention. Rather, it shows that examples can be created that exhibit N-squared behavior, that such behavior can be detected at early stages by the programmer through study of boundary-case snippets relative to the PRUNE-ARC statistic, and that the performance results of N-squared performing solutions are also predicted by the equation of section 8.7.1.

8.7 'Derived Factors' and 'Automata Statistics'

In prior sections, 'automata statistics' generated by test runs for various examples (and boundary-case "snippets") are used in diagnosing causality in under-performing regular-expression solutions. By combining 'derived factors' with correlated 'automata statistics', performance of solutions can be estimated in test runs against representative but "smallish" data sizes.

8.7.1 Detailed Description

'Automata statistics' are calculated by the engine of the present invention as described in section 8.9.4.2. In this section, the term 'automata statistics' is restricted to include only those 10 statistics which are correlated to 'derived factors'— THREAD, TRANS, ARCNUM, INSTR, SPAWN, PRUNE-SIMPLE, PRUNE-EVENT, PRUNE-ARC, PRUNE-WEIGHT, and PRUNE-ACCUM. These statistics are normalized "counts" or "weights", calculated based on the transition of the automata engine into and out of a particular execution mode. For each execution mode and its event, there is a profiling 'bucket' of the same name. 'Bucket profiling' allocates to each 'bucket' (associated with its own correlated 'statistic') the CPU time used by the automata engine to process a regular expression against an input stream.

These 'statistics' are all normalized on a "per character" basis. This normalization increases their usefulness as follows: each correlated 'statistic' (which is a normalized "count" or "weight") can be multiplied by its associated 'derived factor' to produce an estimate of the CPU time expected in a given 'bucket' (of the same name). In the current implementation, the units of 'derived factors' are "millis per million characters". Assume that a symbol for 'derived factor' is F and a symbol for its associated 'statistic' is S. Assume also that a given testsuite is representative of the 'document classification' being tokenized by a solution, and when tested, produces an observed set of values of the various 10 correlated 'statistics' of: $S_1$, $S_2$, $S_3$, $S_4$, $S_5$, $S_6$, $S_7$, $S_8$, $S_9$, $S_{10}$. The following equation estimates the number of milliseconds to be spent by the automata engine in the various 10 correlated CPU 'buckets' (per million characters):

$$\text{Millis (per million chars)} = S_1 * F_1 + S_2 * F_2 + S_3 * F_3 + S_4 * F_4 + S_5 * F_5 + S_6 * F_6 + S_7 * F_7 + S_8 * F_8 + S_9 * F_9 + S_{10} * F_{10}$$

This equation does not include the uncorrelated CHARS 'bucket', which from FIG. 8 ranges in value (millis/million) from 532.75 to 602.27 across the 16 examples tested. The reason this 'bucket' is uncorrelated is because a CHARS 'statistic' is not meaningful, as there are always exactly 1.00000 character fetches per character fetch. In the discussion of the next section, which shows how the various factors (F) are derived, a factor for CHAR ('bucket') will also be given termed $F_{CH}$. The above equation can now be improved to include character fetch time as follows:

$$\text{Millis (per million chars)} = S_1 * F_1 + S_2 * F_2 + S_3 * F_3 + S_4 * F_4 + S_5 * F_5 + S_6 * F_6 + S_7 * F_7 + S_8 * F_8 + S_9 * F_9 + S_{10} * F_{10} + F_{CH}$$

This equation estimates the time spent in the automata engine excluding the OVERHEAD 'bucket', the OVERHEAD 'bucket' comprising of time spent doing automata setup and cleanup tasks which also include time required to aggregate side-effects. Side-effect costs (also included in the MAIN 'bucket') are deemed an "invariant" of the problem being solved, because side-effect costs are proportional to the side-effects of only the "winning" thread, and are therefore exactly those side-effects which actually solve the problem. This equation should be used by the programmer to estimate 'automata time' required for a given solution against a given 'document classification'. This equation (based on the 'median estimates' of 'derived factors' and the test results for 'statistics' of FIGS. 3 and 4) generates the "estimate column" of FIG. 13, the values of which are referred to throughout examples sections.

8.7.2 Derivation of Factors

The current implementation of the present invention is accomplished as a set of source code files written in the Java™ language. The 'derived factors' and test runs of examples in the present document assume that the corresponding Java™ class files are run on a Linux machine operating at 2.4 gighz, under the Java™ 1.3.1_07 Virtual Machine, with HotSpot turned off.

Based on these conditions, and the equation given in the prior section, estimates for 'derived factors' can be given with the following additional assumption: the primary reason that observed values for 'derived factors' (FIGS. 9 and 10) vary somewhat from example to example are issues related to Java™ garbage collection (section 8.7.3). A set of 'derived-factor' estimates for a given example is obtained by dividing an observed 'statistic' (FIGS. 3 and 4) by the observed CPU time spent in the corresponding 'bucket' (FIGS. 6 and 7). These estimates for 'derived factors' are shown in FIGS. 9 and 10. The level of correspondence within a column of FIGS. 9 and/or 10 is similar to that of the correspondence in the CHARS 'bucket' of FIG. 8, indicating the validity of assuming that GC affects the estimates of 'derivated factors' as well (see section 8.7.3). A 'median estimate' is now made for each 'derived factor' based on the stated Virtual Machine testing conditions and the stated CPU speed of the testing hardware, and the 'median estimates' shown across the label rows of FIGS. 11 and 12.

The viability of 'derived factors' is supported by the means for choosing to divide Automata execution time into 10 correlated 'buckets' as well as the CHARS and OVERHEAD 'buckets'. Each 'bucket' represents a particular mode of automata execution, and efforts are made: (1) to verify that the various Java™ statements which can be executed when a given mode is entered (and before its exit) are on average and by weight not a function of automata characteristics, (2) to sub-divide or "refactor" a 'bucket' when the assumption is found not to adequately correlate for a given selection/division of 'buckets', (3) to terminate the bucket-refactoring process when all of the 'derived factors' for various examples are sufficiently uniform to provide reliable estimates.

8.7.3 Variability (GC)

Java™ garbage collection (GC) is known to contribute to the variability of 'derived factors' as seen in FIGS. 9 and 10. The CHARS bucket, though known by its implementation in the CycleStream class to execute the same Java™ statements on every call (regardless of automata complexity or underlying stream size), shows variability (FIG. 8) similar to that of various 'derived factors'.

Consider the following possible sources of garbage collection activity in the examples: (1) some examples, such as Football and CaptureCodeLines, create side-effects that do a lot of Java™ string capture, requiring GC; (2) some examples, such as CountCommentChunksC, generate large Java™ linked-list chains (note the high prune-comparison costs), which are in fact not "collectible".

Assume also that the "CPU-weight" of garbage collection events is spread uniformly through each 'bucket'. In this case, examples which require a greater degree of GC activity (whether or not collections actually occur) will profile at greater than expected amount of time in each 'bucket'. A 'median estimate' of a derived factor in such a case should tend to underestimate time spent in 'buckets', and would therefore overestimate the "speed". In fact, for those examples for which (1) and/or (2) of possible GC activity sources are observed, there is a trend for positive variance, which is an overestimate of speed.

Despite the unavoidable presence of GC issues in a Java™ implementation and despite the possibility that the assumption of uniformity of GC across the 'buckets' is not absolute, the various estimates of 'derived factors' for each example are in shown to be in "agreement", FIGS. 9 and 10. Consequently, the use of a 'median estimate' for each factor results in relatively small deltas between observed and estimated times of FIGS. 11 and 12, ultimately leading to the estimates 'DFA maximum speed' of FIG. 13, all of which show less than 6.67 percentage "variance".

8.7.4 Usage

The consistency of 'derived factors' as discussed in the prior section permits the following conclusions:

That the correlated 'automata statistics' have relevance in producing an estimate of automata speed, for test runs against "smallish" but representative data samples.

This estimate of automata speed in turn requires estimates of each of 10 correlated 'derived factors', plus an $11^{th}$ for the CHARS bucket.

These estimates for 'derived factors' are made based on choosing a 'median value' from the various columns of FIGS. 9 and 10, which is reasonable to do because of the consistency within each column despite GC related issues.

The usefulness of the estimates from the equation of section 8.7.1 is demonstrated by FIG. 13, wherein a "variance" (percent-adjusted difference) between estimated and observed speeds is calculated for each example, and the relatively low values of such variance are provided.

The demonstrated relevance of 'automata statistics' can be used in the analysis of performance-related costs of various regular-expression techniques, as illustrated by examples of section 8.6.1.

The demonstrated relevance of 'automata statistics' and the formula for estimated CPU time can also be used in help anticipate the "bottlenecks" of execution, allowing programmers to take corrective action.

As shown in section 8.6.3, the relevance of the PRUNE-ARC, PRUNE-WEIGHT, and PRUNE-ACCUM statistics are required to show whether a solution is linear or N-squared. If, for all boundary-case "snippets" for a given 'document classification', these 3 statistics do not grow as the "cycle-size" grows, the solutions are linear. All of the main example solutions are linear, as seen by comparing FIG. 3 with FIG. 14 and FIG. 4 with FIG. 15. In contrast, if these 3 statistics roughly double each time the "cycle-size" is doubled, then the solution performs as N-squared.

8.8 Advanced Example (Football)

The grammar of the present invention is useful in extracting data from HTML pages. An example is statistical data conveyed in web pages found at a popular sports website. A snippet of such data follows:

```
<table cellpadding="1" cellspacing="1" border="0" width="100%">
<tr class="bg1">
<th align=left>Team</th>
    <th>G</th>
    <th><a href="opattNFL.htm"><font color="gray">Att</font></a></th>
    <th><a href="opattgNFL.htm"><font color="gray">Att/G</font></a></th>
    <th><a href="opcmpNFL.htm"><font color="gray">Cmp</font></a></th>
    <th><a href="oppctNFL.htm"><font color="gray">Pct</font></a></th>
    <th><a href="opydsNFL.htm"><font color="gray">Yds</font></a></th>
    <th><a href="opydsgNFL.htm"><font color="gray">Yds/G</font></a></th>
    <th><a href="optdsNFL.htm"><font color="gray">TDs</font></a></th>
    <th><a href="opintsNFL.htm"><font color="gray">Int</font></a></th>
    <th><a href="opsckNFL.htm"><font color="gray">Sck</font></a></th>
    <th><a href="opsckydsNFL.htm"><font color="gray">SckY</font></a></th>
</TR>
<TR bgcolor=#f0f0f0 align=center><TD nowrap align=left ><A
HREF="../teams/TB.html"><font color="gray">Tampa Bay </font></A><BR><A
HREF="../teams/SD.html"><font color="gray">San Diego </font></A><BR><A
HREF="../teams/SF.html"><font color="gray">San Francisco </font></A><BR><A
HREF="../teams/WAS.html"><font color="gray">Washington </font></A><BR><A
HREF="../teams/BAL.html"><font color="gray">Baltimore </font></A><BR><A
HREF="../teams/NO.html"><font color="gray">New Orleans </font></A><BR><A
HREF="../teams/SEA.html"><font color="gray">Seattle </font></A><BR><A
HREF="../teams/CLE.html"><font color="gray">Cleveland </font></A><BR><A
HREF="../teams/JAC.html"><font color="gray">Jacksonville </font></A><BR><A
HREF="../teams/DAL.html"><font color="gray">Dallas </font></A><BR><A
HREF="../teams/PIT.html"><font color="gray">Pittsburgh </font></A><BR><A
HREF="../teams/IND.html"><font color="gray">Indianapolis </font></A><BR><A
HREF="../teams/NE.html"><font color="gray">New England </font></A><BR><A
HREF="../teams/BUF.html"><font color="gray">Buffalo </font></A><BR><A
HREF="../teams/OAK.html"><font color="gray">Oakland </font></A><BR><A
HREF="../teams/MIN.html"><font color="gray">Minnesota </font></A><BR><A
HREF="../teams/TEN.html"><font color="gray">Tennessee </font></A><BR><A
HREF="../teams/MIA.html"><font color="gray">Miami </font></A><BR><A
HREF="../teams/NYJ.html"><font color="gray">New York (A)</font></A><BR><A
HREF="../teams/CAR.html"><font color="gray">Carolina </font></A><BR><A
HREF="../teams/CIN.html"><font color="gray">Cincinnati </font></A><BR><A
HREF="../teams/DEN.html"><font color="gray">Denver </font></A><BR><A
HREF="../teams/DET.html"><font color="gray">Detroit </font></A><BR><A
HREF="../teams/CHI.html"><font color="gray">Chicago </font></A><BR><A
HREF="../teams/GB.html"><font color="gray">Green Bay </font></A><BR><A
HREF="../teams/PHI.html"><font color="gray">Philadelphia </font></A><BR><A
HREF="../teams/STL.html"><font color="gray">St. Louis </font></A><BR><A
HREF="../teams/NYG.html"><font color="gray">New York (N)</font></A><BR><A
HREF="../teams/ATL.html"><font color="gray">Atlanta </font></A><BR><A
HREF="../teams/KC.html"><font color="gray">Kansas City </font></A><BR></TD>
<TD
>1<BR>1<BR>1<BR>1<BR>1<BR>1<BR>1<BR>1<BR>1<BR>1<BR>1<BR>1<BR>1<BR>1<BR>1<BR>1<
BR>1<BR>1<BR>1<BR>1<BR>1<BR>1<BR>1<BR>1<BR>1<BR>1<BR>1<BR>1<BR>1<BR>1<BR></TD>
<TD
>19<BR>32<BR>22<BR>18<BR>39<BR>28<BR>33<BR>34<BR>37<BR>34<BR>26<BR>31<BR>27<BR
>30<BR>37<BR>22<BR>20<BR>40<BR>32<BR>38<BR>38<BR>34<BR>28<BR>30<BR>39<BR>42<BR
>48<BR>29<BR>40<BR>46<BR></TD>
<TD
>19.0<BR>32.0<BR>22.0<BR>18.0<BR>39.0<BR>28.0<BR>33.0<BR>34.0<BR>37.0<BR>34.0<
BR>26.0<BR>31.0<BR>27.0<BR>30.0<BR>37.0<BR>22.0<BR>20.0<BR>40.0<BR>32.0<BR>38.
0<BR>38.0<BR>34.0<BR>28.0<BR>30.0<BR>39.0<BR>42.0<BR>48.0<BR>29.0<BR>40.0<BR>4
6.0<BR></TD>
<TD
>9<BR>15<BR>11<BR>10<BR>24<BR>16<BR>17<BR>20<BR>21<BR>25<BR>15<BR>18<BR>18<BR>
18<BR>16<BR>13<BR>12<BR>16<BR>22<BR>22<BR>22<BR>19<BR>22<BR>24<BR>20<BR>28<BR>
```

-continued

```
32<BR>21<BR>26<BR>31<BR></TD>
<TD
>47.4<BR>46.9<BR>50.0<BR>55.6<BR>61.5<BR>57.1<BR>51.5<BR>58.8<BR>56.8<BR>73.5<
BR>57.7<BR>58.1<BR>66.7<BR>60.0<BR>43.2<BR>59.1<BR>60.0<BR>40.0<BR>68.8<BR>57.
9<BR>57.9<BR>55.9<BR>78.6<BR>80.0<BR>51.3<BR>66.7<BR>66.7<BR>72.4<BR>65.0<BR>6
7.4<BR></TD>
<TD
bgcolor=#b9b9b8>34<BR>119<BR>121<BR>129<BR>138<BR>160<BR>176<BR>178<BR>181<BR>
195<BR>198<BR>199<BR>204<BR>209<BR>222<BR>223<BR>225<BR>228<BR>231<BR>236<BR>2
41<BR>258<BR>260<BR>262<BR>276<BR>308<BR>312<BR>330<BR>335<BR>341<BR></TD>
<TD
>34.0<BR>119.0<BR>121.0<BR>129.0<BR>138.0<BR>160.0<BR>176.0<BR>178.0<BR>181.0<
BR>195.0<BR>198.0<BR>199.0<BR>204.0<BR>209.0<BR>222.0<BR>223.0<BR>225.0<BR>228
.0<BR>231.0<BR>236.0<BR>241.0<BR>258.0<BR>260.0<BR>262.0<BR>276.0<BR>308.0<BR>
312.0<BR>330.0<BR>335.0<BR>341.0<BR></TD>
<TD
>0<BR>0<BR>0<BR>0<BR>0<BR>0<BR>0<BR>0<BR>0<BR>0<BR>3<BR>2<BR>1<BR>3<BR>1<BR>1<
BR>2<BR>2<BR>2<BR>1<BR>2<BR>3<BR>2<BR>1<BR>0<BR>1<BR>2<BR>3<BR>1<BR>2<BR></TD>
<TD
>2<BR>2<BR>0<BR>2<BR>2<BR>3<BR>1<BR>2<BR>2<BR>1<BR>0<BR>0<BR>0<BR>0<BR>1<BR>1<
BR>0<BR>3<BR>2<BR>3<BR>0<BR>0<BR>0<BR>0<BR>2<BR>2<BR>1<BR>0<BR>1<BR>1<BR></TD>
<TD
>2<BR>1<BR>2<BR>1<BR>1<BR>5<BR>3<BR>4<BR>3<BR>2<BR>1<BR>1<BR>1<BR>2<BR>1<BR>2<
BR>0<BR>2<BR>1<BR>1<BR>4<BR>3<BR>3<BR>0<BR>7<BR>4<BR>5<BR>0<BR>2<BR>2<BR></TD>
<TD
>6<BR>2<BR>14<BR>7<BR>5<BR>34<BR>27<BR>28<BR>20<BR>3<BR>0<BR>7<BR>8<BR>17<BR>3
<BR>23<BR>0<BR>18<BR>9<BR>2<BR>17<BR>13<BR>15<BR>0<BR>44<BR>26<BR>35<BR>0<BR>1
1<BR>14<BR></TD>
```

</TR></TABLE>

This data represents a 2-dimensional HTML table of data, and includes embedded presentation tags, link references, team names, and the extractable data of interest. The entire web page also includes much more HTML data, including supplemental presentation tags, scriptlets and the like. The goal of a script written in the grammar of the present invention might be to locate and extract the data into a 2-dimensional string array, perhaps for further processing such as statistical analysis. Such a script is essentially treating this HTML file as if it were a data language, but must include the ability to filter the presentation information, as well as capturing the elements of the table.

Such a problem is made easier by a pre-existing library of production rules for processing HTML tags. Such a script (HTML.TOK) was written, and is presented as follows:

```
1      load "./find.tok";
2
3      struct HTML {
4
5          String cap;
6
7          production SP < > ->
8              '[ \t\r\n]'
9          ;
10
11         production BeginTag <Pattern name> ->
12             '<' + name + ( '>' | SP< > + Find< '>' >)
13         ;
14
15         production EndTag <Pattern name> ->
16             "</" + name + *SP< > + '>'
17         ;
18
19         production DataBody < > ->
20             *SP< > >+ &cap(*any) <+ *SP< >
21                 butnot
22                 Contains<'[< >]'>
23         ;
24
25         production Tag <Pattern name,
26                 Pattern body> ->
27             BeginTag<name> + *SP< > >+ body <+ *SP< > +
                 EndTag<name>
28         ;
29
30         production AnyBeginTag < > ->
31             '<' + (any butnot '/') + Find<'>'>
32         ;
33
34         production AnyEndTag < > ->
35             "</" + any +          Find<'>'>
36         ;
37
38         production SkipBeginTags < > ->
39             ?((AnyBeginTag< > + *SP< >) * 0 +
                 AnyBeginTag< >)
40         ;
41
42         production SkipEndTags < > ->
43             ?((AnyEndTag< > + *SP< >) * 0 +
                 AnyEndTag< >)
44         ;
45     }
```

In following the previously discussed design approach, all production rules are encapsulated as virtual production rule members of a general struct that handles HTML tag and body element parsing. A technique seen above is that rather than capturing the "body" data of a tag (the Data-Body< > rule of lines 19-23) into a production rule out parameter as in the first invention, the data is captured into the struct's data member variable "cap" declared on line 5. This approach leverages the optimizations of the 'this global', by using the implicit "this param" rather than capturing into an explicit out parameter. This "cap" variable will also be used by sub-classes.

At this point, a script is written (HTMLFOOTBALL.TOK) which extracts all of the data elements of the HTML table of interest, including label names for each column, team names, and the statistical data, presented as follows:

```
1    load "./html.tok";
2    load "./find.tok";
3
4    struct HTMLFootball extends HTML {
5
6        String[ ][ ]          table;
7        int                   rowNum;
8        int                   columnNum;
9
10       production DataCell< > –>
11           *SP< > >+ &cap(*any butnot Contains<'[< >] '>)
             <+ *SP< > + "<BR>"
         + *SP< >
12       ;
13
14       production TeamCell< > –>
15           SkipBeginTags< > + DataBody< > +
             SkipEndTags< > + *SP< > + "<BR>"
16       ;
17
18       production LabelCell < > –>
19           Tag<"th", SkipBeginTags< > + DataBody< > +
             SkipEndTags< > >
20       ;
21
22       production DataColumn< > –>
23           Tag < "TD",
24
25               do (rowNum = 1;
26
27                   +do (;
28                       DataCell< >
29                       ;table[rowNum++][columnNum] =
                         cap)
30
31                   ;columnNum++)
32               >
33       ;
34
35       production TeamColumn< > –>
36           Tag < "td" | "TD",
37
38               do (rowNum = 1;
39
40                   +do (table[rowNum] = new;
41                       TeamCell< > + *SP< >
42                       ;table[rowNum++][0] = cap)
43
44                   ;columnNum = 1)
45               >
46       ;
47
48       production DataRows< > –>
49           Tag <"tr" | "TR",
50
51               do (columnNum = 0;
52                   (TeamColumn< > + *SP< >) +
                     +(DataColumn< > + *SP< >)
53                   ;)
54               >
55       ;
56
57       production LabelRow< > –>
58           Tag <"tr" | "TR",
59
60               do (columnNum = 0, table[0] = new;
61
62                   +do (;
63                       LabelCell< > + *SP< >
64                       ;table[0][columnNum++] = cap)
65
66                   ;)
67               >
68       ;
69
70       production Table< > –>
71           Tag< "TABLE" | "table", LabelRow< > +
             *SP< > + DataRows< > >
72       ;
73   }
```

The DataCell< >, TeamCell< >, and LabelCell< > rules all capture into the "cap" member variable defined in the previous code block for the HTML base-class, either explicitly in this HTMLFootball struct, or in the DataBody< > rule of HTML. Then, the rules which process complete rows or columns, do so by using the 3 "Cell" rules to perform the cell capture, and wrapping those instantiations of the "Cell" rules in do-patterns which then transfer the value of the "cap" member variable into the 2-dimension member "table" variable declared on line 6. As the transfers are performed, the row and column iterator member variables (declared on lines 7-8) are updated appropriately.

This struct is then tested by the following script (FOOTBALL.TOK) to evaluate the performance of the present invention and its polymorphic design approach to production rules in the "capturing" of HTML data (obtained from a popular website).

```
1    load "./htmlfootball.tok";
2    load "./find.tok";
3    load "./sys.tok";
4
5    struct Football extends HTMLFootball {
6
7        function String[ ][ ] Find (Stream is)
8        {
9            String[ ][ ] result = null;
10
11           tokenize (is) {
12               case *any <+
13
14                   do (table = new;
15                       Table< >
16                       ;result = table, table = null):
17                   ;
18               }
19           return result;
20       }
21
22       function boolean Match (Stream is, String[ ][ ]
         t, out boolean match, out
23   int count)
24       {
25           tokenize (is) {
26               case do (count = 0, match = true;
27
28                       *SP< > +
29
30                       +(do (table = new;
31                           Table< >
32                           ;match &= equals(t, table),
                            table = null, count++)
33
34                       + *SP< >) + eof2
35
36                   ;):
37                   return true;
38               }
39               return false;
40       }
41   }
42
43   static {
44       Football f = new Football( );
45       Stream is = system::filestream(
             "./testpatent/files/football/full.txt",
         "ISO-8859-1");
```

-continued

```
46          String[ ][ ] t = f.Find(is);
47
48          if (t == null) {
49              system::println("could not find table");
50              return;
51          }
52          if (length(t) != 31 || length(t[0]) != 12) {
53              system::println("test football failed: wrong table found");
54              system::show(t);
55              return;
56          }
57
58          int cnt1, cnt2, i, iters;
59          boolean match, b, ok;
60
61          is = system::cyclestream("./testpatent/files/football/brief.txt",
            400000, cnt1);
62          f.Match(is, t, b, i);
63          ok = true;
64          iters = 0;
65
66          for (int i = 0; i < 5 && ok; i++) {
67              if (i == 1) {
68                  system::startprofiler( );
69                  system::aa_start_stats( );
70              }
71
72              system::gc( );
73
74              for (int j = 0; j < 94 && ok; j++) {
75                  system::resetstream(is);
76
77                  if (!f.Match(is, t, match, cnt2)) {
78                      system::println("test football
                        failed: did not match the
            entire cycled brief file");
79                      ok = false;
80
81                  } else if (!match) {
82                      system::println("test football
                        failed: at least one table
            from brief failed to match target");
83                      ok = false;
84
85                  } else if (cnt1 != cnt2) {
86                      system::println("test football
                        failed: mismatching cycle
            count (" + cnt1 +"," + cnt2 + ")");
87                      ok = false;
88                  }
89                  iters++;
90              }
91          }
92          system::stopprofiler( );
93          system::aa_stop_stats( );
94
95          if (ok) {
96              system::println("test football ok: " +
                iters + " successful
            iterations");
97              system::println(system::aa_getstats("aastats"));
98          }
99      }
```

Two important member functions are added to this struct, which inherits from HTMLFootball. The first is Find(Stream) from lines 7-20, which "finds" the table of interest from the entire web page, which was presented only in part at the beginning of this section. Note that the Find< > rule is not needed here, since there is no need to measure the performance of this initial capture, only that it correctly "finds" and extracts the table of interest. Thus line 12 uses the "right-to-left" concatenator operator to "eat" the slack until a match to the Table< > (line 15) recognition unit defined in HTMLFootball can be found.

The second member function "mixed in" by this subclass of HTMLFootball is Match(Stream, String[ ][ ], out boolean, out int) of lines 22-40. The purpose of this function will be to apply the Table< > rule again, this time to the snippet shown at the beginning of this section, which will be repeated onto itself enough times to reach 400000 characters. The extraction and comparison is done inside the 'do-pattern' of lines 30-32, each time checking to see if the next Table< > unit extracted is indeed a match to the original found in the real HTML page.

The purpose is to measure the throughput of extraction and the pinning specificity of the Table< > rule in the super-class HTMLFootball. This example generates a very large amount of side-effects, both in terms of the two dimensional string table and in terms of the comparison of all of the elements of the table. In particular, a large portion of the 400000 characters are extracted as String objects, and then compared.

The remainder of the above script is a static block which performs the test in such a way as to approximate the same amount of data being processed in the previously given examples that used the test suite of source files from the CDROM of the 'first invention'. Thus on line 61, a "cyclestream" is created based on repeating the HTML snippet (from the real web page) enough times to reach or exceed 400000 chars. Also created are an outer loop of 5 (1 for the initialization run and 4 for the profiled runs) and an inner loop of 94 (corresponding to the 94 source files in the main test suite).

8.8.1 Football Performance Results Analysis

This example (despite its large amount of side-effects) runs at 28 percent of 'DFA maximum speed' (FIG. 6). If the execution costs of side-effects are excluded, it runs at 52 percent of 'DFA maximum speed.' This is a number similar to that of CountCodeLines and ChunksA. From FIG. 1, it is apparent that the 'thread-count' (1.14415) statistic is closer to the best case of 1.0000 than the other examples of similar performance, an indicator that the 'pinning specificity' is very high for such a complex example. This is related to the observation that HTML and especially XML were designed as textual data languages to be relatively easy to parse.

The main reason that this example runs at the speeds of ChunksA and CaptCodes which exhibit greater average 'thread-counts (1.21612 and 1.36386) is seen as the 'spawn-bucket' of FIG. 2, and thus the 'spawn-statistic'. This would indicate that lots of threads are spawned, only to be rather quickly pruned. Note from FIG. 5 that the football shows the largest 'thread-max' of all of the examples. The significant "spawn-prune" activity is a by-product of the very complex problem being solved, which can be seen from the fact that the production rules of HTML and HTMLFootball are much more complex than those of all of the counting examples (and even the Base class), and which can be seen as well as by the increased automata complexity of this example in terms of number of nodes and arcs.

Nevertheless, the success of HTML as a data language with a high degree of specificity, and the success of the present invention of being able to model such a language with production rules, is seen in the very low average 'thread-count' of 1.14415, which implies that the above solution has a high degree of 'pinning specificity.'

A more relevant usage of the HTMLFootball base class (which extends the HTML class to solve the specific problem of processing a set of similar web-site pages) is to actually use this class to capture the single snippet previously shown, from each of the football season's week-by-week results, and for each statistical category. In this case, the actual pages are roughly 50,000 bytes in length, and this 5000 byte snippet is embedded with much additional presentation data and scriptlets (the "noise"). The Find< > rules of the present invention (as introduced by the 'first invention') can be effectively used to locate this table, allowing the effective capture of just the table of interest, at even higher overall speeds because the table of interest is preceded by roughly 45000 bytes of information that will be quickly filtered through by the automata at close to 'DFA maximum speed'.

This example and its solution indicates: (1) that the present invention is an effective way to solve the problem of "locate/capture", both in general and with HTML internet data in particular; (2) that the various elements of the solution can all be de-coupled, both because of the OO aspects of the present invention, and also because the grammar forms and 'linear algorithm' introduced by the first invention make it possible to systematically integrate side-effects throughout regular expressions, something seen previous to the 'first invention' in much less limited form and accuracy (Lex-Yacc). Thus, the first step of the solution is to code (or re-use) the library of general HTML tag and body element recognition rules, followed by a sub-class which "captures" the particular element of interest in the particular sub-classification of HTML pages (assuming as with this web-site that those pages are all automatically generated from a database), and finally the creation of either a most-derived class, or an independent class which uses "locating" expressions to ultimately create a 'document-level production rule' which "locates", then "extracts".

The web server that presents the pages of interest has likely done so by query of a data-source, and then using web templates to merge the presentation tags of the templates with the data returned by the query. The power of the present invention is demonstrated not only in allowing a programmer to easily reverse the web server's amalgamation of data-source with presentation template tags, but also in allowing such a solution to operate at 'automata-speed' approaching 'DFA speed'.

8.9 Implementation

The following are important implementation additions to the 'first invention', arriving at the functionality of the present invention.

8.9.1 Automata Caching

In the regular expression art, subset construction is an important aspect allowing the preparation of an automata for proper and fast execution. In the 'first invention', these algorithms are explained and justified and remain largely unchanged in the present invention.

The present invention advocates the use of the 'document design pattern' whenever it is possible to employ such in the solution of a problem statement. When a 'document-level production rule' is highly composed, automata can become quite large, and as a result subset-construction time, which can be non-linear in the size of the composition graph, is often a significant cost. This is especially true for the subjunctive grammar form of the 'first invention', which is leveraged heavily in the examples of the present invention.

Therefore, an important aspect of the present invention, allowing recommendation of the 'document design pattern', is an approach which effectively "amortizes" the cost of subset-construction across many calls to the same tokenize statement that fire the same 'document-level production rule' for a given problem solution. It is expected that most programmers, when creating an important 'document-level production rule', will employ that rule in the tokenization of several documents belonging to the same 'classification'.

The algorithm which allows for this "amortization" of the cost of subset-construction is termed 'automata caching.'

8.9.1.1 Cache Key

The cache key is the low-level Pattern object which is used to model regular expression compositions, and from which automata are generated. Cache keys are compared to one another by deep-equality (normally) rather than by reference, so that tokenize statements in different scripts which are case-clause by case-clause identical in Pattern being matched will share the same automata. Deep-equality of cache keys is based dually on the recognition and the side-effect characteristics of the low-level Pattern object, which correspond respectively with the character arcs and the instruction arcs of the constructed automata. The cost of looking up a cache-key from its hashtable is proportional to the time required to compose it and to compute its hashcode, which is linear in the various characteristics of the low-level regular expressions used to compose the automata. The total cost of lookups from the cache for various examples tested includes 1 subset construction and 94*4 lookups, corresponding to 94 documents in the testsuite and 4 test runs through the testsuite for each example of FIGS. 3-13. Thus the average cost of fetching an automata for a tokenize statement is the cost of a composition and hash-lookup on the cache-key, which, across 94*4 test iterations, is 0.26596 percent of the cost of a subset construction for that automata. By this means the cost of subset-construction is effectively "amortized".

This cost is reflected in the "main" bucket of FIG. 8, which also includes other FORTH overheads of executing the tokenize statement, as well as the time to execute all of the side-effects. Some of the most complex automata across the examples are associated with the "chunks" rows of FIG. 8. For those examples, the "main" bucket is roughly 11 milliseconds.

In order to make a worst-case estimate of subset construction time for these difficult examples, consider the Chars example, which generates by far the most increments to the "count" variable. Divide the "main" bucket of FIG. 8 for Chars (4997.08) by the "instr/char" entry (6.00) of FIG. 5, yielding 832.85. Multiply this by the "instr/char" entry (0.00958) for all of the "chunks" examples, yielding 7.98 millis. Subtract this from the worst-case "main" bucket of all "chunks" examples (11.35 millis) yielding an upper-bound (3.37 millis) on the total of cache-key lookup time plus amortized cost of subset-construction (for a very difficult automata). In the "chunks" example, these worst-case 3.37 millis for amortized-lookups represents no more than 0.123 percent of the total time of execution across 4 test runs through 94 documents (using ChunksS as reference).

8.9.1.2 Cache-Key Creation

Because cache keys are low-level Pattern objects, the amortized cost of lookup calculated above also includes composition time. This cost, like that for computed the hash key, is dependent on the dimensions of the regular expression, not the size of the automata. The dimensions of the regular expression are reflected in the complexity of the script source code which builds those expressions, and therefore does not become a bottleneck under the 'document design pattern'.

8.9.1.3 Built-In Support

The performance cost of preparing (including subset-construction) and finding automata is minimized in a variety of ways in the art. One technique not adopted by the present invention is to offer grammar forms to the programmer to pre-compile a regular expression (Perl). Another technique not appropriate for the present invention is often employed in engines which are library-based. The second technique also involves the programmer intervention of making a function call to pre-compile a regular expression into an automata.

In the present invention, all such chores are handled internally by the grammar and engine, giving rise to the term 'built-in support'. This is possible in part because all regular expressions of the present invention, whether resulting from binary or unary compositions, or from production rule instantiations, or from literal expressions, are type compatible with the built-in Pattern primitive data type. Further, the Pattern data-type is immutable, as seen in the art with Java™ string objects, which property facilitates the goal of allowing Pattern objects to become cache-keys relative to the 'automata cache'. Finally, the tokenize statement is modeled as a low-level Pattern object comprising a union of the Patterns of the various case-clauses.

As a consequence of the above, the programmer of the present invention need not be concerned with the cost of building and finding automata as part of the solution process. Additionally, by adopting the 'document design pattern', the overall amortized cost of finding and building automata that model the 'document-level production rule' is kept to a minimum, and hidden in the FORTH code that translates a tokenize statement.

8.9.2 Rule Instantiation

Production rule instantiation involves the FORTH code that composes the regular expressions of the body of the production rule and the FORTH code which delivers and binds parameters to the instantiation. This delivery and binding is described in the 'first invention' as being based on the introduction of a 'template frame' into the FORTH virtual machine.

There are two kinds of instantiations defined in the glossary section. One type of instantiation is termed 'nested', and describes any instantiation which occurs within the definition of another rule. This is the type of instantiation for which many modifications are needed in the present invention to allow polymorphic advantage that do not increase NFA-ness (as demonstrated in section 8.6.2). A second type of instantiation is termed 'function level', a term describing any other instantiation. Often such instantiations are found in the main body of the script, but can also be found within member function declarations. These instantiations involve the binding of parameters into a FORTH array, and the use of the 'template frame' to move parameters from the parameter-array into a 'frame' accessible by nested instantiations. This technique was introduced and described in the 'first invention', and the composition resulting from the binding process was termed a TmplGrammar object. In the present invention, the additional costliness of function-level instantiations (both in terms of parameter-array binding and hidden side-effects) results in the following rule-of-thumb: use function level instantiations only within the case-clauses of the tokenize statement which "fires" any document-level production rules.

8.9.2.1 Nested Instantiations

Nested production rule instantiations are those instantiations which occur (as coded by the programmer of the present invention) within the declaration body of another rule. Under the assumption of the 'document design pattern', this represents the majority of instantiations made by the script programmer. From the examples sections, nested instantiations of note include instantiations in sub-classes in order to give more derived behaviors, in which the behavior given in a super-class is brought into the derived rule by use of the super keyword. The instantiation using the super keyword is referred to as nested. Other nested instantiations occur from one rule to another, being routed through the 'V-table', so that the nested instantiation can be made within a base-clases' rule definition, but still instantiating a rule defined in a sub-class.

Because of the importance of nested instantiations in the 'document design pattern', nested instantiations are subject to optimizations that ensure that side-effects are not generated along with the instantiation unless necessary. In particular, the 'this-global' optimization is significant.

Nested instantiations are also part of the 'first invention', but at that time, all instantiations whether at function-level, or nested, were translated "in-line" by the translator into FORTH, such that minimal use was made of the 'template frame' concept. The motivation behind the re-workings of nested instantiations is to allow all instantiations, including those which are nested, to be made by an 'instantiator-proc'. This motivation is explored in the next section.

8.9.2.2 Instantiator-Proc

Nested instantiations are often routed through the 'V-table', in order to obtain polymorphic advantages. Such instantiations are accomplished by what is termed an 'instantiator-proc'. Therefore, all instantiations, whether nested or at function-scope, are done by such a FORTH proc. As a consequence of this requirement, it can be said that in the 'first invention', instantiation was accomplished inline in the 'translator module', whereas in the present invention, instantiation is always accomplished by an 'instantiator-proc' during the execution of the generated FORTH.

Because all instantiations are now accomplished by a FORTH executable array (including those routed through the 'V-table', the 'template frame' is now heavily used. Each instantiation has two timelines. Both timelines may or may not use a 'template frame'. The first timeline involves the composition of the regular expression during FORTH execution. For example, the programmer may have used binary C-style operators to compose a regular expression, binding a sub-expression that is a rule instantiation. This timeline allows the lines of script code which compose a regular expression to be directly translated into FORTH words that compose sub-expressions. This timeline occurs prior to sub-set construction and is part of the amortized cost of automata lookups. This timeline is currently not optimized, under the 'document design pattern'. Rather, care is taken to ensure composition accuracy, and to solve problems such as 'context unpinning' of 'template frames' discussed below.

The second timeline begins and ends during the execution of side-effects (accumulated by the automata engine on behalf of the winning thread). Because nested rule instantiations may include explicit in, out, and/or in out parameters, and because nested rule instantiations may include 'do-patterns' and 'capture-patterns' that use/modify struct member variables, nested instantiations may involve a hidden side-effect cost. Efforts are made to minimize the need to impose such hidden side-effects during the second timeline. These efforts center around the creation of the 'this-global' concept and are discussed in the next section. At times, such hidden side-effects are needed for 'context-unpinning' as well.

Two rules-of-thumb guide the programmer of the present invention to minimize and avoid such hidden, second timeline costs—(1) to create solutions such that all nested instantiations are part of the same class hierarchy, whether using the implicit "this-parameter" through the 'V-table', or using the super or this keywords, and (2) to know that side-effects (of 'capture-patterns' and 'do-patterns') which modify member variables within this class hierarchy do not force less-derived rules, defined without side-effect expressions, to impose hidden second timeline costs.

By virtue of the above, the programmer who adopts the 'document design pattern' as described in the present invention, can be assured that NFA-fragmentation of automata occurs due to required side-effects. The sub-division of the document-level production rule into many smaller sub-rules, such as done in the Base class of section 8.5.3 does not contribute to an increase in NFA-ness (average 'thread-count').

8.9.2.3 This-Global

Within nested rule instantiations of virtual member rules, the 'this global' holds a pointer to the struct-array object, both during the first timeline and during the second timeline referred to in the previous section. The purpose of creating the 'this-global' is to ensure that the second timeline is kept free of side-effects which "push" and "pop" a pointer to the 'this-param'. So long as all nested instantiations are part of the same class hierarchy, the 'this-global' remains constant during the second timeline, and optimizations in the 'translator module' which create the 'instantiator procs' are able to infer when this condition holds. The module which translates 'instantiator procs' from the definitions of virtual member production rules therefore involves the "intelligence" to reduce and eliminate the intrusion of hidden side-effect costs in the second timeline.

8.9.2.4 Template Frame Extensions

The 'template frame' and its importance were introduced in the 'first invention'. The additional importance of this concept to the present invention is described in sections above. The primary modification to the 'template frame' itself involves the need for 'context unpinning' of template frames, described in the next section. Thus additional member functions are provided in the 'template frame' which save and restore frame context, and additional FORTH words are created which allows the 'translator module' to create FORTH 'instantiator procs' which perform the 'unpinning' as deemed necessary. The four major sub-functions (and the FORTH words that map to them) are (1) set, (2) remove, (3) load, and (4) restore. When it is determined that a rule definition's translator (to 'instantiator proc') will require unpinning, the set/remove semantics are inserted into the definition of the body of the rule. When it is determined that a nested instantiation (within the above) requires unpinning, such is accomplished by load/restore semantics.

8.9.2.5 Context Unpinning

An example which illustrates the need for context unpinning is contained within the following script-code fragment:

```
1       class MyStruct {
2           int myvar = -1;
3
4           // recognize the letter 'b'
5           production Unit< > ->
6               'b'
7           ;
8
9           // document-level production rule which just
                instantiates Outer< >
10          production Doc < > ->
11              Outer< >
12          ;
13
14          // as coded, executes insinuates any side-effects
                of p, and
15          // prepends and appends the letter 'a'
                to the recognition of p
16          production Inner <Pattern p> ->
17              do (int dummy = null;
18                  'a' + p + 'a'
19              ;)
20          ;
```

```
21
22          // as coded, recognizes the string "aba", and
                causes the member
23          // variable "myvar" to be set to the value 1 if
                and only if
24          // recognition occurs within the winning thread.
25          production Outer < > ->
26              do (int a = 0;
27                  Inner< do (a = 1;
28                      Unit< >
29                      ;myvar = a) >
30              ;)
31          ;
32      }
```

The above code-snippet is presented not as a solution to a typical problem, but rather to illustrate the need for 'context unpinning' for the template frame with nested instantiations. As coded, the document-level production rule of lines 10-12 recognizes the string "aba", along with the additional side-effect of setting the "myvar" member variable of line 2 to the value of 1. This side-effect action is coded on line 29. It is coded into a 'do-pattern' which refers to the 'template frame' of the Outer< > rule needed to hold the 'do-pattern' declared variable "a" (line 26). However, this 'do-pattern' is passed into the body of the Inner< > rule (lines 27-29), so that the 'template frame' current during the second timeline for this 'do-pattern' is the 'template frame' of Inner< >.

The Inner< > and Outer< > rules both involve exactly one template-local frame variable—the variable "dummy" in the case of Inner< > and the variable "a" in the case of Outer< >. Without the feature of 'context unpinning', the statement "myvar=a" will cause the "dummy" frame variable to be used for setting "myvar" and the result of the rule would be to incorrectly set "myvar" to null (from the initial value of "dummy" on line 17). Without 'context unpinning', results could be even more harmful depending on the relative sizes of the different frames and what variable types are stored at the various template-local frame positions.

8.9.2.6 Co-Instantiations

Co-instantiated production rules are defined as those which occur within the same class hierarchy. The programmer is encouraged based on optimizations surrounding the 'this-global' to develop solutions in which all nested instantiations are also co-instantiations. An example of a nested instantiation which does not follow this guideline is an instantiation from within the body of a virtual member production rule which uses an instance variable, followed by the dot (scoping-)operator, followed by rule name and parameters. (However, instantiations using the this and super keywords, though also using dot-operator scoping, are considered co-instantiations.) It can be claimed that when all instantiations rooted from the document-level production rule are also co-instantiations, then the 'this-global' does not change during side-effect (second timeline) execution. That is, the 'this-global' is loaded (by hidden second timeline side-effects) within the function-level instantiation of the document-level production rule and remains constant (during the second timeline) until the document-level rule completes its tokenization process.

When the above rule-of-thumb is followed by the programmer, and as a result of 'this-global' optimizations, polymorphic advantages are obtained without performance penalty. This is demonstrated in section 8.6.2, in which a solution (CountCodeLines) already observing this rule-of-thumb was re-coded to use static production rules for recognition units that do not explicitly need side-effects, and no change in correlated automata statistics was found, and therefore no performance advantage was observed.

8.9.3 Structs and Inheritance

The OO-related features of the present invention center around struct definitions, member functions and member rules, and derived behaviors. Most of the OO grammar elements are standard with the exception of the novelty of allowing member production rules to gain the same polymorphic advantages which normally accrue to member functions in the art. The following sub-sections describe important design decisions.

8.9.3.1 Struct-Array

A struct object reference is modeled in the FORTH engine (and by the 'translator module') as a FORTH-array. The size of a FORTH-array required for a given struct instantiation counts the number of non-static data elements defined for the struct, including those defined in any of its super-classes. The size of this FORTH-array also includes the size of 'V-table' elements required, as described in the next section.

8.9.3.2 V-Table Design

'V-table' is a concept known in various OO language implementations, often allowing a particular (hidden) field of a struct/class object to contain a pointer to a table of all of the pointers to virtual functions. In the present invention, there is no physically separate 'V-table'. Instead, all of the addresses of (pointers to) virtual function and virtual production rule members are laid out in the struct-array in declaration order, intermixed with (non-static) data members. Because of the intermixing of virtual address pointers with data member slots in the struct-array, the present invention does not have a separate 'V-table'. An additional "slot" in the struct-array is required for each unique (by parameter signature) virtual member function or member rule declaration in the class hierarchy. These 'V-table' slots hold the offset of the FORTH global reference which in turn holds a reference to the pointer of the actual FORTH-proc (for member functions) or FORTH 'instantiator-proc' for member rules. All virtual member function calls and virtual member rule instantiations which are accomplished without an instance variable (i.e. not using. operator scoping of the art) occur within other virtual member function and virtual member rule definitions. Such calls and instantiations occur by looking up the corresponding reference from the 'V-table'. All calls and instantiations of virtual functions and virtual rules made outside of member rules require an instance variable (which references a struct-array), and are also routed through the 'V-table'. All calls and instantiations based on the super and this keywords are not routed through the 'V-table', as described in the next section.

8.9.3.3 Super and this Keywords

A departure from the art concerns calls and instantiations of virtual member functions and virtual member rules made using the super and this keywords. These calls and instantiations are not routed through the 'V-table', as such is unnecessary. These calls and instantiations occur within the declaration bodies of virtual member functions and rules. The 'translator module' is responsible for determining the global references of the FORTH-procs (functions) and FORTH 'instantiator-procs' (rules) at "translator time", which is possible because the 'translator module' has all of the information concerning the class hierarchies.

Another departure from the art is the range of access of this and super. The range of this begins in the present invention with the struct in which the member function or member rule is defined and extends through the super-most class of the hierarchy. The range of super is similar to that of this, but excludes the struct in which the member function or member rule is defined.

8.9.4 Automata Execution Engine

The automata engine includes a few modifications relative to the 'first invention'.

8.9.4.1 Arcnum Accumulation

An improvement to the automata execution engine was discovered that yields approximately a 32 percent improvement in 'DFA maximum speed' relative to the 'first invention'. The discovery is that arcnum accumulation is unnecessary at any time when there is only one "extant" automata thread. When there is only one "extant" automata thread, all future comparison/elimination decisions which can happen will "flow through" this automata thread as it will serve as the parent of all future (multiple) "extant" threads. The comparison algorithm of the 'first invention' as described in the 'first invention' compares backwards from the character position where pruning is needed, and procedes until an arcnum-sequence mismatch is found, or until both threads are found to originate from the same parent thread, whichever comes first. Thus there is no need to accumulate arcnums (for future comparisons) when only one thread is "extant". This rule-of-thumb is universal to all automata, regardless of average 'thread-count'. This optimization will not however "fire" if the 'thread-count' rises above 1 and never again has a "regeneration-point" to 1. For this reason, a very important performance-related goal of any programmer in the present invention is to produce a solution exhibiting an average 'thread-count' of less than 2.00000.

It is possible to calculate the advantage of this improvement (excluding side-effect aggregation and execution) relative to the 'first invention' under the assumption of being hosted by a Java™ virtual machine (1.3.1_07) with HotSpot turned off. From FIG. 8, 'maximum speed' is exhibited by the Docs row, and is obtained by summing the "chars" and "correlated" columns (540.97 and 1638.79) yielding 2179.76 millis (per 1 million characters). The 'derived factor' for the 'arcnum bucket' is also assumed from FIG. 9, which is roughly 700 millis. In a problem statement which is "maximally DFA-like", the thread-count remains at 1.00000 throughout execution and as shown in FIG. 3, such a solution (Docs, Comments, Chars, CharsA) has an 'arcnum statistic' of 0.00000. In the 'first invention', or without the optimization described above, the 'arcnum statistic' would be reported instead as 1.00000, and all such accumulations would be completely unnecessary as comparison/elimination events cannot occur when the 'thread-count' does not rise to 2 or more. Therefore, in the 'first invention', based on the 'derived factor' of roughly 700 millis for the 'arcnum bucket', the execution time of Docs would rise from 2179.76 to roughly 2879.76, which is a 32 percentage increase.

8.9.4.2 Statistics

The present invention offers 'automata statistics' to its programmers as a tool allowing diagnosis and improvement of solutions rendered, a process explored in various prior sections. The most important 'statistics' for the programmers of the present invention are the 10 correlated 'statistics', which are THREAD, TRANS, ARCNUM, INSTR, SPAWN, PRUNE-SIMPLE, PRUNE-EVENT, PRUNE-ARC, PRUNE-WEIGHT, and PRUNE-ACCUM. The latter 3 'statistics' also serve as a "sign-post" of N-squared (non-linear) behavior, which is seen to signify a solution that not only performs badly but is also likely producing incorrect tokenization results, as described in section 8.6.3.

In order to accommodate the calculation of these 'statistics', the automata engine counts the entries and exits from each internal state corresponding to the 10 aforementioned 'statistics', so that at conclusion of automata execution (or whenever desired), the programmer can ask for a report of all of the 'statistics'. The report of the correlated 'statistics' is normalized on a per character basis.

In order to normalize all of the 'statistics', it is required that the automata engine maintain a count of number of characters fetched from the inputstream. The THREAD and TRANS statistic requires that the automata engine maintain a current count of "extant" threads. The ARCNUM statistic requires that the automata engine count the number of arcnum-sequence references accumulated (across all "extant" threads and character positions). The INSTR statistic requires that the automata engine count the number of instr-array-snippet references accumulated (across all "extant" threads and character positions). The SPAWN statistic assumes that every new thread is eventually reclaimed, so that spawn/release event-pairs are counted by counting each call to AutomataThread.New( ). The PRUNE-SIMPLE statistic adds one to a running count for each "extant" thread found at each character position for which two or more "extant" threads exist. The PRUNE-EVENT statistic adds one to a running count for each comparison/elimination event which occurs, which happens whenever two threads are found at the same node at the same character position. If three threads are found at the same node, the value of 2 is added to this running count, if four threads are found at the same node, the value of 3 is added, and so on.

The PRUNE-ARC, PRUNE-WEIGHT, and PRUNE-ACCUM statistics involve the following concepts—(1) arcnum-sequences are like "strings" of integers whose elements are used as described in the 'first invention' to make a prune-comparison; (2) arcnum-sequence references are accumulated at each character position (necessary when the 'thread-count' is at least 2, from section 8.9.4.1); (3) "extant" threads keep track of the number of characters traversed since that thread was "spawned" from its parent thread; (4) comparisons are necessary and proceed backwards from the current character position (for which 2 threads are found at the same node) until either a mismatch of an arcnum-sequence "string" element is found at the current comparison-depth or until both threads are found to share the same parent; (5) the current comparison depth is reduced each time a comparison-mismatch is found, and is reduced to the number of "string" elements which produced the "mismatch".

The PRUNE-ARC statistic requires that the automata engine add the distance of each comparison through arcnum-sequence references required to determine a "better" thread. The PRUNE-WEIGHT statistic requires that the automata engine add the total of individual arcnum-sequence "string" elements compared to determine a "better" thread. The PRUNE-ACCUM statistic requires that the automata engine add one for each parent-child thread transition involved in determining all of the arcnum-sequence references to be compared.

Also produced by the automata engine is the uncorrelated ACCEPT statistic. This statistic requires that the automata engine count the number of intermediate "accept" states (threads) accrued because a new "accepting" thread is found which has recognized a greater number of characters, according to the overall "greedy" algorithm of the art.

I claim:

1. A computer-implemented method of encapsulating regular expressions as polymorphic, virtual members of a programmer defined struct/class, the method comprising the steps of:
    defining a grammar for creating object-oriented style structs similar to the grammar of C++;
    defining a grammar for the algebraic composition of regular expressions in the grammar;
    defining a grammar for creating side-effects of regular expressions such as capture, called CapturePatterns, and the more general statement embedding side-effects, called DoPatterns;
    defining a grammar for the encapsulation rules of regular expressions in such a way that they are reusable based on their rule names and parameters;
    instantiating the encapsulation as a regular expression that binds to the struct instance; and
    declaring the encapsulation as virtual members and therefore subclassable members of a struct such that the regular expression encapsulation has access to all of the data members and virtual members of the struct instance for both composition and side-effects.

2. The method of claim 1, further comprising the step of declaring a regular expression encapsulation as a virtual and therefore subclassable member of the struct, such that all aspects (both composition and side-effect) of the regular expression encapsulation have access to the data and function members of this struct instance as well as other virtual regular expression encapsulations defined in this struct.

3. The method of claim 2, further comprising the step of composing a virtual regular expression encapsulation in terms of matching characteristics from other virtual regular expression encapsulations defined in the struct.

4. The method of claim 2, further comprising the step of including capture semantics in a virtual regular expression encapsulation whereby matches or sub-matches of the encapsulated regular expression can be stored into data member variables of the struct instance.

5. The method of claim 2, further comprising the step of including general side-effect generating statements, DoPatterns, in a virtual regular expression encapsulation whereby the DoPattern's side-effect statements have access to all of the data member variables and member functions of the struct instance.

6. The method of claim 2, further comprising the steps of: a) defining a high-level matching regular expression as a virtual regular expression encapsulation of a struct; and b) then decomposing the virtual regular expression encapsulation of the struct into, and based upon, other virtual regular expression encapsulations within the same struct, in such a way that subclasses of the struct can polymorphically insinuate new derived behaviors, both matching and side-effect, to any of the decomposed regular expression encapsulations, whereby the high-level matching regular expression of the subclass both inherits the regular expression behaviors of superclass encapsulations and derives additional regular expression behaviors for the high-level matching expression in the subclass.

7. The method of claim 6, further comprising the step of deriving, for a subclass of a struct, a new definition to a particular virtual regular expression encapsulation, such that the derived definition has new matching and composition characteristics, normally augmenting the matching characteristics of the corresponding virtual regular expression definition in the superclass, and such that any virtual encapsulations that depend on the derived encapsulation inherit the new matching behavior of the changed encapsulation.

8. The method of claim 6, further comprising the step of giving a subclass of a struct a new derived definition to a particular virtual regular expression encapsulation, such that the derived behavior now updates data members of the struct instance, both through CapturePatterns and DoPatterns, and such that any virtual encapsulations that depend on the derived encapsulation inherit the new side-effect behavior of the changed encapsulation.

9. A computer system for interpreting or compiling and then executing a programming language with support for regular expression encapsulations defined as virtual members of a struct/class, the system comprising:

at least one computer processor;

a programming language with means for a regular expression grammar, the grammar comprising means for 1) for creating object-oriented style structs similar to the grammar of C++, 2) for the algebraic composition of. regular expressions in the grammar, 3) for creating side-effects of regular expressions such as capture, called CapturePatterns, and the more general statement embedding side-effects, called DoPatterns; 4) for defining a grammar for the encapsulation rules of regular expressions in such a way that they are reusable based on their rule names and parameters, 5) for instantiating the encapsulation as a regular expression that binds to the struct instance; and 6) for declaring the encapsulations as virtual members and therefore subclassable members of a struct such that the regular expression encapsulation has access to all of the data members and virtual members of the struct instance for both composition and side-effects;

means for executing computer program modules or scripts written in the programming language and, while the computer program is being hosted by the computer processor, the computer program is also the host for the computer program scripts which are its target executables;

means for data input providing a user-defined program module or script written by user according to the grammatical rules of the programming language to the host computer programs;

means for data input providing a source of data to be processed by the scripts: and a set of virtual machine instructions, into which instructions the scripts are translated, and which instructions include aspects for composing and executing virtual regular expression encapsulations.

10. The system of claim 9, further comprising host computer program support for associating the instance "this" variable of a struct to a use-instantiation of a virtual regular expression encapsulation, such that the "this" variable becomes a hidden parameter of the virtual regular expression encapsulation.

11. The system of claim 10, further permitting the hidden "this" parameter of an instantiation of a virtual regular expression encapsulation to be accessed at composition time to allow other virtual regular expression encapsulations of the struct instance to be used in composition of the virtual regular expression encapsulation.

12. The system of claim 10, further permitting the hidden "this" parameter of an instantiation to be found at "side-effect time" so that the virtual machine can store the side-effects of a match, such as CapturePatterns and DoPatterns, into the correct instance of the struct.

13. A computer-implemented method of encapsulating regular expressions as polymorphic members of a struct, the method comprising the steps of:

defining a grammar for creating object-oriented style structs similar to the grammar of C++;

defining a grammar for the composition of regular expressions in the grammar;

defining a grammar for creating side-effects of regular expressions such as capture, called CapturePatterns, and more general statement embedding side-effects, called DoPatterns;

defining a grammar for the encapsulation of regular expressions in such a way that they are reusable based on their names and parameters;

declaring a regular expression encapsulation as a virtual member of the struct, such that all aspects of the regular expression encapsulation has access (once instantiated relative to a specific struct instance) to the data members of a struct instance as well as other virtual regular expression encapsulations defined in the struct;

defining high-level matching regular expression(s) as a virtual regular expression encapsulation of a struct;

decomposing the virtual regular expression encapsulation of the struct into, and based upon, other virtual regular expression encapsulations of the same struct, in such a way that subclasses of the struct can polymorphically give new derived behaviors, both matching and side-effect, to any of the decomposed regular expression encapsulations, whereby the high-level matching regular expression of the subclass both inherits the regular expression behaviors of superclass encapsulations and derives additional regular expression behaviors for the high-level matching expression in the subclass; and declaring the encapsulation as virtual members of a struct such that the regular expression encapsulation has access to all of the data members and virtual members of the struct instance for both composition and side-effects.

\* \* \* \* \*